(12) United States Patent
Umehara et al.

(10) Patent No.: US 8,850,033 B2
(45) Date of Patent: *Sep. 30, 2014

(54) APPARATUS, SYSTEM, AND METHOD OF CONTROLLING CONNECTION AMONG TERMINALS AND RECORDING MEDIUM STORING CONNECTION CONTROL PROGRAM

(71) Applicants: Naoki Umehara, Kanagawa (JP); Takahiro Asai, Kanagawa (JP)

(72) Inventors: Naoki Umehara, Kanagawa (JP); Takahiro Asai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,867

(22) Filed: Aug. 23, 2013

(65) Prior Publication Data

US 2013/0335514 A1  Dec. 19, 2013

Related U.S. Application Data

(63) Continuation of application No. 13/368,588, filed on Feb. 8, 2012.

(30) Foreign Application Priority Data

Feb. 25, 2011 (JP) ................................ 2011-039920
Sep. 13, 2011 (JP) ................................ 2011-199212

(51) Int. Cl.
*G06F 15/16* (2006.01)

(52) U.S. Cl.
USPC ........................................................ 709/227

(58) Field of Classification Search
USPC ........................................................ 709/227
See application file for complete search history.

(56) References Cited

U.S. PATENT DOCUMENTS

| 7,343,008 | B1 | 3/2008 | Frankel |
| 2006/0246934 | A1 | 11/2006 | Patel et al. |
| 2006/0271674 | A1* | 11/2006 | Harada ........................ 709/224 |
| 2008/0259824 | A1 | 10/2008 | Frankel |
| 2009/0138605 | A1 | 5/2009 | Handa |

(Continued)

FOREIGN PATENT DOCUMENTS

| CN | 101273658 A | 9/2008 |
| GB | 2460897 | 12/2009 |

(Continued)

OTHER PUBLICATIONS

Office Action mailed Apr. 16, 2014, in Chinese Patent Application No. 201210033497.8.

*Primary Examiner* — Vivek Srivastava
*Assistant Examiner* — Karina J Garcia-Ching
(74) *Attorney, Agent, or Firm* — Oblon, Spivak, McClelland, Maier & Neustadt, L.L.P.

(57) ABSTRACT

When a request for participating in a session being performed by a plurality of participating terminals is received from a terminal that is not participated in the session, a system extracts identification information of one or more candidate terminals that are associated with the participating terminal for each one of the plurality of participating terminals, and determines whether identification information of the terminal that sends the request is included in the extracted candidate terminal identification information to generate a determination result. The determination result is used to determine whether to allow the terminal that sends the request to connect with the plurality of participating terminals to participate in the session.

24 Claims, 29 Drawing Sheets

(56) References Cited

U.S. PATENT DOCUMENTS

| | | |
|---|---|---|
| 2009/0316686 A1 | 12/2009 | Mandre |
| 2010/0332436 A1 | 12/2010 | Yanagisawa |
| 2011/0141950 A1 * | 6/2011 | Patil .............................. 370/261 |
| 2011/0216699 A1 | 9/2011 | Umehara et al. |

FOREIGN PATENT DOCUMENTS

| | | |
|---|---|---|
| JP | 8/256145 | 10/1996 |
| JP | 10-56513 | 2/1998 |
| JP | 2005-109922 | 4/2005 |
| JP | 2005-197816 | 7/2005 |
| JP | 2005-197821 | 7/2005 |
| JP | 2009-135590 | 6/2009 |

* cited by examiner

FIG. 6
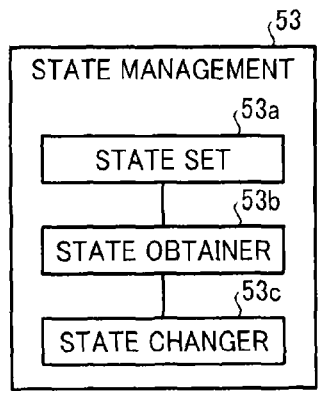
FIG. 7
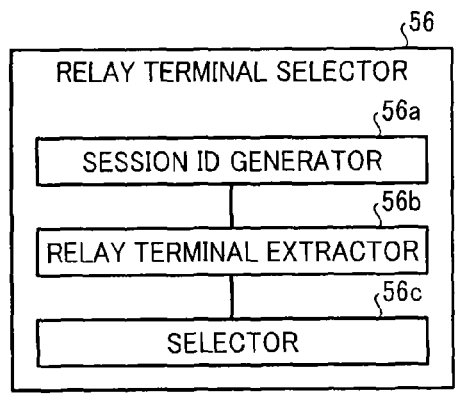
FIG. 8
DATA QUALITY MANAGEMENT TABLE
| TERMINAL IP ADDRESS | IMAGE DATA QUALITY |
|---|---|
| 1.3.2.4 | HIGH |
| 1.3.1.3 | LOW |
| 1.3.2.3 | MEDIUM |
| ... | ... |
FIG. 9A
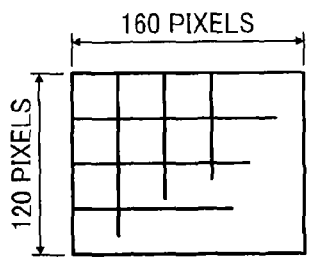
FIG. 9B
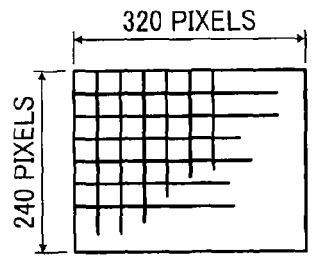
FIG. 9C
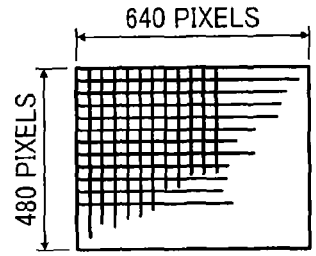

FIG. 10

RELAY TERMINAL MANAGEMENT TABLE

| RELAY TERMINAL ID | OPERATION STATE | DATE AND TIME RECEIVED | RELAY TERMINAL IP ADDRESS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |
| 111e | ON LINE |  | 1.1.1.3 |  |

FIG. 11

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 12

TERMINAL MANAGEMENT TABLE

| TERMINAL ID | TERMINAL NAME | OPERATION STATE | COMMUNICATION STATE | DATE AND TIME RECEIVED | TERMINAL IP ADDRESS |
|---|---|---|---|---|---|
| 01aa | JAPAN TOKYO OFFICE AA TERMINAL | ON LINE | NONE | 2009.11.10.13:40 | 1.2.1.3 |
| 01ab | JAPAN TOKYO OFFICE AB TERMINAL | OFF LINE | | 2009.11.09.12:00 | 1.2.1.4 |
| ... | ... | ... | ... | ... | ... |
| 01ba | JAPAN OSAKA OFFICE BA TERMINAL | ON LINE | CALLING | 2009.11.10.13:45 | 1.2.2.3 |
| 01bb | JAPAN OSAKA OFFICE BB TERMINAL | ON LINE | NONE | 2009.11.10.13:50 | 1.2.2.4 |
| ... | ... | ... | ... | ... | ... |
| 01ca | U.S. NY OFFICE CA TERMINAL | OFF LINE | | 2009.11.10.12:45 | 1.3.1.3 |
| 01cb | U.S. NY OFFICE CB TERMINAL | ON LINE | NONE | 2009.11.10.13:55 | 1.3.1.4 |
| ... | ... | ... | ... | ... | ... |
| 01da | U.S. WASH, D.C. OFFICE DA TERMINAL | ON LINE | BUSY | 2009.11.08.12:45 | 1.3.2.3 |
| 01db | U.S. WASH, D.C. OFFICE DB TERMINAL | ON LINE | NONE | 2009.11.10.12:45 | 1.3.2.4 |
| ... | ... | ... | ... | ... | ... |

FIG. 13

CANDIDATE LIST MANAGEMENT TABLE

| REQUEST TERMINAL ID | COUNTER TERMINAL ID |
|---|---|
| 01aa | 01ab, 01ba, 01db |
| 01ab | 01aa, 01ca, 01cb |
| 01ba | 01aa, 01ab, 01ca, 01cb, 01da, 01db |
| 01cb | 01bb, 01db |
| 01db | 01aa, 01cb, 01da |
| ... | ... |

FIG. 14

SESSION MANAGEMENT TABLE

| SESSION ID | RELAY TERMINAL ID | REQUEST TERMINAL ID | COUNTERPART TERMINAL ID | DELAY TIME (ms) | DATE AND TIME RECEIVED |
|---|---|---|---|---|---|
| se1 | 111e | 01aa | 01db | 200 | 2009.11.10.14:00 |
| se2 | 111b | 01ba | 01be | 50 | 2009.11.10.14:10 |
| se3 | 111c | 01cd | 01cf | 400 | 2009.11.10.14:20 |
| ... | ... | ... | ... | ... | ... |

FIG. 15

QUALITY MANAGEMENT TABLE

| DELAY TIME (ms) | IMAGE DATA QUALITY |
|---|---|
| 0 ~ 100 | HIGH |
| 100 ~ 300 | MEDIUM |
| 300 ~ 500 | LOW |
| 500 ~ | (INTERRUPT) |

FIG. 16

RELAY TERMINAL SELECTION MANAGEMENT TABLE

| TERMINAL ID | RELAY TERMINAL ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG. 17

STATE CHANGE MANAGEMENT TABLE

| CHANGE REQUEST DATA | PREVIOUS STATE DATA | CHANGED STATE DATA |
|---|---|---|
| CALL | NONE | ACCEPTED |
| JOIN | ACCEPTED | BUSY |
| LEAVE | BUSY | NONE |

FIG. 18

STATE CHANGE MANAGEMENT TABLE

| CHANGE REQUEST DATA | TERMINAL DATA | PREVIOUS STATE DATA | CHANGED STATE DATA |
|---|---|---|---|
| INVITE | REQUEST | NONE | CALLING |
| | COUNTERPART | NONE | RINGING |
| ACCEPT | REQUEST | CALLING | ACCEPTED |
| | | ACCEPTED | ACCEPTED |
| | COUNTERPART | RINGING | ACCEPTED |

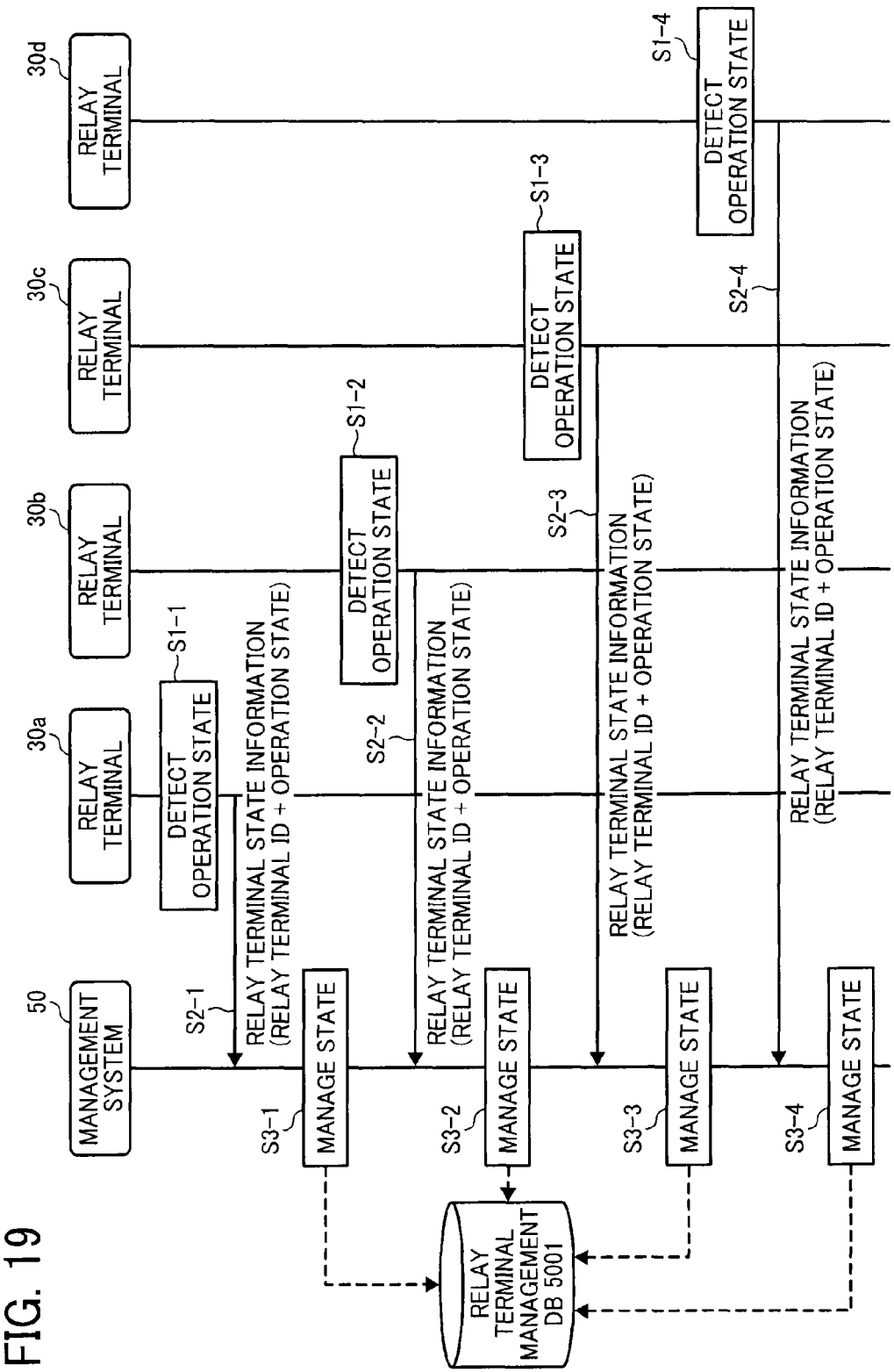

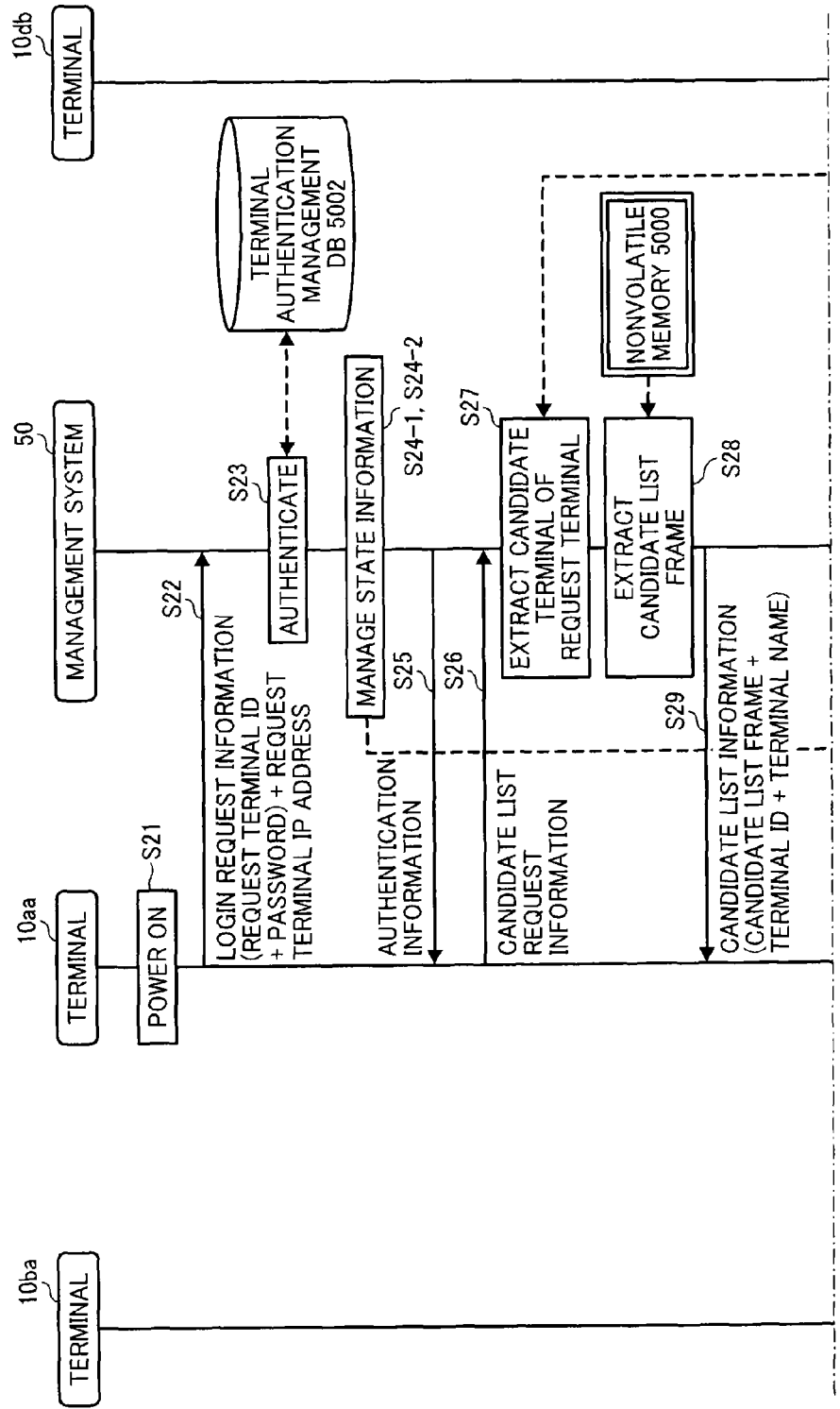

APPARATUS, SYSTEM, AND METHOD OF CONTROLLING CONNECTION AMONG TERMINALS AND RECORDING MEDIUM STORING CONNECTION CONTROL PROGRAM

CROSS-REFERENCE TO RELATED APPLICATIONS

This application is a continuation of U.S. application Ser. No. 13/368,588, filed on Feb. 8, 2012, and is based on and claims priority pursuant to 35 U.S.C. §119 to Japanese Patent Application Nos. 2011-039920, filed on Feb. 25, 2011, and 2011-199212, filed on Sep. 13, 2011, in the Japan Patent Office, the entire disclosures of each of which are hereby incorporated herein by reference.

BACKGROUND

1. Field

The present invention generally relates to controlling connection among a plurality of transmission terminals.

2. Background

With the need for reducing costs or times associated with business trips, more companies are moving towards videoconference systems to have teleconference or videoconference among remotely located offices via a communication network such as the Internet. The videoconference systems allow transmission of contents data such as image data and/or sound data among a plurality of transmission terminals that are remotely located from one another through the communication network to facilitate communication among the plurality of transmission terminals.

To have a videoconference among the plurality of transmission terminals, a user is required to previously register information regarding participants, who will be participating in the videoconference before the videoconference starts. In case a user who is not previously registered decides to participate in that videoconference after the videoconference starts, the unregistered user is not allowed to participate unless the unregistered user is registered through the registration process. The registration process usually requires additional time such that it has been inconvenient for the unregistered user to participate in the videoconference after the videoconference starts.

Japanese Patent Application Publication No. H08-256145 describes a conference manager, which manages a permitted user list that registers identification of a user who is allowed to participate in a conference without the registration process, for each of conferences. When a request for participating in a specific conference is received from a user, the conference manager determines whether identification of the user is registered in the permitted user list prepared for the specific conference, and allows the user to participate in the specific conference if the user is registered in the permitted user list.

SUMMARY

While Japanese Patent Application Publication No. H08-256145 allows some users to participate in the conference without the registration process, the inventors of the present invention have realized that the conference manager still needs to manage a permitted user list in association with each of the conferences. In view of the above, one aspect of the present invention is to provide a system for controlling connections among a plurality of terminals through a network, which allows a user who is not registered as a participant of a specific session to participate in that session, without requiring the system to manage additional data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a schematic block diagram illustrating a functional structure of a state manager of the transmission management system of FIG. 5;

FIG. 7 is a schematic block diagram illustrating a functional structure of a relay terminal selector of the transmission management system of FIG. 5;

FIG. 8 is an example data structure of a data quality management table, managed by the transmission management system of FIG. 5;

FIGS. 9A to 9C are illustrations for explaining image quality of image data transmitted or received by the transmission system of FIG. 1;

FIG. 10 is an example data structure of a relay terminal management table, managed by the transmission management system of FIG. 5;

FIG. 11 is an example data structure of a terminal authentication management table, managed by the transmission management system of FIG. 5;

FIG. 12 is an example data structure of a terminal management table, managed by the transmission management system of FIG. 5;

FIG. 13 is an example data structure of a candidate list management table, managed by the transmission management system of FIG. 5;

FIG. 14 is an example data structure of a session management table, managed by the transmission management system of FIG. 5;

FIG. 15 is an example data structure of a quality management table, managed by the transmission management system of FIG. 5;

FIG. 16 is an example data structure of a relay terminal selection management table, managed by the transmission management system of FIG. 5;

FIG. 17 is an example data structure of a state change management table, managed by the transmission management system of FIG. 5;

FIG. 18 is an example data structure of a state change management table, managed by the transmission management system of FIG. 5;

FIG. 19 is a data sequence diagram illustrating operation of managing state information indicating an operation state of the relay terminal of the transmission system of FIG. 1, according to an example embodiment of the present invention;

FIGS. 21A and 21B are a data sequence diagram illustrating operation of establishing communication among two or more transmission terminals of the transmission system of FIG. 1, according to an example embodiment of the present invention;

Figure 1:
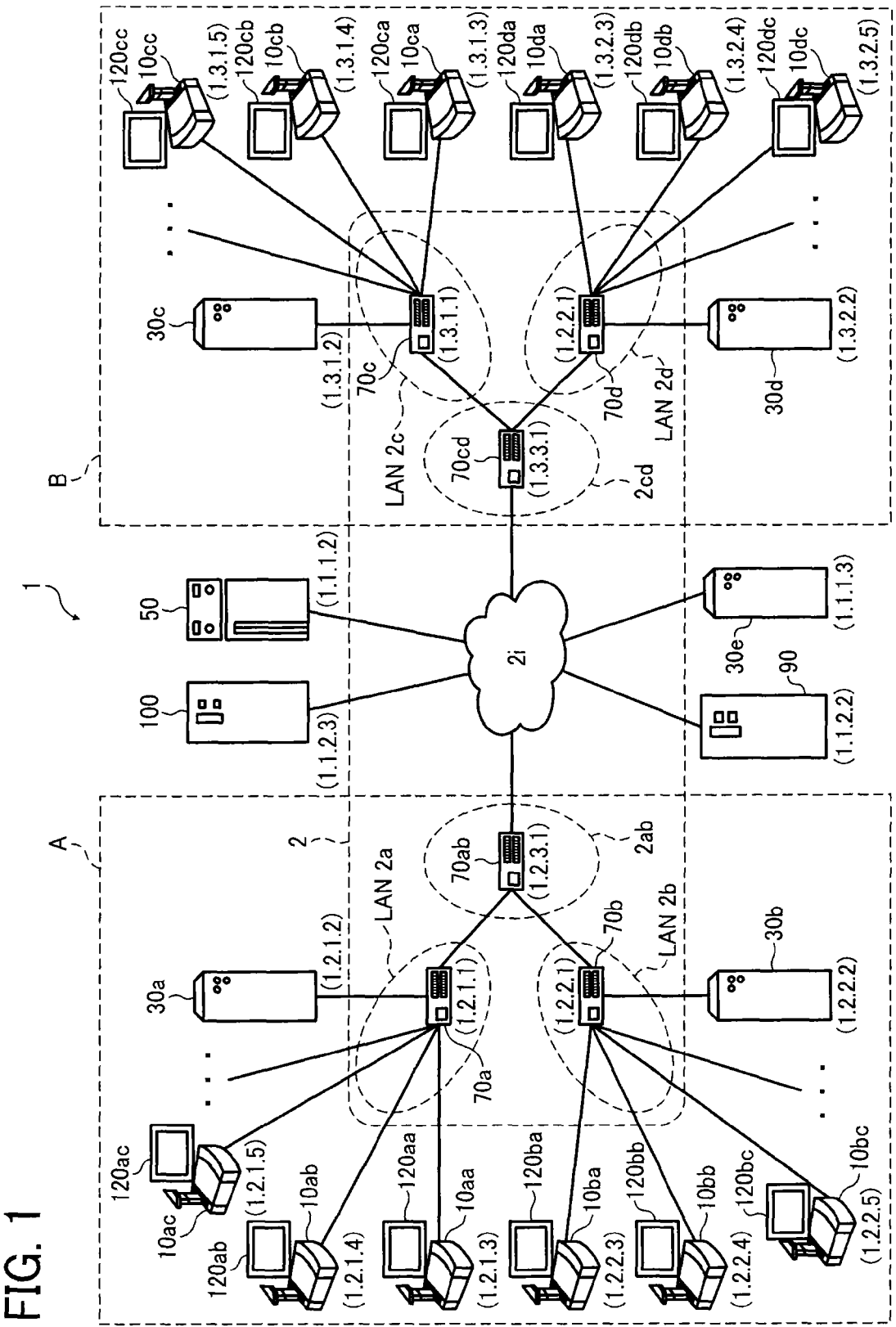
FIG. 1 is a schematic block diagram illustrating a transmission system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 1, a transmission system 1 is explained according to an example embodiment of the present invention.

In one example, the transmission system 1 functions as a data providing system that transmits contents data from one transmission terminal to another transmission terminal in one direction through a transmission management system 50. In another example, the transmission system 1 functions as a two-way communication system that exchanges various information including image data and/or sound data that is used to convey human's feelings between or among two or more of a plurality of transmission terminals 10 each of which functioning as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes a plurality of transmission terminals 10aa, 10ab, 10ac, 10ba, 10bb, 10bc, 10ca, 10cb, 10cc, 10da, 10db, 10dc, etc., a plurality of displays 120aa, 120ab, 120ac, 120ba, 120bb, 120bc, 120ca, 120cb, 120cc, 120da, 120db, 120dc, etc., a plurality of relay terminals 30a, 30b, 30c, 30d, and 30e, the transmission management system 50, a program providing system 90, and a maintenance system 100.

For the descriptive purposes, in this example, any number of the plurality of terminals 10aa to 10dc, etc., may be collectively or each referred to as the terminal 10. Any number of the plurality of displays 120aa to 120dc, etc., may be collectively or each referred to as the display 120. Any one of the plurality of relay terminals 30a, 30b, 30c, 30d, and 30e may be collectively or each referred to as the relay terminal 30. The transmission management system 50 may be referred to as the "management system" 50. For the descriptive purposes, in the following examples, the request terminal 10A includes any terminal 10 that sends request information to another terminal 10 to start communication with the terminal 10 through the transmission management system 50. The counterpart terminal 10B includes any terminal 10 that receives request information from the request terminal 10A through the transmission management system 50 to accept or reject the request for starting communication with the request terminal 10A. In alternative to the request for starting communication, any terminal 10 may send any other type of request information to the transmission management system 50, for example, a request for relaying contents data, a request for participating in videoconference, a request for leaving from videoconference, etc.

The transmission terminal 10 transmits or receives contents data to or from another transmission terminal 10. Examples of contents data include, but not limited to, image data and/or sound data to be transmitted or received through a session established between or among the terminals 10 for communication. In this example, it is assumed that a moving image is transmitted as the image data. Alternatively, a still image, or both of the still image and the moving image, may be transmitted as the image data. The relay terminal 30 relays image data and/or sound data between or among the plurality of terminals 10. The transmission management system 50 centrally manages the transmission terminal 10 and the relay terminal 30.

The plurality of routers 70a, 70b, 70c, 70d, 70ab and 70cd, which may be collectively or each referred to as the router 70, selects a route that is most suitable for transmitting contents data such as image data and sound data.

The program providing system 90 includes a hard disk device (HD) 204 (FIG. 3), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay terminal 30 to perform various functions or operations. For example, the program providing system 90 sends the relay control program to the relay terminal 30 through the Internet 2i to cause the relay terminal 30 to install the relay control program. Further, the HD 204 of the program providing system 90 may store a transmission management program that causes the management system 50 to perform various functions or operations. For example, the program providing system 90 sends the transmission management program to the management system 50 to cause the management system 50 to install the transmission management program.

The maintenance system 100 is implemented as a computer capable of maintaining, managing, fixing, or upgrading at least one of the terminal 10, relay terminal 30, management system 50, and program providing system 90. Assuming that the maintenance system 100 is provided within a country, and the terminal 10, the relay terminal 30, the management system 50, and the program providing system 90 are each installed outside the country, the maintenance system 100 maintains, manages, fixes, or upgrades at least one of the terminal 10, relay terminal 30, management system 50, and program providing system 90, remotely through the communication network 2. The maintenance system 100 may manage maintenance of at least one of the terminal 10, relay terminal 30, management system 50, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10aa to 10ac, the relay terminal 30a, and the router 70a are connected to a local area network (LAN) 2a. The terminals 10ba to 10bc, the relay terminal 30b, and the router 70b are connected to a LAN 2b. The LAN 2a and the LAN 2b are connected to a leased line 2ab in which the router 70ab is provided. It is assumed that these devices including the terminals 10aa to 10bc are located in an area A. For example, assuming that the area A is any area in Japan, the LAN 2a could be located within an office in a city such as Tokyo, and the LAN 2b could be located within an office in another city such as Osaka.

The terminals 10ca to 10 cc, the relay terminal 30c, and the router 70c are connected to a LAN 2c. The terminals 10da to 10dc, the relay terminal 30d, and the router 70d are connected to a LAN 2d. The LAN 2c and the LAN 2d are connected to a leased line 2cd in which the router 70cd is provided. It is assumed that these devices including the terminals 10ca to 10dc are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70ab and 70cd.

The management system 50, the program providing system 90, and the maintenance system 100 are connected through the Internet 2i to the terminal 10 and the relay terminal 30. Any one of the management system 50, the program providing system 90 and the maintenance system 100 may be located at any location within or outside any one of the area A and the area B.

The relay terminal 30e is connected to the terminal 10 through the communication network 2 to be communicable with each other. The relay terminal 30e is provided in an area other than a local area such as the area A or the area B. This causes the relay terminal 30e to be free from the influences by communication that takes place in the local area. In this example, the relay terminal 30e is always turned on to operate. In case the request terminal 10A in the area A or the area B is communicating with a counterpart terminal 10B that is provided in an area other than the local area A or B, the relay terminal 30e is selected as a relay terminal that relays contents data between the terminals 10A and 10B. In case the request terminal 10A in the area A or the area B is communicating with a counterpart terminal 10B that is provided within the local area A or the area B, the relay terminal 30e is selected as a relay terminal that relays contents data between the terminals 10A and 10B, if none of the relay terminals 30a to 30d operates.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

As shown in FIG. 1, the terminal 10, the relay terminal 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

<Hardware Structure of Transmission System>

Figure 4:
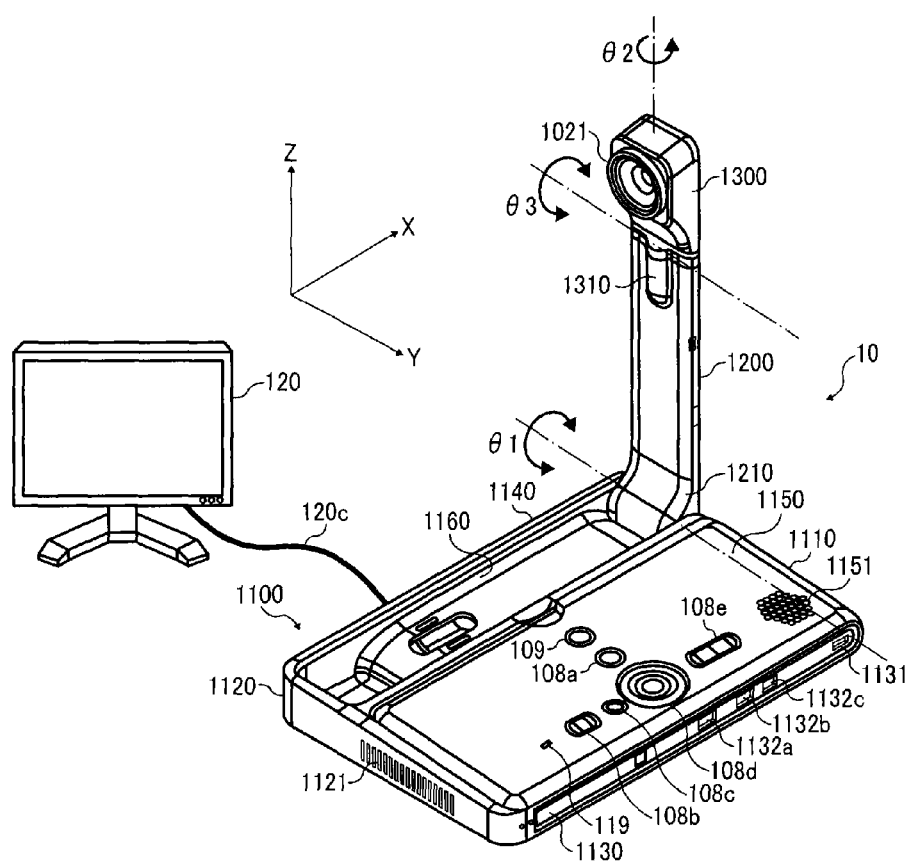
FIG. 4 is a perspective view illustrating the outer appearance of the transmission terminal of the transmission system of FIG. 1, according to an example embodiment of the present invention.

Next, a hardware structure of the transmission system 1 is explained according to an example embodiment of the present invention. FIG. 4 is a perspective view illustrating the outer appearance of the terminal 10 of the transmission system 1. In FIG. 4, the longitudinal direction of the terminal 10 is referred to as X direction. The direction orthogonal to the X direction, which is the horizontal direction of the terminal 10, is referred to as the Y direction. The direction orthogonal to the X direction and the Y direction is referred to as the Z direction.

As illustrated in FIG. 4, the terminal 10 includes a body 1100, an arm 1200, and a camera housing 1300. The body 1100 includes a front side wall 1110 having a plurality of air intake holes that are formed over the nearly entire surface of the intake surface of the front side wall 1100. The body 1100 further includes a back side wall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 2) of the terminal 10 is able to catch sounds such as human voice or any sound including noise.

The body 1100 has an operation panel 1150, which is provided at a side toward the right side wall 1130. The operation panel 1150 includes a plurality of operation buttons 108a to 108e ("the operation button 108"), a power switch 109, an alarm lamp 119, and a plurality of sound output holes 1151. Through the sound output holes 1151, a speaker 115 (FIG. 2) of the terminal 10 is able to output sounds such as sounds generated based on sounds such as human voice. The body 1100 further includes a holder 1160, which is provided at a side toward the left side wall 1140. The holder 1160, which has a concave shape, accommodates therein the arm 1200 and the camera housing 1300. The right side wall 1130 of the body 1100 further includes a plurality of ports 1132a to 1132c (the ports 1132) each of which allows electric connections between an outside device connection interface (I/F) 118 (FIG. 2) and an outside device through a cable. The left side wall 1140 of the body 1100 is provided with a connection port for electrical connection between the outside device connection I/F 118 (FIG. 2) and a cable 120c for the display 120.

The arm 1200 is fixed to the body 1100 via a torque hinge 1210. With the torque hinge 1210, the arm 1200 can be rotated in directions of up and down with respect to the body 1100, while making a tilt angle θ1 of up to 135 degrees. FIG. 4 illustrates the case where the tilt angle θ1 is 90 degrees.

The camera housing 1300 incorporates therein a camera 112 (FIG. 2) that takes an image of an object. The object may be a part of a user, document, or a room where the terminal 10 is located. The camera housing 1300 is fixed to the arm 1200 through a torque hinge 1310. With the torque hinge 1310, the camera housing 1300 can be rotated with respect to the arm 1200, while making a pan angle θ2 from about −180 degrees to +180 degrees and a tilt angle θ3 that ranges from about −45 degrees to +45 degrees in the direction of up, down, right, and left. In FIG. 4, the pan angle θ2 and the tilt angle θ3 are each 0 degree.

The relay terminal 30, management system 50, program providing system 90 and maintenance system 100 are each implemented by a general-purpose computer such as a personal computer or a server computer. For simplicity, explanation of the outer appearance of the computer is omitted.

Figure 2:
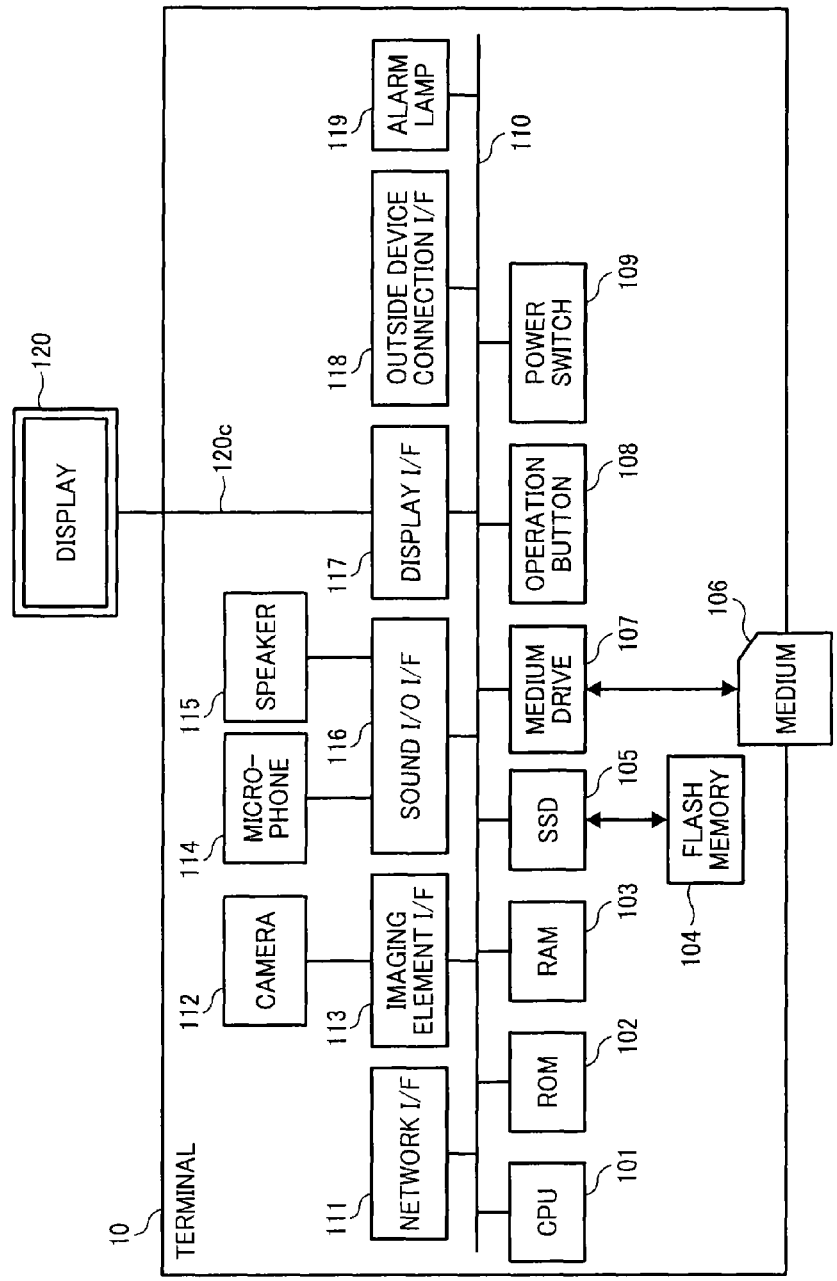
FIG. 2 is a schematic block diagram illustrating a hardware structure of a transmission terminal of the transmission system of FIG. 1.

FIG. 2 illustrates a hardware structure of the terminal 10 according to an example embodiment of the present invention. The terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, a display interface (I/F) 117, the outside device connection interface (I/F) 118, and an alarm lamp 119, which are electrically connected through a bus 110 such as an address bus or data bus.

The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice. The speaker 115 outputs sounds such as sounds generated based on voice. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device such as the connection port described above referring to FIG. 4. The alarm lamp 119 notifies the user when a trouble is detected in the terminal 10.

The display 120 may be implemented by a liquid crystal display (LCD) or an organic light emitting display, which displays various data such as an image of an object or an operation icon. As illustrated in FIGS. 2 and 4, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as a camera, microphone, or speaker through a universal serial bus (USB) cable, which is connected to the connection port 1132 of the body 1100. When the outside camera is connected to the terminal 10, the CPU 101 causes the terminal 10 to capture an image using the outside camera, rather than the camera 112 that is incorporated in the terminal 10. When the outside microphone or the outside speaker is connected to the terminal 10, the CPU 101 causes the terminal 10 to use the outside microphone or the outside speaker in replace of the incorporated microphone 114 or the incorporated speaker 115. Alternatively, the CPU 101 may allow the user at the terminal 10 to use selected one of the outside device and the internal device.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 3:
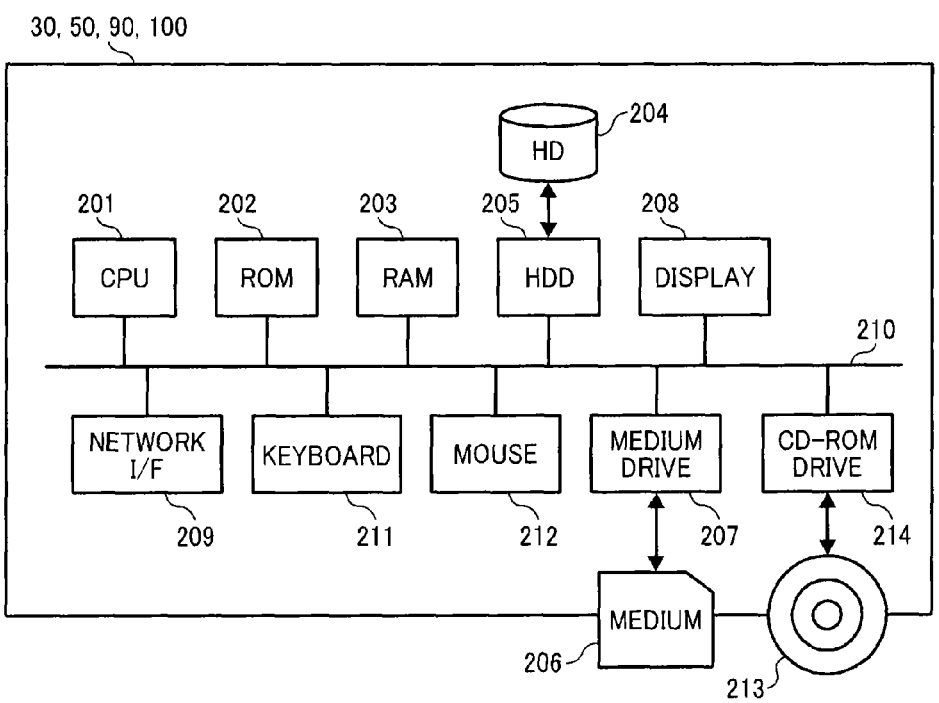
FIG. 3 is a schematic block diagram illustrating a hardware structure of any one of a transmission management system, a relay terminal, a program providing system, and a maintenance system of the transmission system of FIG. 1.

FIG. 3 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as a transmission management program. The RAM 203 functions as a work area of the CPU 201. The HD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The transmission management program may be written onto a recording medium that is readable by a general-purpose computer such as the recording medium 206 or the CD-ROM 213 in any format that is installable or executable by the general-purpose computer. Once the transmission management program is written onto the recording medium, the recording medium may be distributed. Further, the transmission management program may be stored in any desired memory other than the HD 204, such as the ROM 202.

The relay terminal 30 is substantially similar in hardware structure to the management system 50 of FIG. 3, except for replacement of the transmission management program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The program providing system 90 is substantially similar in hardware structure to the management system 50 of FIG. 3, except for replacement of the transmission management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 3, except for replacement of the transmission management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

Figure 5:
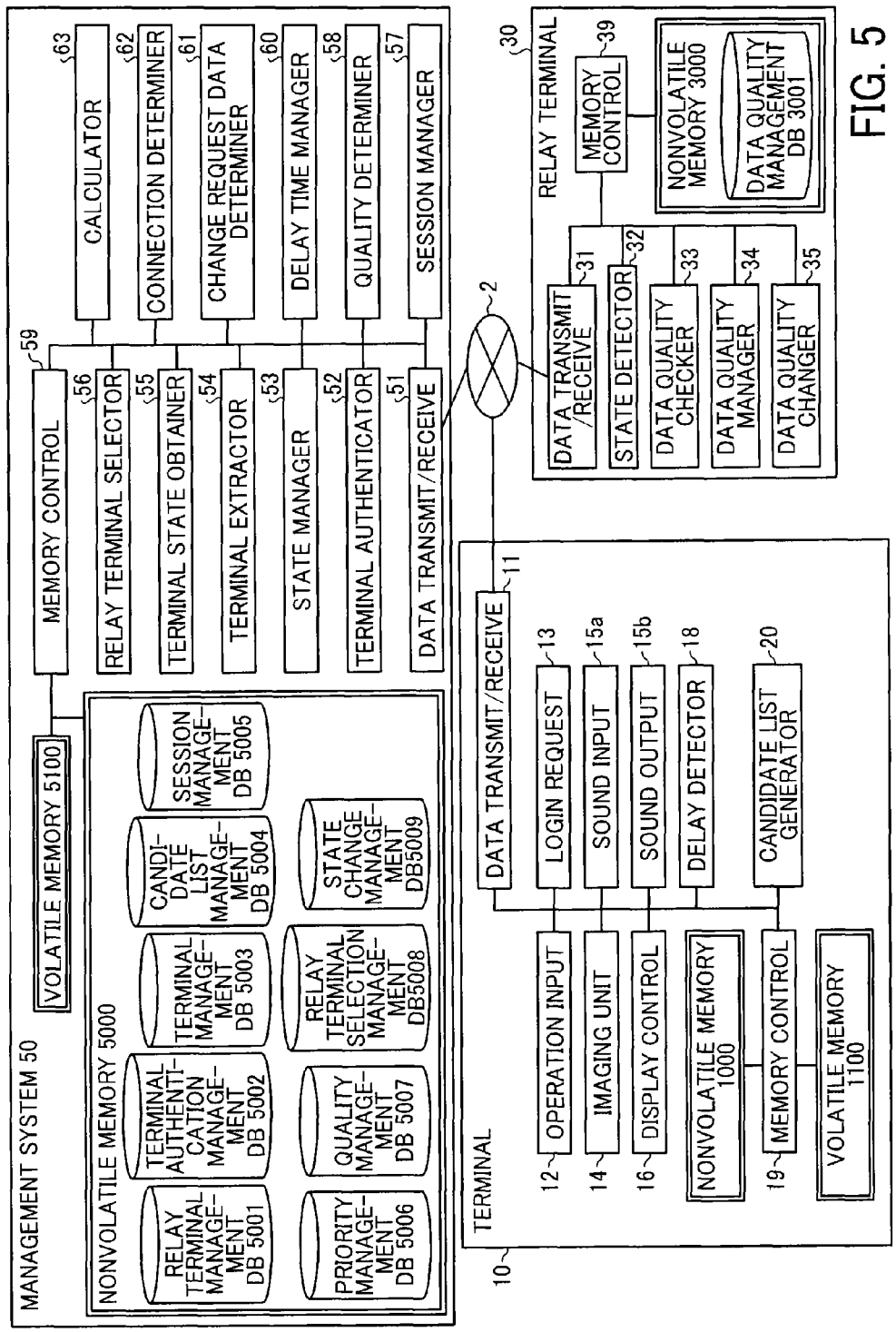
FIG. 5 is a schematic block diagram illustrating functional structures of the transmission system of FIG. 1.

Referring now to FIG. 5, a functional structure of the transmission system 1 of FIG. 1 is explained according to an example embodiment of the present invention. More specifically, FIG. 5 illustrates a functional structure of the transmission terminal 10, the relay terminal 30, and the transmission management system 50. As illustrated in FIG. 1, the terminal 10, the relay terminal 30, and the management system 50 exchange data with one another through the communication network 2. In FIG. 5, the program providing system 90 and the maintenance system 100 of FIG. 1 are omitted.

<Functional Structure of Terminal>

The terminal 10 includes a data transmit/receive 11, an operation input 12, a login request 13, an imaging unit 14, a sound input 15a, a sound output 15b, a display control 16, a delay detector 18, a memory control 19, and a candidate list generator 20. These units shown in FIG. 5 correspond to a plurality of functions or functional modules, which are executed according to an instruction of the CPU 101 (FIG. 2) that is generated according to the terminal control program being loaded from the ROM 102 onto the RAM 103. The terminal 10 further includes a volatile memory 1100 that may be implemented by the RAM 103 (FIG. 2), and a nonvolatile memory 1100 that may be implemented by the flash memory 104 (FIG. 2).

The data transmit/receive 11, which may be implemented by the network I/F 111 (FIG. 2), transmits or receives various data or information to or from another terminal, device, or system, through the communication network 2. In this example, the data transmit/receive 11 starts receiving state information that indicates the operation state of each candidate counterpart terminal 10 from the management system 50, before starting communication with any counterpart terminal 10B.

The state information of the terminal 10 indicates whether the terminal 10 is online or offline. If the terminal 10 is online, the state information of the terminal 10 further indicates whether the terminal 10 is communicating with another terminal 10, waiting for call from another terminal 10, or requesting another terminal 10 to have communication, etc. Further, the state information of the terminal 10 may further indicate whether the terminal 10 is in error state or trouble state, for example, due to disconnection of a cable that connects the terminal 10 with the communication network 2. Further, the state information of the terminal 10 may further indicate whether the terminal 10 is in mute state in which output of sounds or output of images is refrained. In the following examples, the state information of the terminal 10 includes information regarding the operation state of the terminal 10 ("operation state information"), and information regarding the communication state of the terminal 10 ("communication state information").

The operations or functions of the operation input 12 of the terminal 10 of FIG. 5 are performed by the operation button 108 and the power switch 109 (FIG. 2) according to an instruction received from the CPU 101. The operation input 12 receives a user instruction input by the user through the operation button 108 or the power switch 109. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101. When the power of the terminal 10 is turned on, the login request 13 automatically causes the data transmit/receive 11 to send login request information that requests the login process, and a current IP address of the terminal 10, to the management system 50 through the communication network 2. When the power of the terminal 10 is turned off according to a user instruction received from the user through the power switch 109, the login request 13 causes the data transmit/receive 11 to send current state information of the terminal 10 to the management system 50, which indicates that the power of the terminal 10 is turned off. After the state information is sent, the operation input 12 turns off the power of the terminal 10. As the state information of the terminal 10 is sent every time the power is turned off, the management system 50 is able to know that the terminal 10 is off-line in realtime.

The operations or functions of the imaging unit 14 of the terminal 10 of FIG. 5 are performed by the camera 112 and the imaging element I/F 113 according to an instruction received from the CPU 101. The imaging unit 14 takes an image of an object to output image data of the object.

The operations or functions of the sound input 15a of the terminal 10 of FIG. 5 are performed by the microphone 114 and the sound input/output I/F 116 according to an instruction received from the CPU 101. After the microphone 114 converts voice of the user at the terminal 10 to a voice signal, the sound input 15a inputs the voice signal in the form of voice data. The operations or functions of the sound output 15b of the terminal 10 of FIG. 5 are performed by the speaker 115 and the sound input/output I/F 116 according to an instruction received from the CPU 101. The sound output 15b outputs a voice signal of voice data that is received from another terminal 10 through the speaker 115.

The display control 16 may be implemented by the display I/F 117 (FIG. 2), and sends various data to the display 120 for display. More specifically, the display control 16 causes the display 120 that is provided for the request terminal 10A to display a candidate list before the request terminal 10A starts videoconference with a desired counterpart terminal 10B. The candidate list is generated based on the state information of the candidate terminal 10 that is received by the data transmit/receive 11 after the request terminal 10A establishes communication with the management system 50.

Figure 22:
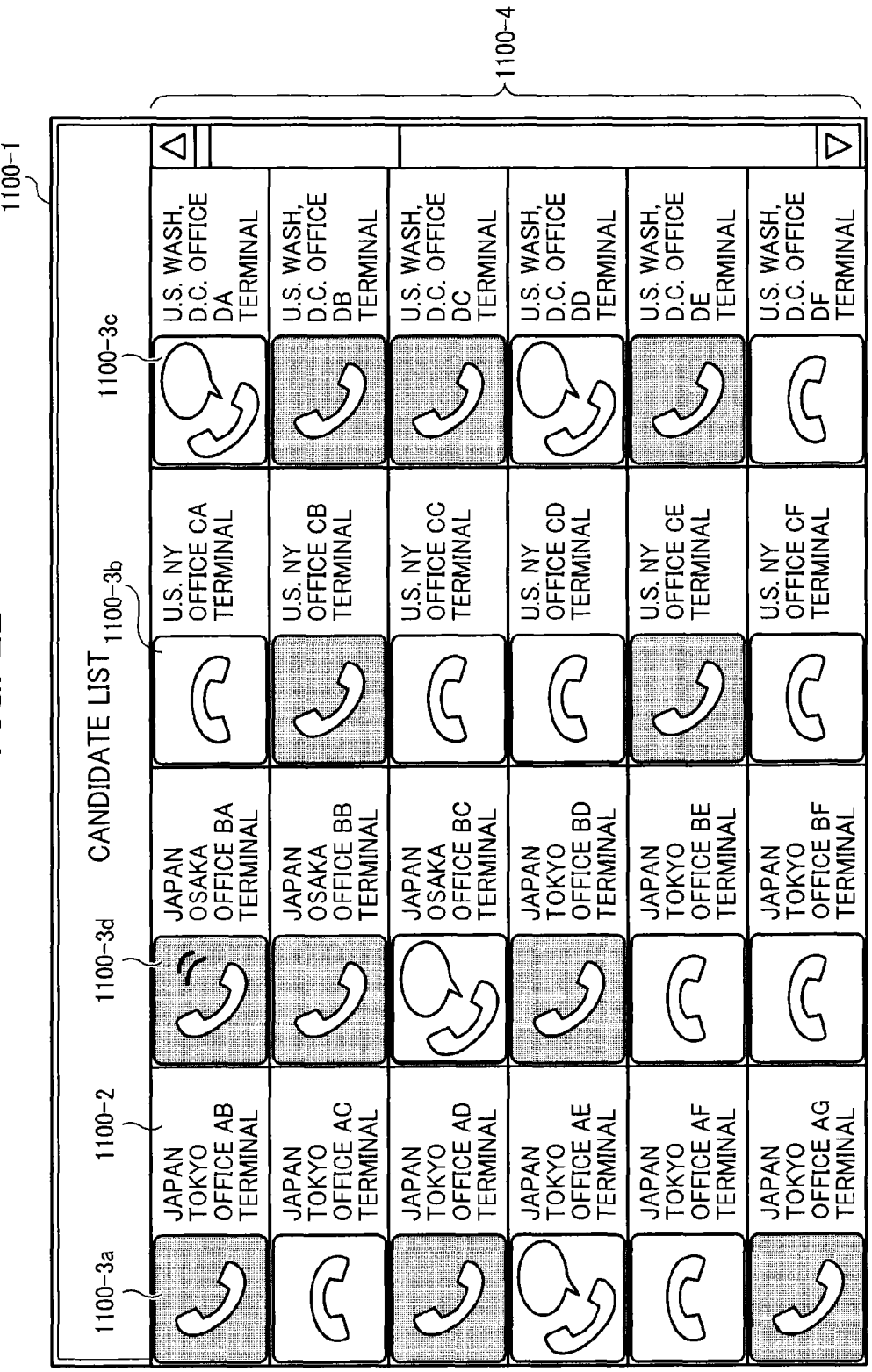
FIG. 22 is an example screen of a candidate list, displayed by a display of the transmission terminal of FIG. 5.

For example, the display control 16 may display a candidate list frame 1100-1 as illustrated in FIG. 22. Within the candidate list frame 1100-1, the display 120 further displays a terminal name 1100-2 of each candidate terminal 10, which may be any type of identification information for identifying each candidate terminal 10. For example, the terminal name 1100-2 for the terminal 10ab of FIG. 1 may be expressed as "JAPAN TOKYO OFFICE AB TERMINAL". For each candidate terminal 10, an icon that reflects the current state of each candidate terminal 10 is displayed side by side with the terminal name 1100-2. In this example shown in FIG. 22, four types of icons 1100-3a, 1100-3b, 1100-3c, and 1100-3d are displayed depending on the current state of the candidate terminal 10 that can be specified by the operation state and the communication state of the candidate terminal 10. For example, the icon 1100-3a indicates that the candidate terminal 10 is online, not communicating with any terminal, and available for communication, based on the operation state "ONLINE" and the communication state "None". The icon 1100-3b indicates that the candidate terminal 10 is offline and not available for communication, based on the operation state "OFFLINE". The icon 1100-3c indicates that the candidate terminal 10 is online, communicating with another terminal, and available for communication, based on the operation state "ONLINE" and the communication state "Busy". The icon 1100-3d indicates that the candidate terminal 10 is online, and requesting another terminal to have communication or is being requested by another terminal to have communication such that the candidate terminal 10 is not available for communication, based on the operation state "ONLINE" and the communication state "Calling" or "Ringing". Alternatively, the icon 1100-3d indicates that the candidate terminal 10 is online, and about to start communication with another terminal as a request for starting communication is accepted such that it is not available for communication, based on the operation state "ONLINE" and the communication state "Accepted". For the descriptive purposes, any one of the icons 1100-3a to 1100-3d is referred to as the icon 1100-3.

Within the candidate list frame 1100-1, the display 120 further displays a scroll bar 1100-4 at the right side. According to selection of one of the arrows made by the user at the terminal 10, the display 120 scrolls up or down to show a complete list of terminal names 1100-2 of candidate terminals 10 and icons 1100-3 each of which reflects the state of each candidate terminal 10.

The delay detector 18 detects a delay time ms indicating a time period in which contents data such as image data or sound data sent through the relay terminal 30 from another terminal 10 is delayed, according to an instruction received from the CPU 101 (FIG. 2).

The memory control 19 is implemented by the SSD 105 (FIG. 2) according to an instruction received from the CPU 101. The memory control 19 stores various data in the nonvolatile memory 1000, or read out various data from the nonvolatile memory 1000. The nonvolatile memory 1000 stores therein various data such as terminal identification (ID) information for identifying the terminal 10, a password for authenticating a user at the terminal 10, image data, and sound data such as voice data. The memory control 19 further stores various data in the volatile memory 1100, or reads out various data from the volatile memory 1100. The volatile memory 1100 overwrites its memory space to store image data and/or sound data such as voice data every time the terminal 10 communicates with another terminal 10. Before overwriting image data with new image data, the memory control 19 reads out the image data for display on the display 120, and the sound data for output through the speaker 115.

The candidate list generator 20 generates or updates a candidate list, based on the candidate list information and the state information of the candidate terminal 10 that are respectively received from the management system 50. For example, as illustrated in FIG. 22, the candidate list includes the icon 11-3 that reflects the current state of each candidate terminal 10.

In this example, any one of the terminal ID of the terminal 10 and the relay terminal ID of the relay terminal 30 includes any type of identification information that can be expressed by any language, character, symbol, mark, or any combination of language, character, symbol, and mark.

(Functional Structure of Relay Terminal)

Still referring to FIG. 5, a functional structure of the relay terminal 30 is explained. The relay terminal 30 includes a data transmit/receive 31, a state detector 32, a data quality checker 33, a data quality manager 34, a data quality changer 35, and a memory control 39. Upon execution, the CPU 201 (FIG. 3) loads the relay terminal control program from the HD 204 onto the RAM 203 to cause one or more of the units illustrated in FIG. 3 to perform functions or operations shown in FIG. 5. The relay terminal 30 further includes a nonvolatile memory 3000 that may be implemented by the HD 204 (FIG. 3). Various data stored in the nonvolatile memory 3000 is not deleted even when the power of the relay terminal 30 is turned off.

(Data Quality Management Table)

The nonvolatile memory 3000 includes a data quality management database (DB) 3001, which stores a data quality management table illustrated in FIG. 8. The data quality management table of FIG. 8 stores an Internet protocol (IP) address of the counterpart terminal 10B to which image data is transmitted through the relay terminal 30, in association with quality of image data to be transmitted through the relay terminal 30 to the counterpart terminal 10B.

Referring now to FIGS. 9A to 9C, various image data having different resolution levels, which are respectively transmitted by the terminal 10 of the transmission system 1, are explained. Referring to FIG. 9A, the low-level resolution image data, which functions as a base image, has 160 pixels in the horizontal direction and 120 pixels in the vertical direction. Referring to FIG. 9B, the medium-level resolution image data has 320 pixels in the horizontal direction and 240 pixels in the vertical direction. Referring to FIG. 9C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with sound data such as voice data.

For example, the data quality management table of FIG. 8 indicates that, in case of relaying image data to the counterpart terminal 10 having the IP address of "1.3.2.4", the quality of the image data to be relayed is high image quality.

<Functional Structure Of Relay Terminal>

Next, a functional structure of the relay terminal 30 is explained according to an example embodiment of the present invention. More specifically, in this example, the operations or functions that are performed by the relay terminal 30, which include the operations or functions performed by the units shown in FIG. 5, are performed in relation to one or more hardware devices of the relay terminal 30 that are shown in FIG. 3.

The data transmit/receive 31 of FIG. 5 is implemented by the network I/F 209 of FIG. 3 according to an instruction received from the CPU 201. The data transmit/receive 31 transmits or receives various data or information to or from another terminal, device, or system through the communication network 2.

The state detector 32, which is implemented by the CPU 201 of FIG. 3, detects an operation state of the relay terminal 30. The operation state includes the on-line state ("ON LINE"), the off-line state ("OFF LINE"), and the error state, etc. The on-line state is a state in which the relay terminal 30 is turned on and available for data transmission/reception. The off-line state is a state in which the relay terminal 30 is not available for data transmission/reception, for example, as the power is not turned on. The error state is a state in which the relay terminal 30 is not available due to an error.

The data quality checker 33, which is implemented by the CPU 201 of FIG. 3, searches the data quality management DB 3001 (FIG. 8) using the IP address of the counterpart terminal 10B as a search key to extract information regarding the quality of image data suitable to communication with the counterpart terminal 10B. Based on the extracted information regarding the quality of image data, the relay terminal 30 determines the quality of image data to be transmitted to the counterpart terminal 10B.

The data quality manager 34, which may be implemented by the CPU 201 of FIG. 3, changes the contents of the data quality management DB 3001 based on the quality information that is received from the transmission management system 50. For example, assuming that the request terminal 10*aa* having the terminal ID "01*aa*" communicates with the counterpart terminal 10*db* having the terminal ID "01*db*" to transmit or receive high quality image data during videoconference, transmission of image data may delay for various reasons. For example, if a request terminal 10*bb* and a counterpart terminal 10*ca* start videoconference over the communication network 2, transmission of image data from the request terminal 10*aa* to the counterpart terminal 10*db* tends to slow down due to the increase in traffic. In such case, the relay terminal 30 changes the quality of image data to be transmitted from high image quality to lower image quality. More specifically, the contents in the data quality management DB 3001 is changed from high-level image quality to medium-level image quality, based on the quality information indicating the use of medium-level image quality.

The data quality changer 35, which may be implemented by the CPU 201 of FIG. 3, changes the quality of image data received from the request terminal 10 to the quality of image data according to the contents of the data quality management DB 3001. The memory control 39 is implemented by the HDD 205 of FIG. 3 according to an instruction received from the CPU 201. The memory control 39 stores various data in the nonvolatile memory 3000, or reads out various data from the nonvolatile memory 3000.

<Functional Structure of Transmission Management System>

Next, a functional structure of the management system 50 is explained according to an example embodiment of the present invention. The management system 50 includes a data transmit/receive 51, a terminal authenticator 52, a state manager 53, a terminal extractor 54, a terminal state obtainer 55, a relay terminal selector 55, a session manager 57, a quality determiner 58, a memory control 59, a delay time manager 60, a change request determiner 61, a connection determiner 62, and a calculator 63. Upon execution, the CPU 201 (FIG. 3) loads the transmission management program from the HD 204 onto the RAM 203 to cause the units shown in FIG. 3 to perform operations or functions as illustrated in FIG. 5. The management system 50 further includes a nonvolatile memory 5000, which may be implemented by the HD 204 of FIG. 3. Various data stored in the nonvolatile memory 5000 is not deleted after the power of the management system 50 is turned off. The nonvolatile memory 5000 stores data regarding the candidate list frame 1100-1 (FIG. 22). The management system 50 further includes a volatile memory 5100, which may be implemented by the RAM 203 (FIG. 3).

(Relay Terminal Management Table)

The nonvolatile memory 5000 includes a relay terminal management database (DB) 5001, which stores therein a relay terminal management table of FIG. 10. The relay terminal management table of FIG. 10 stores, for each relay terminal ID of the terminal 30, the operation state of the relay terminal 30, the received date and time at which the management system 50 receives the state information indicating the operation state of the relay terminal 30 from the relay terminal 30, the IP address of the relay terminal 30, and the maximum data transmission speed of the relay terminal 30 in Mbps. For example, for the relay terminal 30a having the relay terminal ID "111a", the relay terminal management table of FIG. 10 indicates that the operation state is "ON LINE", the received date and time at which the management system 50 receives the state information is "13:00 PM of Nov. 10, 2009", the IP address of the relay terminal 30a is "1.2.1.2", and the maximum data transmission speed of the relay terminal 30a is 100 Mbps.

(Terminal Authentication Management Table)

The nonvolatile memory 5000 further includes a terminal authentication management database (DB) 5002, which stores a terminal authentication management table of FIG. 11. The terminal authentication management table of FIG. 11 stores a plurality of terminal IDs respectively assigned to the terminals 10 that are managed by the management system 50, in association with a plurality of passwords that are previously determined for the respective terminals 10. For example, referring to the terminal authentication management table of FIG. 11, the terminal 10aa having the terminal ID "01aa" is assigned with the password "aaaa".

(Terminal Management Table)

The nonvolatile memory 5000 further includes a terminal management database (DB) 5003, which stores a terminal management table of FIG. 12. The terminal management table of FIG. 12 stores, for each one of the terminal IDs assigned to the terminals 10, the terminal name to be used for communication with the terminal 10, the operation state of the terminal 10, the communication state of the terminal 10, the received date and time at which the management system 50 receives the login request information from the terminal 10, and the IP address of the terminal 10. For example, for the terminal 10aa having the terminal ID "01aa", the terminal management table of FIG. 12 indicates that the terminal name is "Japan Tokyo Office AA terminal", the operation state is on-line ("ONLINE"), the communication state is "None" indicating that it is not communicating with another terminal and is available for communication, the received date and time is "13:40 PM, Nov. 10, 2009", and the IP address of the terminal 10aa is "1.2.1.3". Examples of the communication state include the "Calling" state in which the terminal 10 is requesting another terminal to have communication with, the "Ringing" state in which the terminal 10 is being requested by another terminal to have communication with, the "Accepted" state in which the terminal 10 has accepted a call from another terminal or the call from the terminal 10 is accepted by another terminal, and the "Busy" state in which the terminal 10 is communicating with another terminal.

(Candidate List Management Table)

The nonvolatile memory 5000 further includes a candidate list management database (DB) 5004, which stores a candidate list management table of FIG. 13. The candidate list management table of FIG. 13 stores, for each one of a plurality of request terminals 10A capable of requesting for videoconference communication, the terminal ID of the request terminal 10A, and one or more terminal IDs that are respectively assigned to candidate terminals 10 that are previously registered for the request terminal 10A. In this example, for the request terminal 10A, one or more terminals 10 of the transmission system 1 of FIG. 1 are previously registered as the candidate terminal 10. For example, the candidate list management table of FIG. 13 indicates that the request terminal 10aa having the terminal ID "01aa" is most likely to request for videoconference with respect to the terminal 10ab having the terminal ID "01ab", the terminal 10ba having the terminal ID "01ba", and the terminal 10db having the terminal ID "01db". The management system 50 manages the candidate list management table of FIG. 13, for example, according to a user instruction received from any one of the terminals 10. For example, in response to a user instruction received from the terminal 10aa, the management system 50 may add or delete the contents of the candidate list management table.

(Session Management Table)

The nonvolatile memory 5000 further includes a session management database (DB) 5005, which stores a session management table of FIG. 14. The session management table of FIG. 14 stores information regarding each of the sessions that are carried out by at least two terminals 10 of the transmission system 1. More specifically, for each session ID that uniquely identifies each session, the session management table of FIG. 14 stores a relay terminal ID of the relay terminal 30 to be used for transmitting or receiving contents data such as image data and sound data, a terminal ID of the request terminal 10A, a terminal ID of the counterpart terminal 10B, a delay time ms indicating a time period required for receiving contents data at the counterpart terminal 10B, the date and time information indicating the time at which the management system 50 receives delay information from the counterpart terminal 10B. For example, referring to the session management table of FIG. 14, for the session having the session ID "se1", the relay terminal 30e having the relay terminal ID "111e" is selected to relay contents data between the request terminal 10aa having the terminal ID "01aa" and the counterpart terminal 10db having the terminal ID "01db". Further, the management system 50 receives the delay information from the counterpart terminal 10db at 14:00 PM, Nov. 10, 2009. Based on this date and time information, the delay time ms of 200 milliseconds (ms) is obtained. In case of having videoconference between only two terminals 10, the delay time may be determined based on the time when the management system 50 receives the delay information transmitted from the request terminal 10A rather than based on the time when the management system 50 receives the delay information transmitted from the counterpart terminal 10B. In case of having videoconference with more than two terminals 10, the delay information transmitted from the counterpart terminal 10B that receives the contents data is used to manage the date and time at which the delay information is received.

(Quality Management Table)

The nonvolatile memory 5000 further includes a quality management database (DB) 5007, which stores a quality management table of FIG. 15. The quality management table of FIG. 15 stores the delay time ms of image data in association with the quality of image data. More specifically, the quality management table of FIG. 15 indicates that the quality of image data to be processed by the relay terminal 30 is lowered, as the delay time ms of the image data at the request terminal 10A or the counterpart terminal 10B increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

(Relay Terminal Selection Management Table)

The nonvolatile memory 5000 further stores a relay terminal selection management database (DB) 5008, which stores a relay terminal selection management table of FIG. 16. The relay terminal selection management table of FIG. 16 stores, for each of the terminal IDs of the terminals 10 that are managed by the management system 50, the relay terminal ID of the relay terminal 30 that is used for relaying contents data.

(State Change Management Table)

The nonvolatile memory 5000 further stores a state change management DB 5009, which stores a specific rule used for managing the communication state of the terminal 10, for example, in the form of a state change management table of FIG. 17 and a state change management table of FIG. 18. The state change management table of FIG. 17 stores change request data indicating a request for changing the communication state of the terminal 10, previous state data indicating the communication state before being changed by a state changer 53c of the state manager 53, and changed state data indicating the communication state after being changed by the state changer 53c of the state manager 53, in association with one another. The state change management table of FIG. 18 stores change request data, terminal data for identifying the request terminal 10A and the counterpart terminal 10B, previous state data of the request terminal 10A and the counterpart terminal 10B, and changed state data of the request terminal 10A and the counterpart terminal 10B, in association with one another.

Examples of the change request data include, but not limited to, the "Invite" indicating that a request for starting communication with a counterpart terminal 10A is requested by a request terminal 10A, the "Accept" indicating that the request for starting communication with the request terminal 10A is accepted by the counterpart terminal 10B, the "Call" indicating that a request for participating in a session that is already established by participating terminals 10 is requested by a participation requesting terminal 10, the "Join" indicating that a request for establishing a contents data session through the relay terminal 30 is requested by a request terminal 10A to start relaying of contents data, and the "Leave" indicating that a request for disconnecting the contents data session with the relay terminal 30 is requested by a request terminal 10A to end relaying of contents data. In alternative to or in addition to the above-listed change request data, any desired type of change request data may be managed including, for example, the "Reject" indicating that the request is rejected or the "Cancel" indicating that the request is canceled.

Further, in this example, the state change management table of FIG. 17 stores previous state data and changed state data of the terminal 10, for the change request data "Call", "Join", and "Leave", as these types of change request data cause any one of the request terminal 10A and the counterpart terminal 10B to change its communication state in the same manner. The state change management table of FIG. 18 stores previous state data and changed state data, respectively for the request terminal 10A and the counterpart terminal 10B, for the change request data "Invite" and "Accept", as these types of change request data cause the request terminal 10A and the counterpart terminal 10B to change its communication state in a different manner.

When the change request data is detected, the management system 50 determines whether to change the communication state of the request terminal 10A or the counterpart terminal 10B using the state change management table. When the communication state is to be changed, the management system 50 changes the communication state of the request terminal 10A or the counterpart terminal 10B using the state change management table.

For example, referring to the state change management table of FIG. 18, when the change request data "Invite" that requests the counterpart terminal 10B to start communication is received from the request terminal 10A, the state manager 53 of the management system 50 changes the communication state of the request terminal 10A from the previous communication state "None" to the changed communication state "Calling". The state manager 53 further changes the communication state of the counterpart terminal 10B from the previous communication state "None" to the changed communication state "Ringing".

Now, the functional structure of the management system 50 is explained. The data transmit/receive 51, which may be implemented by the network I/F 209 (FIG. 3) according to an instruction received from the CPU 201, transmits or receives various data or information to or from another terminal, device, or system through the communication network 2.

Under control of the CPU 201 (FIG. 3), the terminal authenticator 52 obtains a terminal ID and a password from the login request information that is received from the data transmit/receive 51. Using the terminal ID and the password as a search key, the terminal authenticator 52 searches the terminal authentication management DB 5002 (FIG. 11) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 3), includes a state set 53a, a state obtainer 53b, and the state changer 53c as illustrated in FIG. 6. The state set 53a manages information stored in the terminal management table of FIG. 12 by changing from the operation state "OFFLINE" to the operation state "ONLINE" when the operation state information indicating that the power is turned on is received from the terminal 10 as the power switch 109 of the terminal 10 is turned on by the user. The state set 53a further manages information stored in the terminal management table of FIG. 12 by changing the operation state "ONLINE" to the operation state "OFFLINE" when the operation state information indicating that the power is turned off is received from the terminal 10 as the power switch 109 of the terminal 10 is turned off by the user.

When the change request data is received at the data transmit/receive 51 from the request terminal 10A or the counterpart terminal 10B, the state obtainer 53b obtains the state information of the request terminal 10A or the counterpart terminal 10B from the terminal management table of FIG. 12.

The state changer 53c changes the state information of the request terminal 10A or the counterpart terminal 10B that is managed by the terminal management table of FIG. 12, based on the change request data received at the data transmit/receive 51.

The terminal extractor 54, which operates according to an instruction received from the CPU 201 (FIG. 3), searches the candidate list management DB 5004 (FIG. 13) using the terminal ID of the request terminal 10A as a key to obtain a list of terminal IDs each being assigned to a plurality of candidate terminals 10. Additionally, the terminal extractor 54 searches the candidate list management DB 5004 (FIG. 13) using the terminal ID of the request terminal 10A as a key to obtain a terminal ID of another request terminal 10A that registers the request terminal 10A as a candidate terminal for another request terminal 10A.

The terminal state obtainer 55, which operates under control of the CPU 201 (FIG. 3), searches the terminal management DB 5003 (FIG. 12) using the terminal ID of each candidate terminal 10 that is extracted by the terminal extractor 54 as a key to obtain the state information of each candidate terminal 10. The terminal state obtainer 55 obtains the state information of each of the candidate terminal 10 that is previously determined for the request terminal 10A that sends the login request information. Further, the terminal state obtainer 55 searches the terminal management DB 5003 using the terminal ID extracted by the terminal extractor 54 as a key to obtain the state information of the request terminal 10A that sends the login request information.

The relay terminal selector 56, which operates according to an instruction received from the CPU 201 (FIG. 3), selects one relay terminal 30 from the plurality of relay terminals 30. As illustrated in FIG. 7, the relay terminal selector 56 includes a session ID generator 56a, a relay terminal extractor 56b, and a selector 56c.

The session ID generator 56a of the relay terminal selector 56 generates a session ID for identifying a session in which contents data is transmitted or received between or among the terminals 10. The relay terminal extractor 56b extracts the terminal ID of the request terminal 10A and the terminal ID of the counterpart terminal 10B respectively from the request information received from the request terminal 10A, and searches the terminal management DB 5003 (FIG. 12) to obtain the relay terminal ID that is associated with the request terminal 10A and the relay terminal ID that is associated with the counterpart terminal 10B. The selector 56c selects one or more relay terminals 30 having the online state from the relay terminal management DB 5001 (FIG. 10) to obtain the relay terminal ID of the selected relay terminal 30.

Referring back to FIG. 5, the session manager 57, which operates according to an instruction received from the CPU 201, stores the session ID generated by the session ID generator 56a, the terminal ID of the request terminal 10A, and the terminal ID of the counterpart terminal 10B, in a corresponding manner, in the session management DB 5005 (FIG. 14) of the nonvolatile memory 5000. The session manager 57 further stores the relay terminal ID of the relay terminal 30 that is finally selected by the selector 56c for each session ID, in the session management DB 5005 (FIG. 14). For example, when participation request information is received, the session manager 57 searches the session management table of FIG. 14 using the session ID included in the participation request information as a search key to obtain the terminal ID of the request terminal 10A and the terminal ID of the counterpart terminal 10B that are stored with respect to the session ID.

The quality determiner 58, which operates according to an instruction received from the CPU 201 (FIG. 3), searches the quality management DB 5007 (FIG. 15) using the delay time ms obtained for the selected relay terminal 30 to obtain the image data quality that is desirable for communication using the relay terminal 30.

The memory control 59, which is implemented by the HDD 205 (FIG. 3), stores various data in the nonvolatile memory 5000 or reads out various data from the nonvolatile memory 5000. The memory control 59 further stores various data in the volatile memory 5100 or reads out various data from the volatile memory 5100.

The delay time manager 60 searches the terminal management DB 5003 (FIG. 12) using the IP address of the counterpart terminal 10B to obtain the terminal ID of the counterpart terminal 10B. The delay time manager 60 further manages the session management table of FIG. 14 stored in the session management DB 5005 so as to keep updated the value stored in the "delay time" field for the obtained terminal ID of the counterpart terminal 10B.

The connection determiner 62 determines whether the terminal 10 that sends a request for participating in the contents data session "sed" that is established between or among the terminals 10 ("the participation requesting terminal 10") should be allowed to participate in the contents data session. For example, the connection determiner 62 obtains the terminal ID of the participation requesting terminal 10 that sends a request for participating, when such request is received at the data transmit/receive 51. The connection determiner 62 further causes the terminal extractor 54 to extract the terminal IDs of the request terminal 10A and the counterpart terminal 10B that are participating in the contents data session "sed" ("the participating terminal 10"), and obtains a list of terminal IDs of candidate counterpart terminals 10 that are registered for the participating terminal 10. The connection determiner 62 determines whether the terminal ID of the participation requesting terminal 10 that sends the request for participating is included in a list of terminal IDs of the candidate counterpart terminals 10 obtained for the participating terminal 10. When the terminal ID of the participation requesting terminal 10 that sends the request for participating is included in the list, the connection determiner 62 allows the participation requesting terminal 10 that sends the request to participate in the contents data session "sed" that is established between or among the participating terminals 10.

The calculator 63 calculates the value of a distance of the shortest path between the participation requesting terminal 10 that sends the request for participating in the session, and the participating terminal 10 that is participating in the session, for each set of the participation requesting terminal 10 and the participating terminal 10. In calculation, each terminal 10 is treated as a node such that the distance of the shortest path between the nodes, or the terminals, indicates closeness between the terminals that reflect closeness between the users of the terminals. The calculator 63 obtains the largest value of distance of the shortest path between the participation requesting terminal 10 and the participating terminal 10, from the calculated distance values. In calculation, the calculator 63 defines a distance between the request terminal 10A and the candidate counterpart terminal 10 to be a predetermined value. The candidate counterpart terminal 10 is any terminal that is stored in the candidate list management table (FIG. 13) in association with the request terminal 10A. The distance of the shortest path between the participation requesting terminal 10 and the participating terminal 10 is expressed using the predetermined value.

<Operations of Transmission System>

Figure 20:
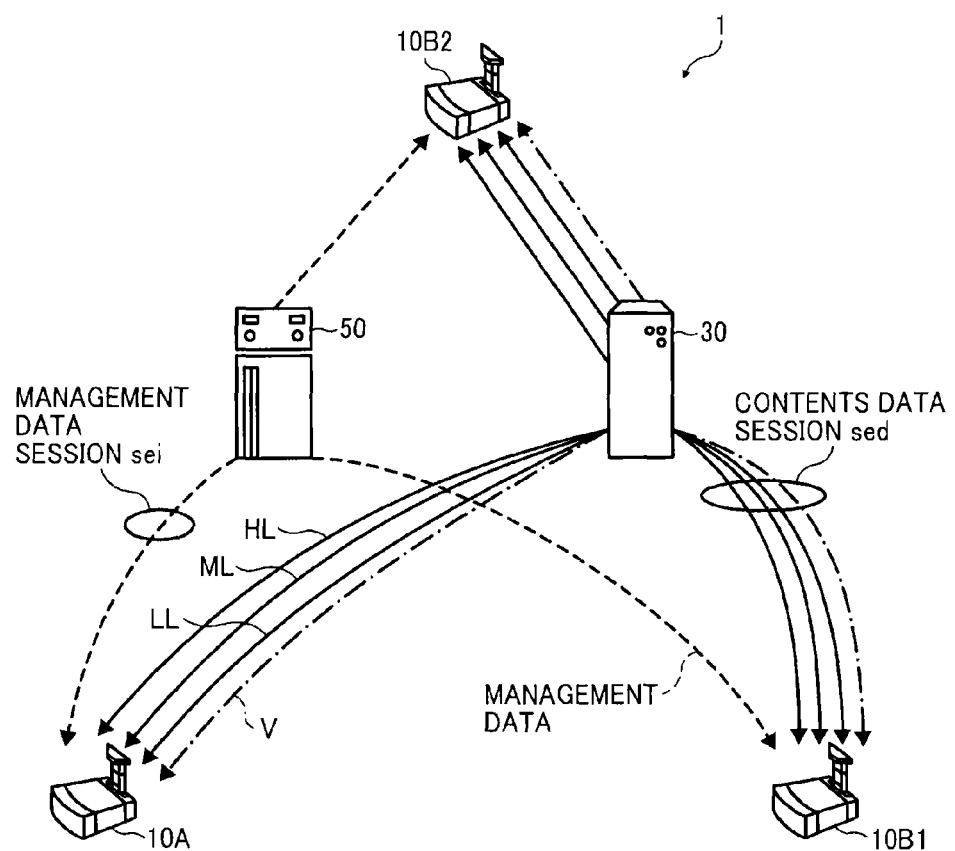
FIG. 20 is an illustration for explaining transmission or reception of data such as image data, sound data, or management data, performed by the transmission system of FIG. 1.
Figure 21B:
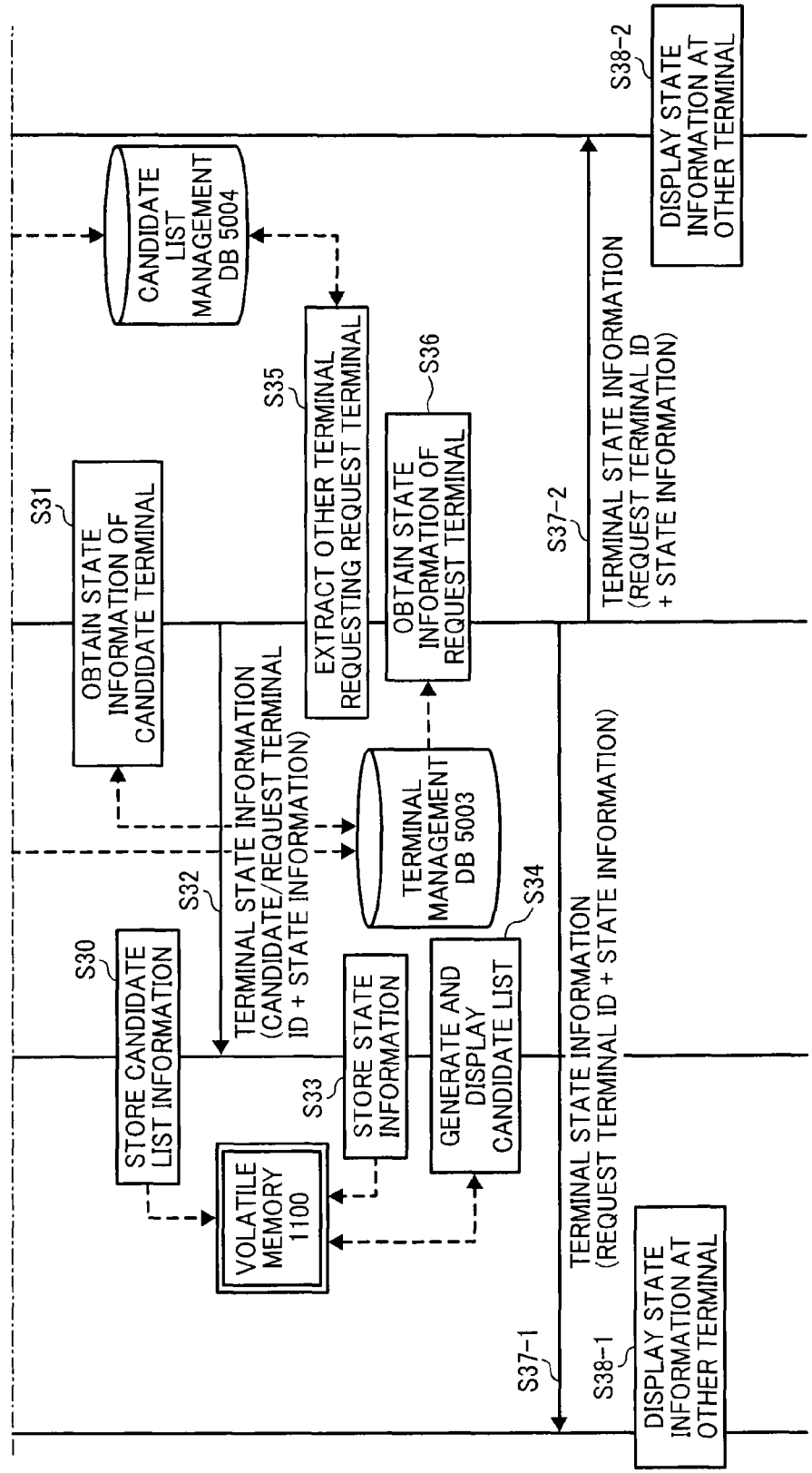
Figure 23:
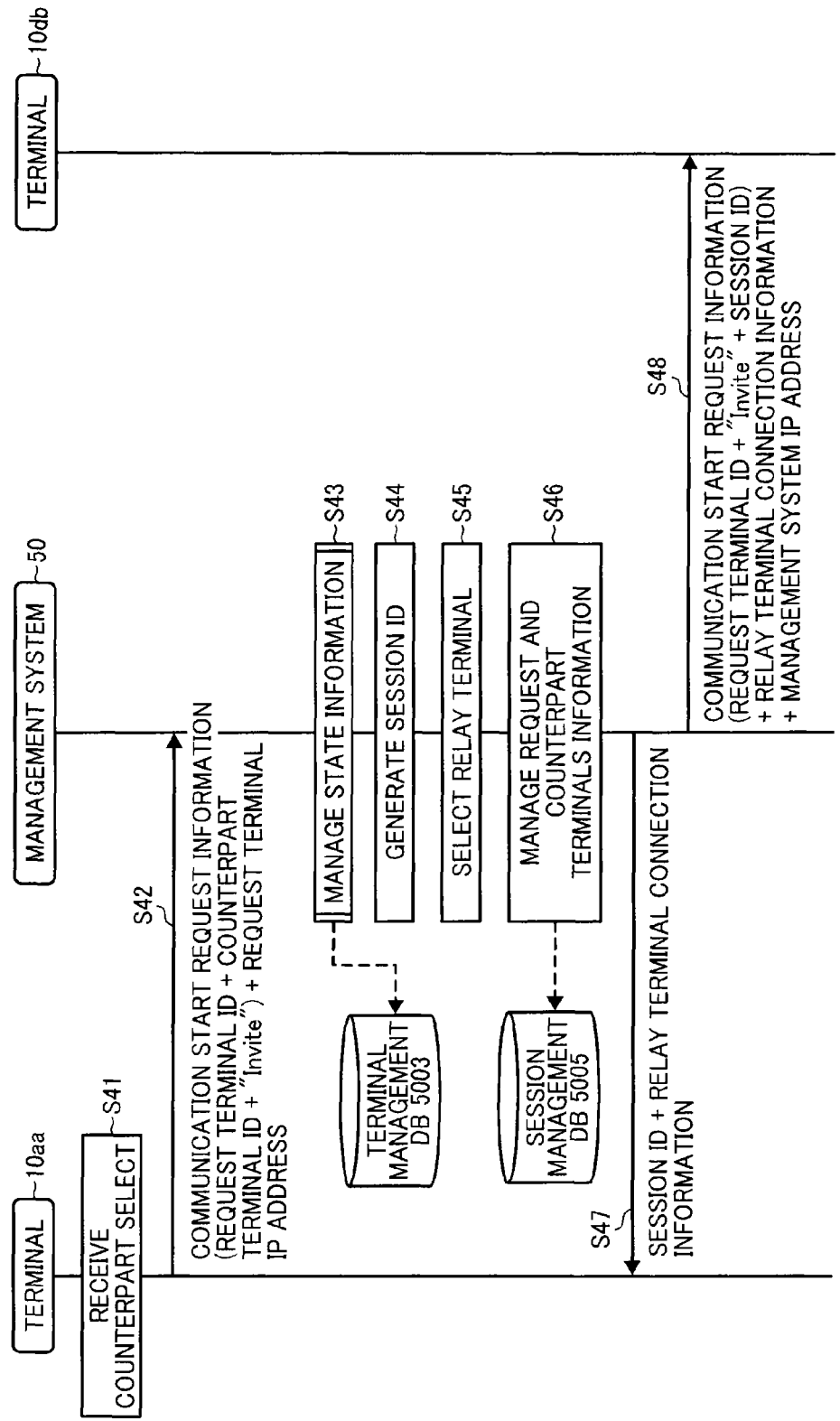
FIG. 23 is a data sequence diagram illustrating operation of managing a request for staring communication with a counterpart terminal that is generated by a request terminal, performed by the transmission system of FIG. 1, according to an example embodiment of the present invention.
Figure 24:
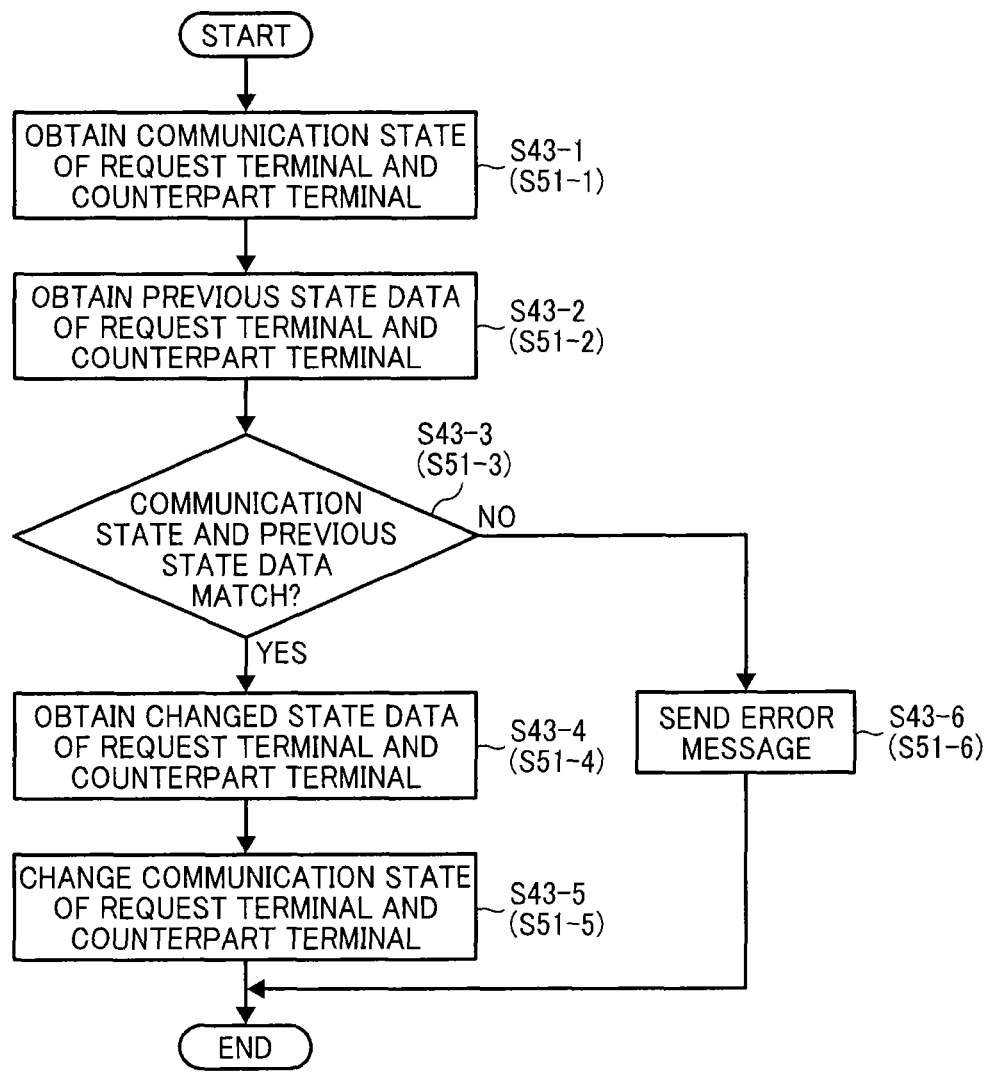
FIG. 24 is a flowchart illustrating operation of changing communication states of the request terminal and the counterpart terminal, performed by the management system of FIG. 5, according to an example embodiment of the present invention.
Figure 25:
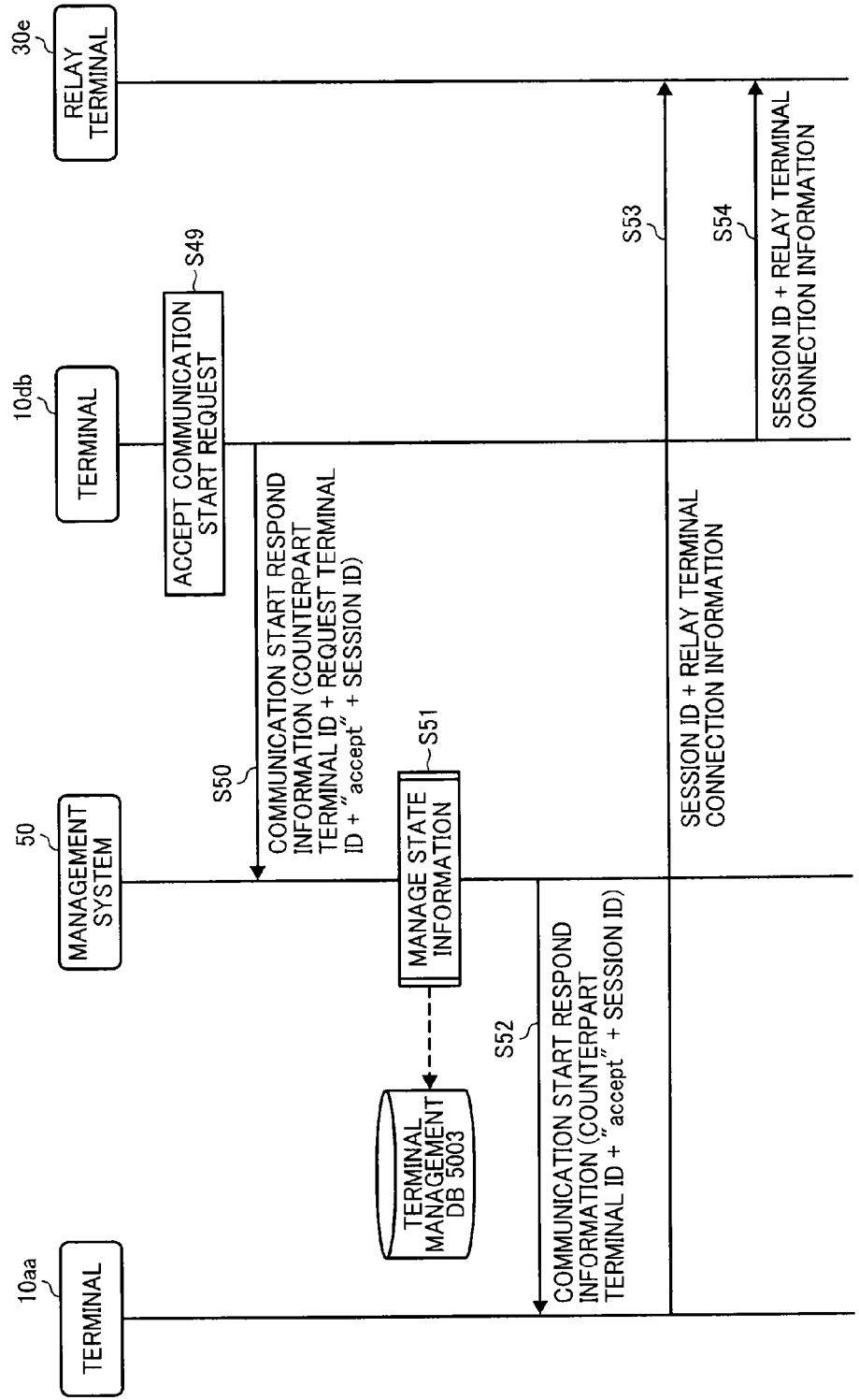
FIG. 25 is a data sequence diagram illustrating operation of managing a response to the request for starting communication with the counterpart terminal, generated by the counterpart terminal, performed by the transmission system of FIG. 1, according to an example embodiment of the present invention.
Figure 26:
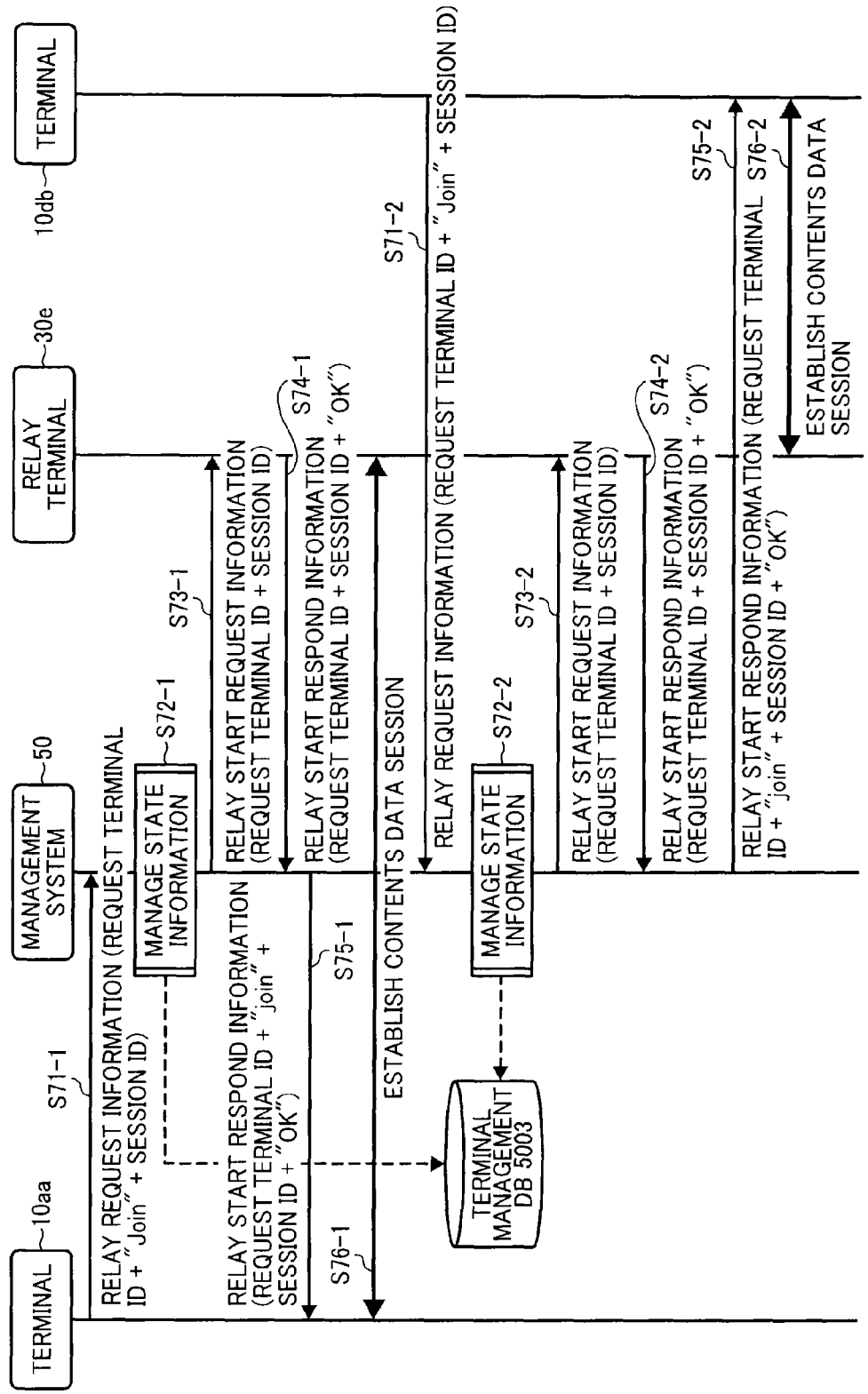
FIG. 26 is a data sequence diagram illustrating operation of managing a request for starting relaying of contents data through a relay terminal that is generated by the request terminal, performed by the transmission system of FIG. 1, according to an example embodiment of the present invention.
Figure 27:
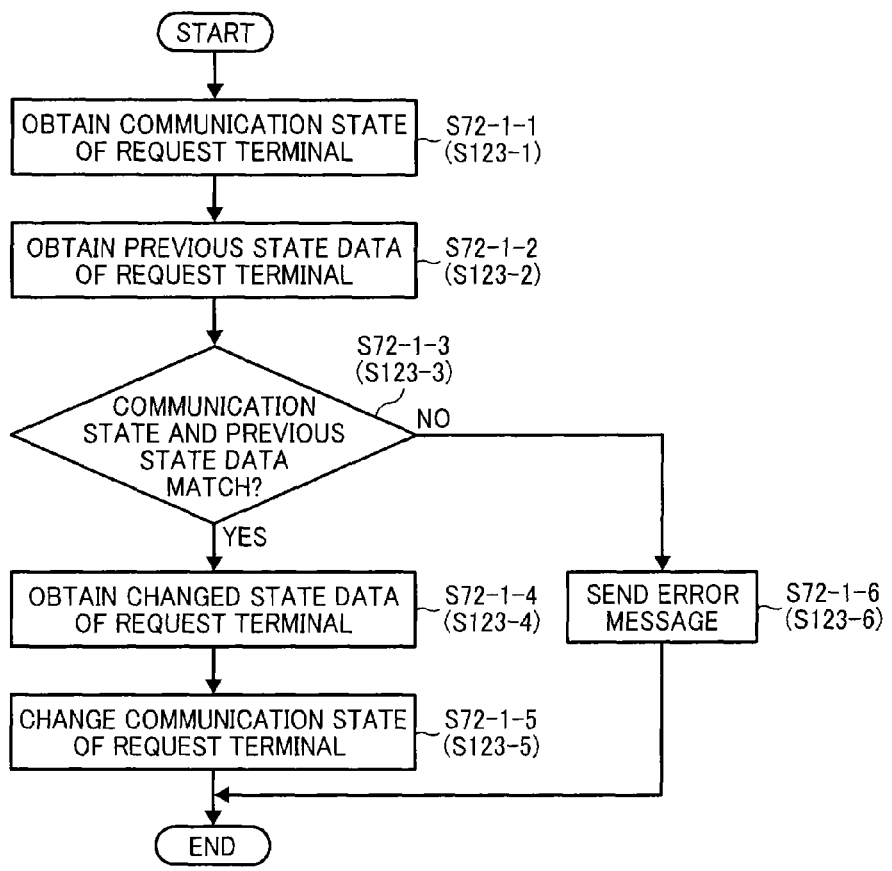
FIG. 27 is a flowchart illustrating operation of changing a communication state of the transmission terminal, performed by the management system of FIG. 5, according to an example embodiment of the present invention.
Figure 28:
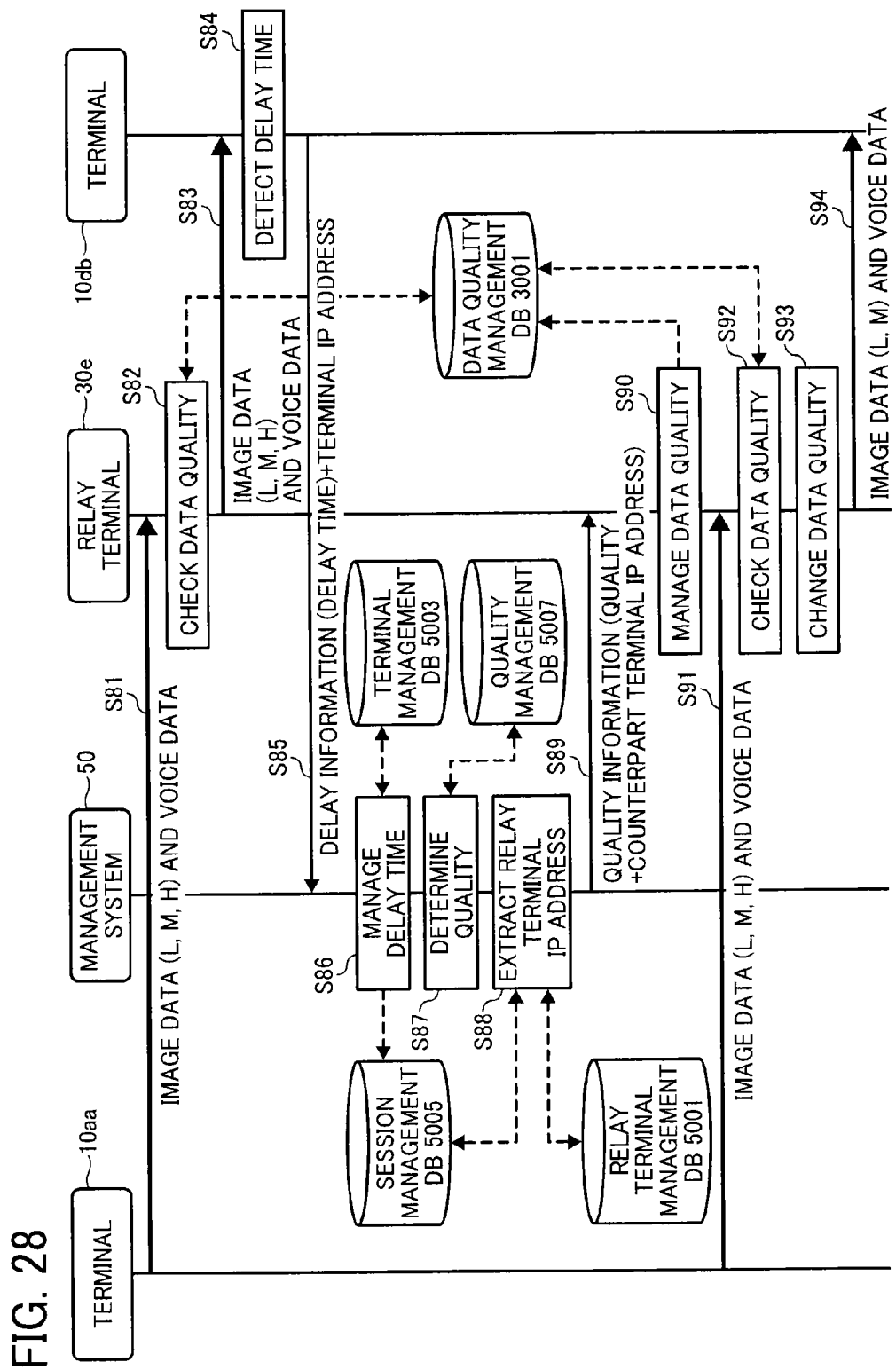
FIG. 28 is a data sequence diagram illustrating operation of transmitting or receiving contents data among the terminals, performed by the transmission system of FIG. 1, according to an example embodiment of the present invention.
Figure 29:
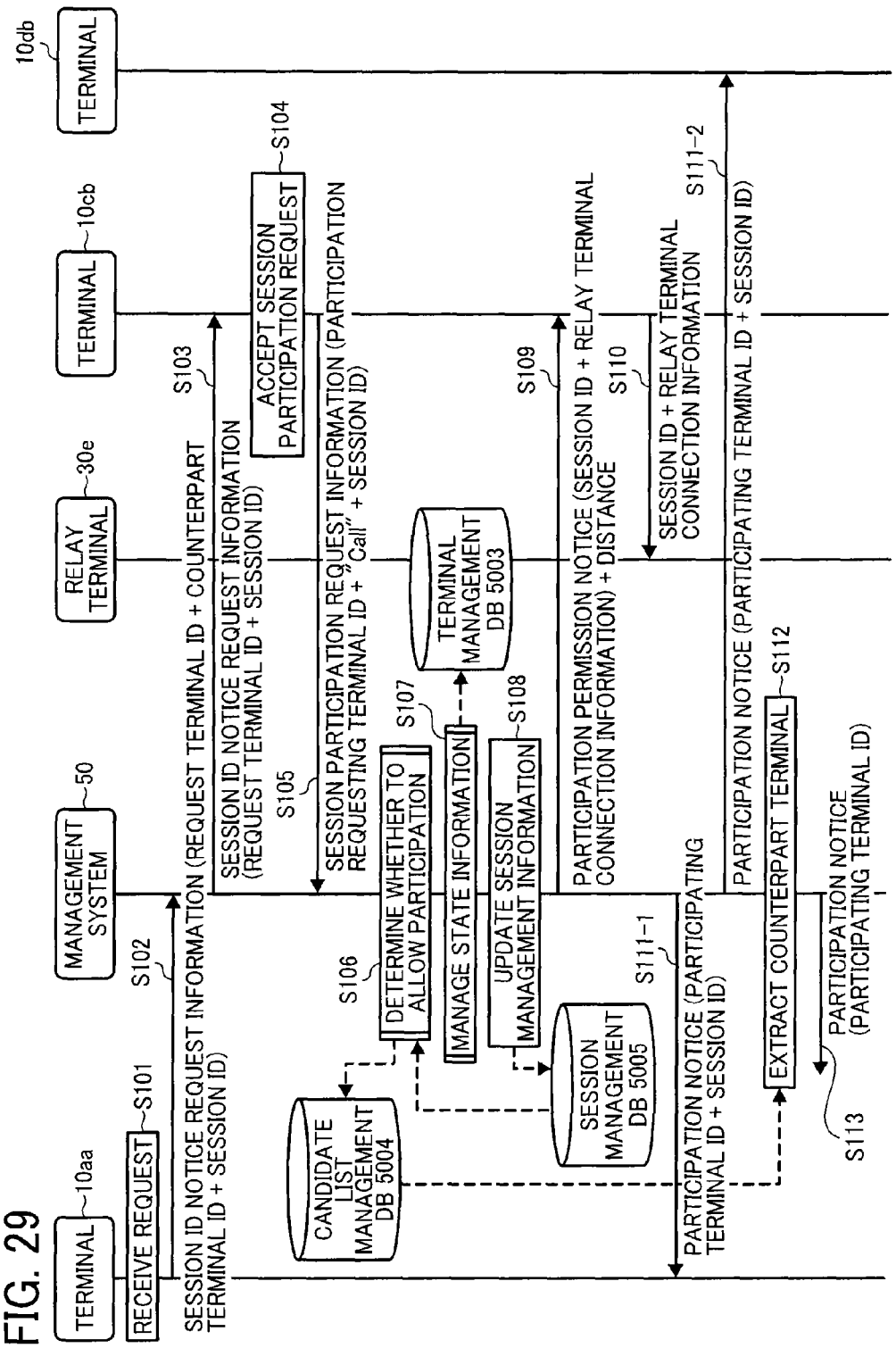
FIG. 29 is a data sequence diagram illustrating operation of managing a request for participating in a contents data session that is established that is generated by a participation requesting terminal, performed by the transmission system of FIG. 1, according to an example embodiment of the present invention.
Figure 30:
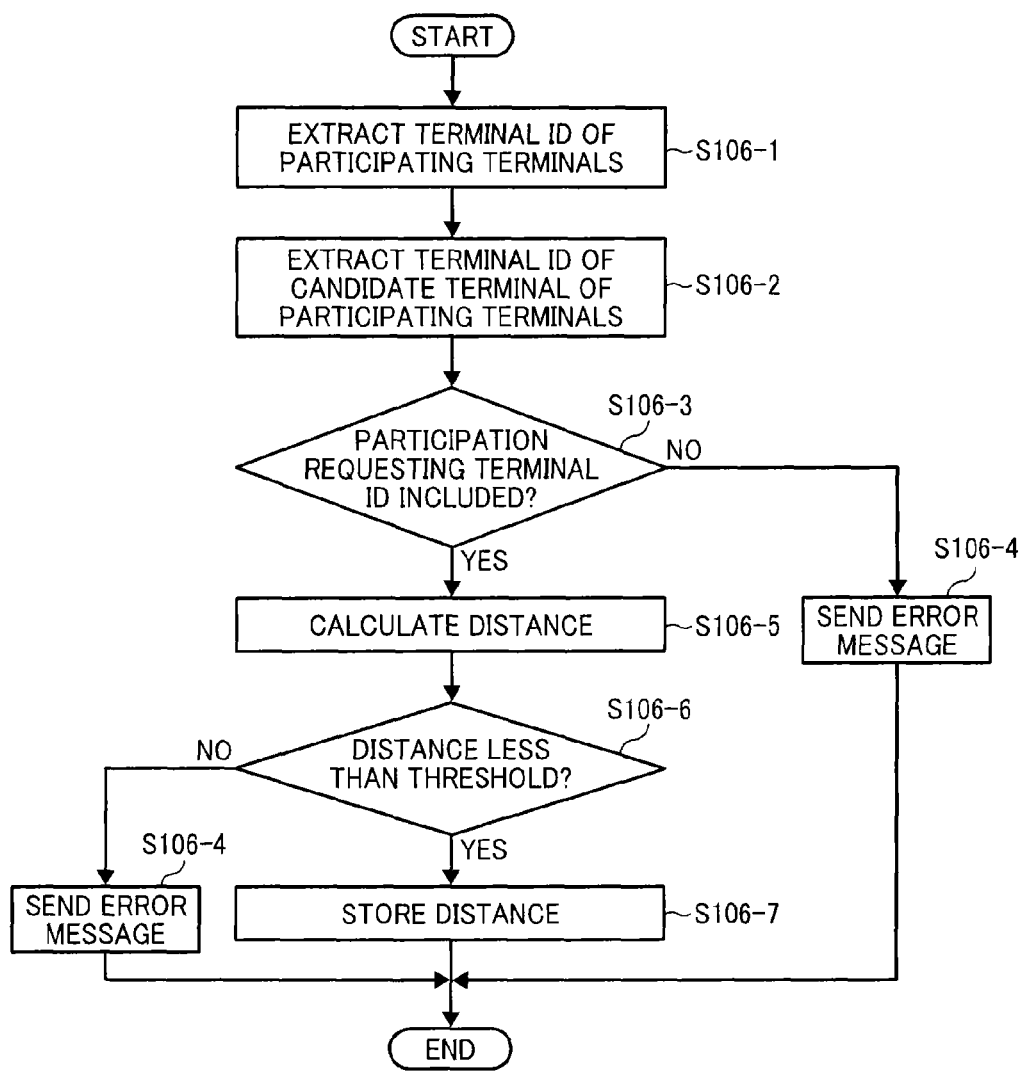
FIG. 30 is a flowchart illustrating operation of determining whether to allow the participation requesting terminal to participate in the contents data session using the candidate list, performed by the management system of FIG. 5, according to an example embodiment of the present invention.
Figure 31:
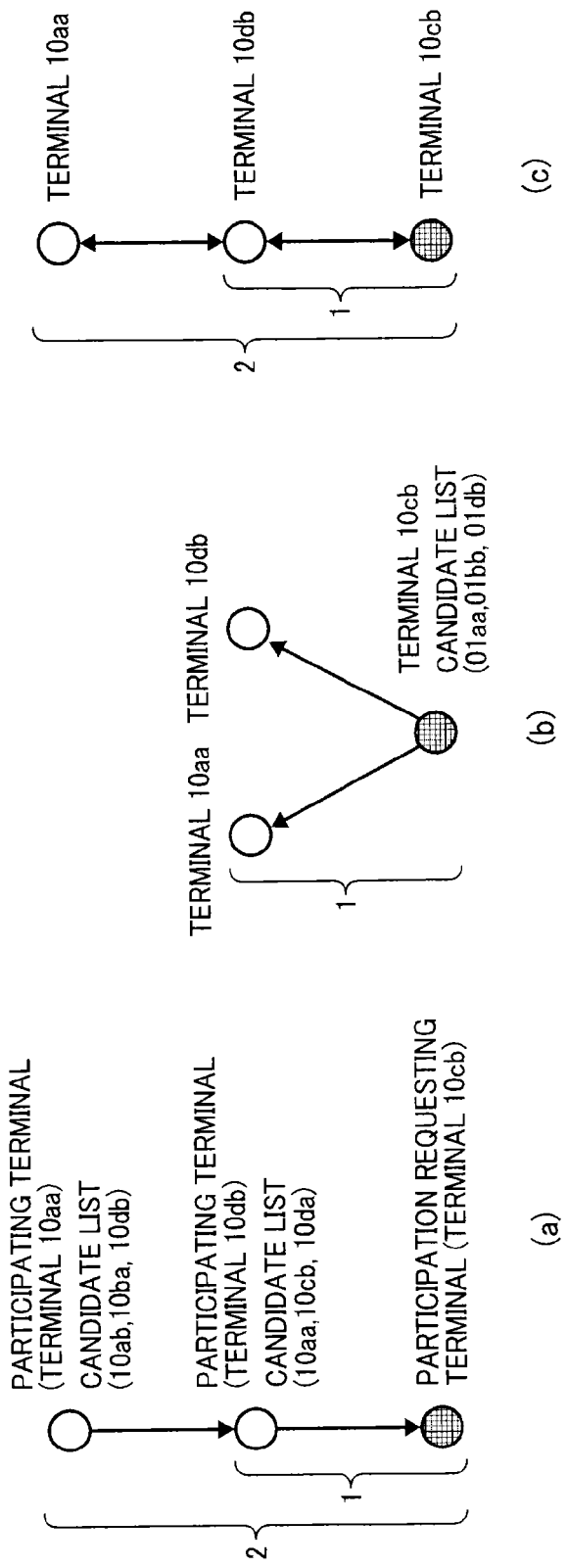
FIG. 31 is an illustration for explaining a distance of the path between the transmission terminals.
Figure 32:
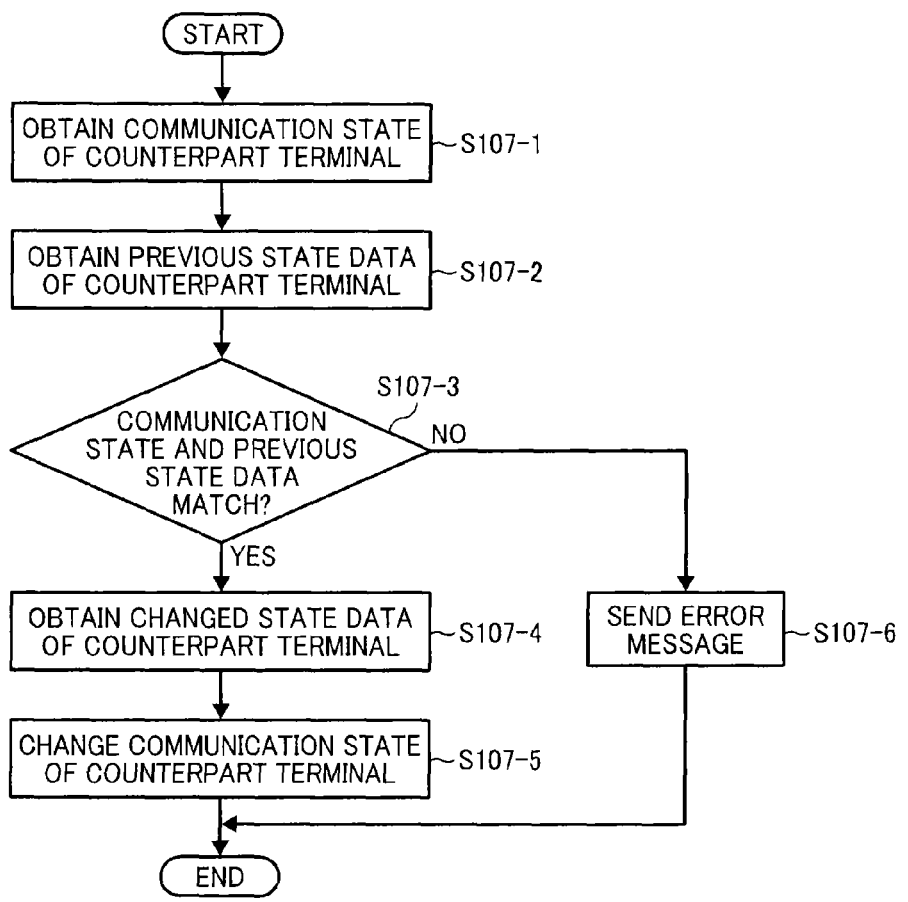
FIG. 32 is a flowchart illustrating operation of changing a communication state of the transmission terminal, performed by the management system of FIG. 5, according to an example embodiment of the present invention.
Figure 33:
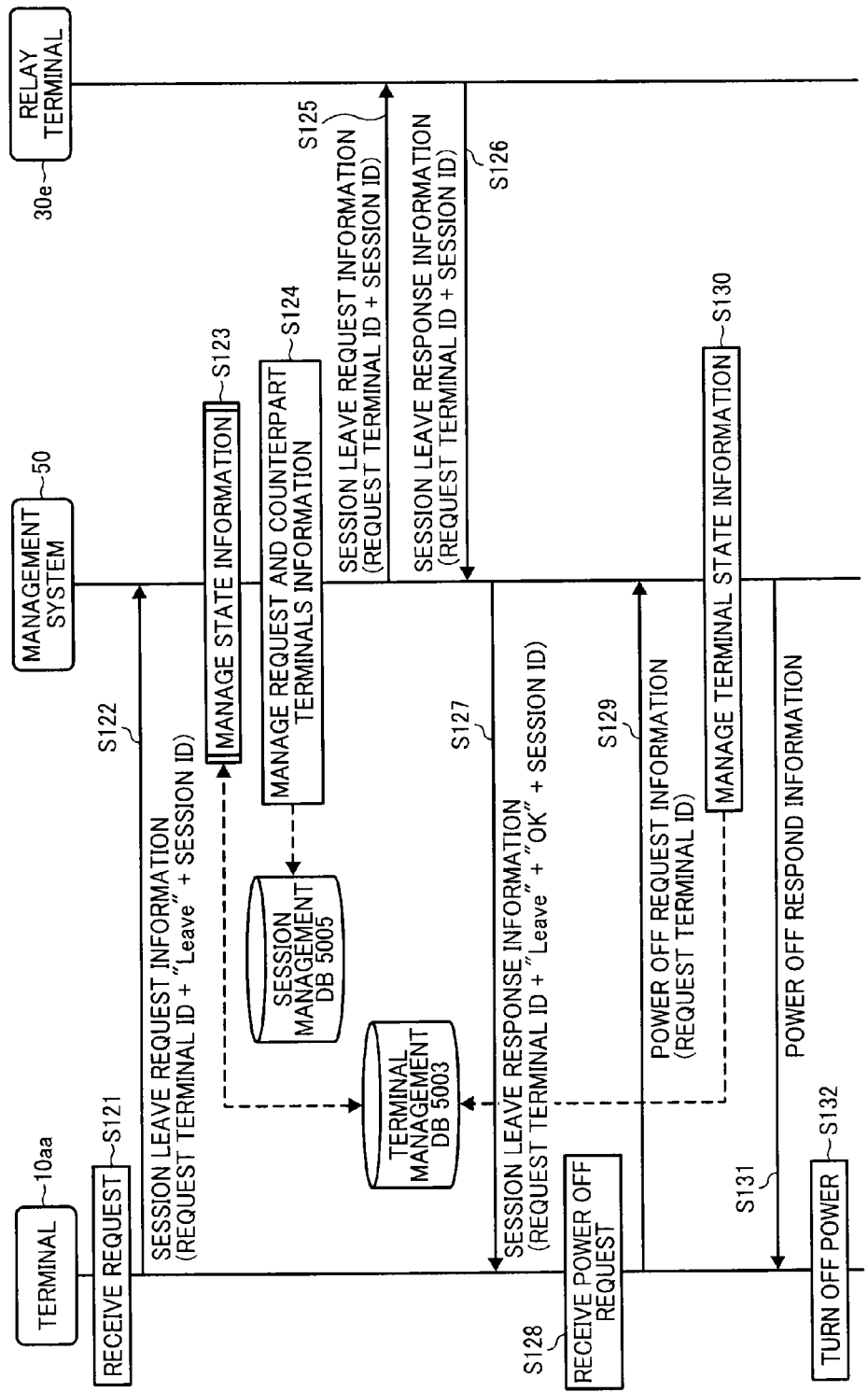
FIG. 33 is a data sequence diagram illustrating operation of managing a request for leaving from the contents data session that is generated by the request terminal, performed by the transmission system of FIG. 1, according to an example embodiment of the present invention.
Figure 34:
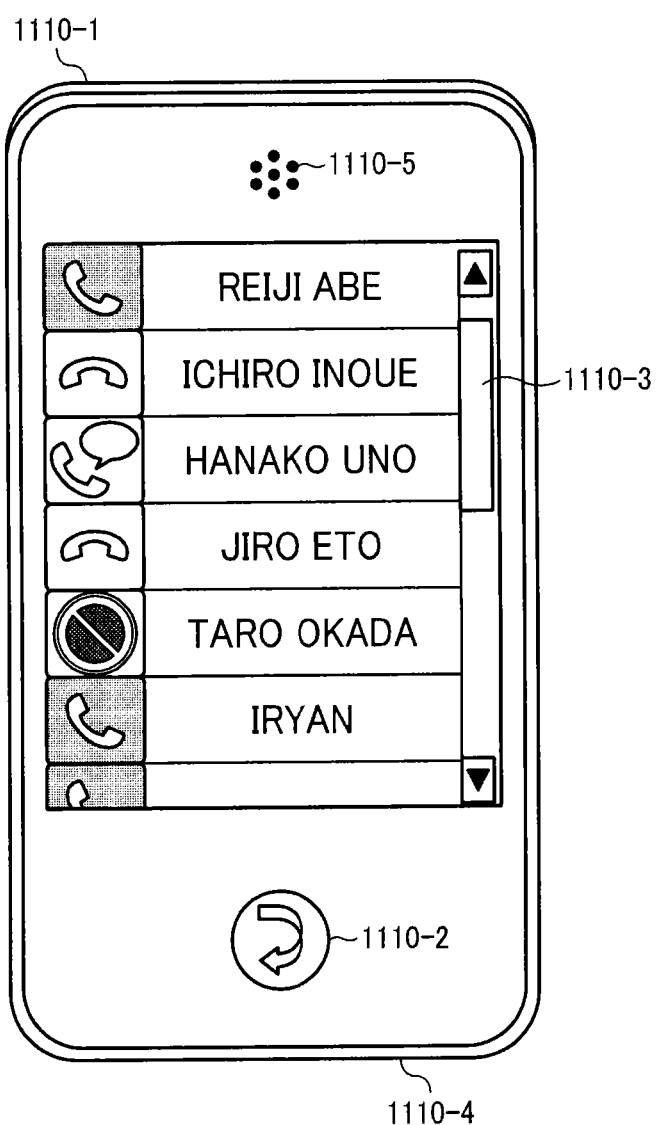
FIG. 34 is an example screen of a candidate list, displayed by a display of the transmission terminal of FIG. 5.
Figure 35:
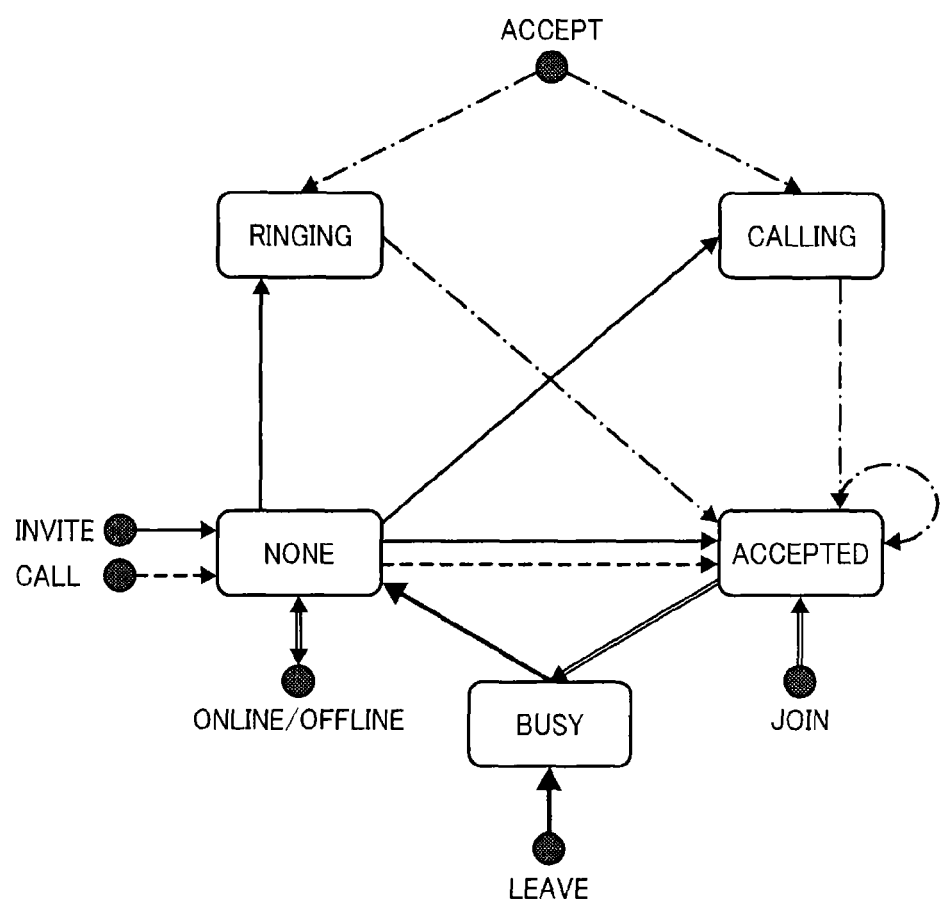
FIG. 35 is an illustration for explaining transition of the communication state of a transmission terminal.

Referring now to FIGS. 19 to 35, operation performed by the transmission system 1 is explained according to an example embodiment of the present invention. FIG. 19 is a data sequence diagram illustrating operation of managing state information indicating the operation state of the relay terminal 30, which is sent from the relay terminal 30 to the management system 50, according to an example embodiment of the present invention. FIG. 20 is an illustration of transmitting or receiving image data, sound data, or management data, performed by the transmission system of FIG. 1. FIGS. 21A and 21B are a data sequence diagram illustrating operation of establishing communication among two or more terminals 10 of the transmission system of FIG. 1. FIG. 22 is an example screen of a candidate list. FIG. 23 is a data sequence diagram illustrating operation of managing a request for starting communication. FIG. 24 is a flowchart illustrating operation of changing a communication state of a terminal. FIG. 25 is a data sequence diagram illustrating operation of managing a response to the request for starting communication. FIG. 26 is a data sequence diagram illustrating operation of managing a request for starting relaying of contents data. FIG. 27 is a flowchart illustrating operation of changing a communication state of a terminal. FIG. 28 is a data sequence diagram illustrating transmitting or receiving contents data such as image data and sound data, performed by two or more terminals. FIG. 29 is a data sequence diagram illustrating operation of managing a request for participating in a contents data session. FIG. 30 is a flowchart illustrating operation of determining whether to allow a participation requesting terminal to participate in a contents data session, using the candidate terminal list. FIG. 31 is an illustration of a distance of the shortest path between the participation requesting terminal and the participating terminal. FIG. 32 is a flowchart illustrating operation of changing a communication state of a terminal. FIG. 33 is a data sequence diagram illustrating operation of managing a request for leaving from the contents data session. FIG. 34 is an illustration of a candidate list according to another example embodiment of the present invention. FIG. 35 is an illustration for explaining the transition of a communication state of a terminal.

Referring now to FIG. 19, operation of managing state information of the terminal 30, which is sent from each terminal 30 to the transmission management system 50, performed by the transmission system 1 is explained according to an example embodiment of the present invention. In this example, operation of FIG. 19 is performed by each one of the relay terminals 30a, 30b, 30c, and 30d that are provided in the local area of the transmission system 1. The relay terminal 30e, which is always turned on, does not perform operation of FIG. 19 as the relay terminal 30e is assumed to have the operation state "ONLINE".

At S1-1, S1-2, S1-3, and S1-4, the relay terminals 30a, 30b, 30c, and 30d each periodically monitors the operation state of the relay terminal 30. This monitoring is performed by the state detector 32 (FIG. 5) of the relay terminal 30.

At S2-1, S2-2, S2-3, and S2-4, the data transmit/receive 31 of the relay terminal 30 periodically transmits state information of the relay terminal 30 to the management system 50 through the communication network 2. With the state information of the relay terminal 30 that is periodically received, the management system 50 is able to manage the operation state of the relay terminal 30 in realtime. The state information of the relay terminal 30 includes an operation state of the relay terminal 30 that is detected by the state detector 32 of the relay terminal 30, which is sent together with a relay terminal ID that uniquely identifies each relay terminal 30. For the descriptive purposes, in this example, it is assumed that the relay terminals 30a, 30b, and 30d each have the on-line state, and the relay terminal 30c has the off-line state due to the failure in relay control program of the relay terminal 30c.

At S3-1, S3-2, S3-3, and S3-4, the management system 50 receives the state information from the relay terminal 30 at the data transmit/receive 51, and stores the received state information of the relay terminal 30 in the nonvolatile memory 5000 through the memory control 59. More specifically, the memory control 59 stores the state information of each relay terminal 30 in association with the relay terminal ID of the corresponding relay terminal 30 in the relay terminal management DB 5001 (FIG. 10). For example, referring to FIG. 10, the management system 50 stores the state information of the relay terminal 30 indicating whether the relay terminal 30 is on-line, off-line, or in trouble, etc., in association with the relay terminal ID of the relay terminal 30. Additionally, the management system 50 stores the date and time information indicating the time when the management system 50 receives the state information of the relay terminal 30 in association with the relay terminal ID of the relay terminal 30. When the management system 50 does not receive any state information from the relay terminal 30, the relay terminal management table of FIG. 10 has an empty value for the "operation state" field and the "date and time" field for the subjected relay terminal 30. Alternatively, the value of the "operation state" field and the value of the "date and time" field may reflect the state information that is previously sent by the subjected relay terminal 30 to the management system 50 such that the relay terminal management table of FIG. 10 retains such value.

Referring now to FIG. 20, transmission or reception of various data such as contents data and management data among three terminals 10 in the transmission system 1 is explained according to an example embodiment of the present invention. As illustrated in FIG. 20, in the transmission system 1, the request terminal 10A, the counterpart terminal 10B1, and the counterpart terminal 10B2, first establish a management data session "sei" with the management system 50 to start transmission and reception of various types of management data through the management system 50. Further, in this example, the request terminal 10A, the counterpart terminal 10B1, and the counterpart terminal 10B2 establish four contents data sessions "sed" to transmit or receive contents data through the relay terminal 30. The four contents data sessions, which may be referred to as image and/or sound data sessions, include a session "HL" to transmit high-level resolution image data HL, a session "ML" to transmit medium-level resolution image data ML, a session "LL" to transmit low-level resolution image data LL, and a session "V" to transmit sound data V such as voice data.

Referring now to FIGS. 21A and 21B, operation of transmitting and receiving various management data before starting videoconference by the request terminal 10aa is explained, according to an example embodiment of the present invention. In FIGS. 21A and 21B, management data is transmitted or received through the management data session "sei".

For example, at S21, when the user selects "ON" using the power switch 109, the operation input 12 receives a user instruction for turning the power on, and causes the terminal 10aa to turn on the power. At S22, as the power of the request terminal 10aa is turned on, the login request 13 of the request terminal 10aa automatically causes the data transmit/receive 11 to send the login request information that requests the login process to the management system 50 through the communication network 2. The login request information includes a terminal ID that identifies the request terminal 10aa, and a password assigned to the request terminal 10aa. The terminal ID and the password may be obtained by the memory control 19 from the nonvolatile memory 1000, and sent to the data transmit/receive 11. At the time of sending the login request information from the request terminal 10aa to the management system 50, the request terminal 10aa sends an IP address of the request terminal 10aa such that the management system 50 knows the IP address of the request terminal 10aa.

At S23, the terminal authenticator 52 of the management system 50 searches the terminal authentication management DB 5002 (FIG. 11) stored in the nonvolatile memory 5000 using the terminal ID and the password of the login request information received through the data transmit/receive 51. When it is determined that the terminal ID and the password of the login request information is stored in the terminal authentication management DB 5002, the terminal authenticator 52 determines that the terminal 10aa is authenticated.

At S24-1, when the terminal authenticator 52 authenticates that the login request information is received from the authenticated terminal 10, the state manager 53 of the management system 50 stores the date and time at which the login request information is received, and the IP address of the terminal 10aa, with respect to the terminal ID "01aa" of the terminal 10aa in the terminal management DB 5003 (FIG. 12).

At S24-2, the state set 53a of the state manager 53 stores the operation state "ONLINE" and the communication state "None" of the terminal 10aa in the terminal management DB 5003 (FIG. 12) in association with other information of the terminal 10aa for the record that is specified by the terminal ID and the terminal name of the terminal 10aa. Using the terminal management table of FIG. 12, which stores the operation state of "ONLINE", the communication state of "None", the date and time of "13:40, Nov. 10, 2009", and the terminal IP address of "1.2.1.3" in association with the terminal ID "01aa", various information regarding the terminal 10aa can be managed.

At S25, the data transmit/receive 51 of the management system 50 sends the authentication result obtained by the terminal authenticator 52 to the request terminal 10aa that has sent the login request information through the communication network 2. As described above, in this example, it is assumed that the terminal authenticator 52 determines that the terminal 10aa is an authenticated terminal.

When the request terminal 10aa receives the authentication result indicating that the terminal 10aa is authenticated, at S26, the data transmit/receive 11 sends the candidate list request information that requests for a candidate list to the management system 50 through the communication network 2. The data transmit/receive 51 of the management system 50 receives the candidate list request information.

At S27, the terminal extractor 54 of the management system 50 searches the candidate list management DB 5004 (FIG. 13) using the terminal ID "01aa" of the request terminal 10aa that has sent the login request information and the candidate list request information to extract a terminal ID and a terminal name for each of candidate terminals 10 that are previously registered for the request terminal 10aa. More specifically, referring to FIGS. 12 and 13, the extractor 54 extracts terminal IDs including "01ab", "01ba", and "01db". of terminals 10ab, 10ba, and 10db, and terminal names including "Japan Tokyo Office AB Terminal", "Japan Osaka Office BA Terminal", and "U.S. Washington, D.C. Office, DB Terminal" to obtain information regarding candidate terminals for the request terminal 10aa.

At S28, the data transmit/receive 51 of the management system 50 reads out the candidate list frame data such as the candidate list frame 1100-1 of FIG. 22 from the nonvolatile memory 5000. At S29, the data transmit/receive 51 of the management system 50 sends the candidate list information including the candidate list frame data obtained at S28, and the terminal ID and the terminal name of the candidate terminal obtained at S27, to the request terminal 10aa. At S30, the request terminal 10aa receives the candidate list information at the data transmit/receive 11, and stores the candidate list information in the volatile memory 1100 through the memory control 19.

As described above, in this example, in alternative to managing the candidate list information by each terminal 10, the management system 50 centrally manages the candidate list information for all terminals 10. As the candidate list information is centrally managed at the management system 50, any change in the transmission system 1 can be easily reflected in a timely manner without requiring the user at the terminal 10 to change any settings. For example, the management system 50 is able to update the candidate list information to reflect when a new terminal 10 is added to the transmission system 1, when a new type of terminal 10 is introduced to the transmission system 1, or when the design for the candidate list frame is changed.

At S31, the terminal state obtainer 55 of the management system 50 searches the terminal management DB 5003 (FIG. 12) using the terminal ID ("01ab", "01ba", and "01db") of the candidate terminal extracted by the terminal extractor 54 as a key to obtain the state information, i.e., the operation state and the communication state, for each one of the candidate terminals 10ab, 10ba, and 10db.

At S32, the data transmit/receive 51 of the management system 50 sends the state information for each one of the candidate terminals 10ab, 10ba, and 10db to the request terminal 10aa through the communication network 2. More specifically, the data transmit/receive 51 of the management system 50 sends the state information of the candidate terminal 10ab together with the terminal ID "01ab" of the candidate terminal 10ab as the terminal state information. In this example, the terminal ID "01ab" of the candidate terminal 10ab has been extracted by the terminal extractor 54. Using the terminal ID "01ab" as a search key, the operation state of the candidate terminal 10ab, which is the "OFFLINE" state, is obtained from the terminal management table (FIG. 12). Similarly, the data transmit/receive 51 of the management system 50 sends the terminal state information of the candidate terminal 10ba, which includes the terminal ID "01ba" used as a search key at S27, and the operation state "ONLINE" and the communication state "Calling" of the candidate terminal 10*ba*. This process of sending the terminal state information is repeated until the terminal state information is sent for all of the candidate terminals 10.

At S33, the memory control 19 of the request terminal 10*aa* stores the state information that is received from the management system 50 in the volatile memory 1100. As described above, with the state information of each candidate terminal, the request terminal 10*aa* is able to know the current state information, such as the current operation state and the current communication state, of the candidate terminal 10 that is previously registered for the request terminal 10*aa*.

At S34, the candidate list generator 20 of the request terminal 10*aa* generates a candidate list that reflects the operation state and the communication state of the candidate terminal 10, based on the candidate list information and the state information of the candidate terminal 10 that are stored in the volatile memory 1100. The display control 16 of the request terminal 10*aa* causes the display 120 to display a candidate list at a predetermined time.

More specifically, as illustrated in FIG. 22, the request terminal 10*aa* causes the display 120*aa* to display a candidate list that displays the candidate terminal name 1100-2 and the icon 1100-3 that reflects the operation state and the communication state of the candidate terminal 10, within the candidate list frame 1100-1.

Referring back to FIG. 21B, at S35, the terminal extractor 54 of the management system 50 searches the candidate list management DB 5004 (FIG. 13) using the terminal ID "01*aa*" of the request terminal 10*aa* that has sent the login request information to extract the terminal ID of one or more terminals 10 each of which registers the request terminal 10*aa* as one of its candidate terminals 10. The candidate list management table of FIG. 13 indicates that the terminal ID of the terminal 10 having the request terminal 10*aa* as a candidate terminal is "01*ab*", "01*ba*", and "01*db*".

At S36 of FIG. 21B, the terminal state manager 55 of the management system 50 searches the terminal management DB 5003 (FIG. 12) using the terminal ID "01*aa*" of the request terminal that has sent the login request information as a search key to obtain the operation state and the communication state of the request terminal 10*aa*. In this example, the operation state "ONLINE" and the communication state "None" are extracted for the request terminal 10*aa*.

At S37-1 and S37-2, the data transmit/receive 51 of the management system 50 sends the terminal ID "01*aa*" and the state information of the request terminal 10*aa*, which are respectively obtained at S36, to the terminals 10*ab*, 10*ba*, and 10*db* each having the request terminal 10*aa* as a candidate terminal that is obtained at S35. In this example, the management system 50 sends the terminal state information of the request terminal 10*aa* to only the terminals 10*ba* and 10*db* each having the "ONLINE" state as shown in FIG. 12. More specifically, in this example, the data transmit/receive 51 refers to the terminal management table of FIG. 12 to obtain the IP address of each of the terminals 10*ba* and 10*db*. Using the obtained IP addresses, the management system 50 is able to send the terminal state information of the request terminal 10*aa* to the terminals 10*ba* and 10*db* each of which lists the request terminal 10*aa* as a candidate terminal and having the online state.

The above-described operation of S22 to S38 is performed by any desired terminal 10 as the power of the terminal 10 is turned on through the power switch 109 (FIG. 2).

Referring now to FIGS. 23 and 24, operation of managing a request for starting communication with a counterpart terminal 10B that is generated by a request terminal 10A, performed by the transmission system 1, is explained according to an example embodiment of the present invention. In operation, various data is transmitted or received through the management data session "sei" before starting communication, as management data. Further, it is assumed that the request terminal 10A is able to start communication with any number of terminals having the operation state "ONLINE" and the communication state "None", which are obtainable from the candidate list being displayed through the display 120. In this example illustrated in FIG. 23, the request terminal 10*aa* requests the candidate counterpart terminal 10*db* to start communication with the request terminal 10*aa*.

At S41, as the user at the request terminal 10*aa* presses the operation button 108 (FIG. 2) to select the counterpart terminal 10*db*, the operation input 12 (FIG. 5) receives a user instruction for starting communication with the counterpart terminal 10*db*.

At S42, the data transmit/receive 11 of the request terminal 10*aa* sends communication start request information to the management system 50. The communication start request information includes the terminal ID "01*aa*" of the request terminal 10*aa*, the terminal ID "01*db*" of the counterpart terminal 10*db*, and the change request data "Invite" that requests communication to be started. With this information, the data transmit/receive 51 of the management system 50 receives the IP address "1.2.1.3" of the request terminal 10*aa*.

At S43, the state manager 53 of the management system 50 specifies records in the terminal management table (FIG. 12) stored in the terminal management DB 5003, which respectively correspond to the terminal ID "01*aa*" of the request terminal 10*aa* and the terminal ID "01*db*" of the counterpart terminal 10*db* to manage the specified records.

Referring now to FIG. 24, operation performed at S43 of FIG. 23 is explained according to an example embodiment of the present invention. In this example, the state manager 53 changes the communication states of the request terminal 10A and the counterpart terminal 10B according to a communication state change rule that is previously defined.

For example, referring to FIG. 35, assuming that the current communication state of the terminal 10 is "Ringing" or "Calling", when the change request data "Accept" is received, the state manager 35 changes the communication state of the terminal 10 from the state "Ringing" or "Calling" to the state "Accepted". When the current communication state of the terminal 10 is "Accepted", the communication state of the terminal 10 remains the same even when the change request data "Accept" is received. In the following examples, the state manager 53 manages the communication state of the terminal 10, using the state change management table of FIGS. 17 and 18. However, the state manager 53 may manage the communications state of the terminal 10 in various other ways, as long as the state manager 53 changes the communication state according to a specific rule such as the communication state change rule of FIG. 35.

Referring to FIG. 24, at S43-1, the state obtainer 53*b* of the state manager 53 (FIG. 6) obtains a current communication state of each of the request terminal 10*aa* and the counterpart terminal 10*db*, from the terminal management table (FIG. 12) stored in the terminal management DB 5003. The change request data determiner 61 determines whether the change request data "Invite", which is received at the data transmit/receive 51, is specific change request data that is previously defined. In this example, the specific change request data is defined to be either the "Invite" or the "Accept", which is managed by the state change management table of FIG. 18. Since the change request data "Invite" is the specific change request data, the change request data determiner 61 determines that the state change management table of FIG. 18 is used. Based on this determination, the state obtainer 53b obtains the current communication state of the counterpart terminal 10db and the current communication state of the request terminal 10aa. More specifically, the state obtainer 53b searches the terminal management table (FIG. 12) stored in the terminal management DB 5003 using the terminal ID "01aa" of the request terminal 10aa as a search key to obtain the communication state "None" of the request terminal 10aa that has sent the request. In a substantially similar manner, the state obtainer 53b obtains the communication state "None" of the counterpart terminal 10db using the terminal ID "01db" of the counterpart terminal 10db.

At S43-2, the state changer 53c of the state manager 53 obtains previous state data of the request terminal 10aa and previous state data of the counterpart terminal 10db that correspond to the change request data "Invite". For example, referring to FIG. 18, the state changer 53c searches the state change management table of FIG. 18 using the change request data "Invite" and the terminal data "REQUEST" as a search key to obtain the previous state data "None" of the request terminal 10aa. Similarly, the state changer 53c searches the state change management table of FIG. 18 using the change request data "Invite" and the terminal data "COUNTERPART" as a search key to obtain the previous state data "None" of the counterpart terminal 10db.

At S43-3, the state changer 53c compares the communication state of the terminal 10 that is obtained by the state obtainer 53b at S43-1, with the previous state data of the terminal 10 that is obtained by the state changer 53c at S43-2, to generate a comparison result. More specifically, the state changer 53c compares the communication state "None" of the request terminal 10aa with the previous state data "None" of the request terminal 10aa to generate a comparison result. The state changer 53c further compares the communication state "None" of the counterpart terminal 10db with the previous state data "None" of the counterpart terminal 10db to generate a comparison result.

When the comparison result generated at S43-3 indicates that the communication state and the previous state data match for the request terminal 10aa and the counterpart terminal 10db ("YES" at S43-3), the operation proceeds to S43-4. At S43-4, the state changer 53c obtains the changed state data of the request terminal 10aa and the changed state data of the counterpart terminal 10db that correspond to the change request data "Invite". More specifically, the state changer 53c searches the state change management table (FIG. 18) using the change request data "Invite" and the terminal data "REQUEST" as a search key to obtain the changed state data "Calling" of the request terminal 10aa. Similarly, the state changer 53c searches the state change management table (FIG. 18) using the change request data "Invite" and the terminal data "COUNTERPART" as a search key to obtain the changed state data "Ringing" of the counterpart terminal 10db.

At S43-5, the state changer 53c searches the terminal management table (FIG. 12) for the records corresponding to the terminal ID "01aa" of the request terminal 10aa and the terminal ID "01db" of the counterpart terminal 10db to change the communication state fields for the request terminal 10aa and the counterpart terminal 10db. More specifically, the state changer 53c changes the communication state field in the record that corresponds to the terminal ID "01aa", which is stored in the terminal management table, to the communication state "Calling" based on the changed state data of the request terminal 10aa. Similarly, the state changer 53c changes the communication state field in the record that corresponds to the terminal ID "01db", which is stored in the terminal management table, to the communication state "Ringing" based on the changed state data of the counterpart terminal 10db.

At S43-3, when the comparison result generated by the state changer 53c indicates that the communication state is not the same as the previous state data either for the request terminal 10aa or the counterpart terminal 10db ("NO" at S43-3"), the state changer 53c does not change the communication state fields stored in the terminal management table (FIG. 12) for the record of the terminal ID "01aa" and the record of the terminal ID "01db". When the comparison result indicates that the communication state is not the same as the previous state data for the request terminal 10aa or the counterpart terminal 10db, the state changer 53c determines that the request terminal 10aa or the counterpart terminal 10db is not in the communication state in which communication can be started. In such case, the operation proceeds to S43-6 to cause the data transmit/receive 51 to send an error message to the request terminal 10aa, and the operation ends.

More specifically, when the error message is sent from the management system 50, S44 to S48 of FIG. 23 are not performed. Instead, the request terminal 10aa, which receives the error message, causes the display 120aa to display an error message to the user.

In this example, it is assumed that the communication states of the request terminal 10aa and the counterpart terminal 10db are respectively changed at S43-5. In such case, referring back to FIG. 23, S44 to S48 are performed as follows.

At S44, the session ID generator 56a generates a session ID "se1" for identifying the contents data session "sed" through which the contents data will be exchanged between the request terminal 10aa and the counterpart terminal 10db. The session manager 57 stores the session ID "se1" in the volatile memory 5100.

At S45, the relay terminal selector 56 of the management system 50 selects one of the relay terminals 30, which will be used to relay contents data through the contents data session to be established between the request terminal 10aa and the counterpart terminal 10db. More specifically, the relay terminal extractor 56b of the relay terminal selector 56 searches the relay terminal selection management table (FIG. 16) using the terminal ID "01aa" of the request terminal 10aa and the terminal ID "01db" of the counterpart terminal 10db, which are respectively extracted from the communication start request information transmitted from the request terminal 10aa, to obtain the relay terminal IDs "111a" and "111d" that correspond to the terminals 10aa and 10db.

When the relay terminal IDs that are extracted for the request terminal 10aa and the counterpart terminal 10db match, the selector 56c refers to the operation state of the relay terminal 30 having the extracted relay terminal ID, which is stored in the relay terminal management table (FIG. 10). When the operation state of the relay terminal 30 is in the online state, the selector 56c selects the relay terminal that is extracted as a relay terminal that relays contents data between the request terminal 10aa and the counterpart terminal 10db.

When the relay terminal IDs that are extracted for the request terminal 10aa and the counterpart terminal 10db do not match, or when the operation state of the relay terminal 30 is in the offline state, the selector 56c selects the relay terminal 30e having the terminal ID "111e" as a relay terminal that relays contents data between the request terminal 10A and the counterpart terminal 10B. In this example, since the extracted terminal IDs differ for the request terminal 10aa and the counterpart terminal 10db, the selector 56c selects the relay terminal 30e.

When selection of the relay terminal 30 is completed, at S46, the session manager 57 manages a record that corresponds to the session ID "se1", which is stored in the session management table (FIG. 14) stored in the session management DB 5005 in the nonvolatile memory 5000, for example, by inputting the relay terminal ID "111e" of the selected terminal in the "RELAY TERMINAL ID" field, the terminal ID "01aa" of the request terminal 10aa in the "REQUEST TERMINAL ID" field, and the terminal ID "01db" of the counterpart terminal 10db in the "COUNTERPART TERMINAL ID" field.

At S47, the data transmit/receive 51 (FIG. 5) sends the session ID that is generated by the session ID generator 56a, and the relay terminal connection information to be used for connecting to the relay terminal 30e that is selected by the selector 56c, to the request terminal 10aa through the communication network 2. In this example, the relay terminal connection information includes the IP address "1.1.1.3", authentication information, and a port number of the relay terminal 30e. The request terminal 10aa is able to obtain the relay terminal connection information to be used for connecting to the relay terminal 30e that relays contents data to carry out a session with the session ID "se1".

At S48, the data transmit/receive 51 sends the communication start request information including the terminal ID "01aa" of the request terminal 10aa, the change request data "Invite" that requests the counterpart terminal 10db to start communication, and the session ID "se1", the relay terminal connection information to be used for connecting to the relay terminal 30e, and the IP address of the management system 50. With the communication start request information, the data transmit/receive 51 of the counterpart terminal 10db obtains the relay terminal connection information to be used for connecting the relay terminal 30e that relays contents data, and the IP address "1.1.1.2" of the management system 50.

Referring now to FIGS. 24 and 25, operation of managing a response to the request for starting communication, performed by the transmission system 1, is explained according to an example embodiment of the present invention. The operation of FIG. 25 is performed after operation of FIG. 23.

At S49, the counterpart terminal 10db that receives communication start request information from the request terminal 10aa via the management system 50 at S48 of FIG. 23, receives a user instruction for accepting the request for starting communication. For example, when the operation button 108 (FIG. 2) is pressed by the user, the counterpart terminal 10db determines that the communication start request for starting communication with the request terminal 10aa is accepted.

At S50, the data transmit/receive 11 of the counterpart terminal 10db sends communication start respond information to the management system 50, which includes the terminal ID "01db" of the counterpart terminal 10db, the terminal ID "01aa" of the request terminal 10aa, the change request data "Accept" indicating that the communication start request is accepted, and the session ID "se1".

When the data transmit/receive 51 of the management system 50 receives the communication start respond information, at S51, the state manager 53 searches the terminal management table (FIG. 12) using the terminal ID "01aa" of the request terminal 10aa and the terminal ID "01db" of the counterpart terminal 10db to obtain records for the request terminal 10aa and the counterpart terminal 10db. The state manager 53 further changes the communication state filed for each of the obtained records.

Referring now to FIG. 24, operation of managing state information of the request terminal 10aa and the counterpart terminal 10db, performed at S51, is explained. The following steps S51-1 to S51-6 are performed in a substantially similar manner as described above referring to S43-1 to S43-6.

At S51-1, when the data transmit/receive 51 of the management system 50 receives the communication start respond information, the state obtainer 53b of the state manager 53 (FIG. 6) refers to the terminal management table (FIG. 12) to obtain the communication state of the terminal in a substantially similar manner as described above referring to S43-1. The change request data determiner 61 determines that the change request data "Accept" that is received at the data transmit/receive 51 is the specific change request data that is previously determined. Based on this determination, the state obtainer 53b obtains the communication state "Ringing" of the counterpart terminal 10db, and the communication state "Calling" of the request terminal 10aa.

AT S51-2, the state changer 53c of the state manager 53 searches the state change management table of FIG. 18 using the change request data "Accept" and the terminal data "REQUEST" as a search key to obtain the previous state data "Calling" and "Accepted" of the request terminal 10aa. Similarly, the state changer 53c searches the state change management table of FIG. 18 using the change request data "Accept" and the terminal data "COUNTERPART" as a search key to obtain the previous state data "Ringing" of the counterpart terminal 10db.

At S51-3, the state changer 53c compares the communication state of the terminal 10 that is obtained by the state obtainer 53b at S51-1, with the previous state data of the terminal 10 that is obtained by the state changer 53c at S51-2, to generate a comparison result. More specifically, the state changer 53c compares the communication state "Calling" of the request terminal 10aa with the previous state data "Calling" or "Accepted" of the request terminal 10aa to generate a comparison result. The state changer 53c further compares the communication state "Ringing" of the counterpart terminal 10db with the previous state data "Ringing" of the counterpart terminal 10db to generate a comparison result.

When the comparison result generated at S51-3 indicates that the communication state and the previous state data match for the request terminal 10aa and the counterpart terminal 10db ("YES" at S51-3), the operation proceeds to S51-4. At S51-4, the state changer 53c obtains the changed state data of the request terminal 10aa and the changed state data of the counterpart terminal 10db that correspond to the change request data "Accept". More specifically, the state changer 53c searches the state change management table (FIG. 18) using the change request data "Accept" and the terminal data "REQUEST" as a search key to obtain the changed state data "Accepted" of the request terminal 10aa. Similarly, the state changer 53c searches the state change management table (FIG. 18) using the change request data "Accept" and the terminal data "COUNTERPART" as a search key to obtain the changed state data "Accepted" of the counterpart terminal 10db.

AT S51-5, the state changer 53c searches the terminal management table (FIG. 12) for the records corresponding to the terminal ID "01aa" of the request terminal 10aa and the terminal ID "01db" of the counterpart terminal 10db to change the communication state fields for the request terminal 10aa and the counterpart terminal 10db. More specifically, the state changer 53c changes the communication state field in the record that corresponds to the terminal ID "01aa", which is stored in the terminal management table, to the communication state "Accepted" based on the changed state data of the request terminal 10aa. Similarly, the state changer 53c changes the communication state field in the record that corresponds to the terminal ID "01db", which is stored in the terminal management table, to the communication state "Accepted" based on the changed state data of the counterpart terminal 10db.

At S51-3, when the comparison result generated by the state changer 53c indicates that the communication state is not the same as the previous state data either for the request terminal 10aa or the counterpart terminal 10db ("NO" at S51-3"), the state changer 53c does not change the communication state fields stored in the terminal management table (FIG. 12) for the record of the terminal ID "01aa" and the record of the terminal ID "01db". In such case, the operation proceeds to S51-6 to cause the data transmit/receive 51 to send an error message to the counterpart terminal 10db, and the operation ends.

More specifically, when the error message is sent from the management system 50, S52 to S54 of FIG. 25 are not performed. Instead, the counterpart terminal 10db, which receives the error message, causes the display 120 db to display an error message to the user.

In this example, it is assumed that the communication states of the request terminal 10aa and the counterpart terminal 10db are respectively changed at S51-5. In such case, referring back to FIG. 25, S52 to S54 are performed as follows.

At S52, the data transmit/receive 51 of the management system 50 transmits the communication start respond information to the request terminal 10aa through the communication network 2. The communication start respond information includes the terminal ID "01db" of the counterpart terminal 10db, the change request data "Accept" indicating that the request for starting communication with the counterpart terminal 10db is accepted, and the session ID "se1".

When the communication start respond information is received, at S53, the data transmit/receive 11 of the request terminal 10aa transmits the session ID "se1" and the relay terminal connection information obtained at S47 (FIG. 23) to the relay terminal 30e to establish connection with the relay terminal 30e. At S54, the data transmit/receive 11 of the counterpart terminal 10db transmits the session ID "se1" and the relay terminal connection information obtained at S48 (FIG. 23) to the relay terminal 30e to establish connection with the relay terminal 30e.

Referring now to FIG. 26, operation of managing a request for starting relay of contents data between the request terminal 10aa and the counterpart terminal 10db through the relay terminal 30e, performed by the transmission system 1, is explained according to an example embodiment of the present invention. In this example, various data is transmitted or received through the management data session "sei". The operation of FIG. 26 is performed at a predetermined time after the request terminal 10aa and the counterpart terminal 10db each establish connection with the relay terminal 30e at S53 and S54 of FIG. 25.

At S71-1, the data transmit/receive 11 of the request terminal 10aa sends relay request information to the management system 50, which includes the terminal ID "01aa" of the request terminal 10aa, the session ID "se1", and the change request data "Join" that requests relay of contents data.

When the data transmit/receive 51 of the management system 50 receives the relay request information, at S72-1, the state manager 53 searches the terminal management table of FIG. 12 using the terminal ID "01 aa" of the request terminal 10aa obtained from the relay request information to specify a record that corresponds to the terminal ID "01aa", and changes a filed of the communication state of the specified record.

Referring now to FIG. 27, operation of managing state information performed at S72-1 is explained. At S72-1-1, the state obtainer 53b of the state manager 53 (FIG. 6) obtains the communication state of the terminal 10 that is managed by the terminal management DB 5003 (FIG. 12). The change request data determiner 61 determines that the change request data "Join" received at the data transmit/receive 51 is not the specific change request data previously determined. More specifically, it is determined that the change request data "Join" differs from any one of the "Invite" and the "Accept". Accordingly, the change request data determiner 61 determines to use the state change management table of FIG. 17. Based on this determination, the state obtainer 53b obtains only the communication state of the request terminal 10aa. More specifically, the state obtainer 53b searches the terminal management table (FIG. 12) using the terminal ID "01aa" of the request terminal 10aa as a search key to obtain the communication state "Accepted" of the request terminal 10aa that sends the relay start request information.

At S72-1-2, the state changer 53c of the state manager 53 obtains the previous state data that corresponds to the change request data "Join". More specifically, the state changer 53c searches the state change management table of FIG. 17 using the change request data "Join" to obtain the previous change data "Accepted".

At S72-1-3, the state changer 53c determines whether the communication state obtained by the state obtainer 53b at S72-1-1, and the previous state data obtained by the state changer 53c at S72-1-2 match. More specifically, in this example, the state changer 53c compares the communication state "Accepted" of the request terminal 10aa obtained by the state obtainer 53b with the previous state data "Accepted" obtained by the state changer 53c to generate a comparison result.

When the comparison result indicates that the communication state and the previous state data match ("YES" at S72-1-3), the operation proceeds to S72-1-4. At S72-1-4, the state changer 53c obtains the changed state data that corresponds to the change request data "Join". In such case, the state changer 53c searches the state change management table (FIG. 17) using the change request data "Join" as a search key to obtain the changed state data "Busy".

At S72-1-5, the state changer 53c refers to the terminal management table (FIG. 12) to specify a record for the terminal ID "01aa" of the request terminal 10aa, and changes the communication state field of the specified record. More specifically, in this example, the state changer 53c changes the communication state field of the terminal ID"01aa" of the request terminal 10aa to the communication state "Busy" based on the obtained changed state data.

When the comparison result indicates that the communication state and the previous state data for the request terminal 10aa do not match ("NO" at S72-1-3), the state changer 53c does not change the communication state field of the record that corresponds to the terminal ID "01aa", which is stored in the terminal management table (FIG. 12). In such case, the operation proceeds to S72-1-6 to cause the data transmit/receive 51 to transmit an error message to the request terminal 10aa, and the operation ends.

More specifically, when the error message is sent from the management system 50, S73-1 to S76-1 are not performed.

Instead, the request terminal 10aa, which receives the error message, causes the display 120aa to display an error message to the user.

In this example, it is assumed that the communication state of the request terminal 10aa is changed at S72-1-5. In such case, referring back to FIG. 26, S73-1 to S76-1 are performed as follows.

At S73-1, the management system 50 sends the relay start request information to the relay terminal 30e, which includes the terminal ID "01aa" of the request terminal 10aa, and the session ID "se1". When the relay start request information is received, at S74-1, the relay terminal 30e transmits relay start respond information including a message indicating a permission to start relay "OK" to the management system 50. In addition to the "OK", the relay start respond information includes the terminal ID of the request terminal 10aa and the session ID.

When the relay start respond information is received, at S75-1, the data transmit/receive 51 of the management system 50 sends the relay start respond information to the request terminal 10aa. The relay start respond information includes the terminal ID of the request terminal 10aa, the change request data "Join", the session ID, and the message "OK". At S76-1, the contents data session "sed" is established between the request terminal 10aa and the relay terminal 30e.

The management system 50 performs the above-described operation for each one of the terminals 10 that will be starting videoconference. More specifically, the management system 50 performs S71-2 to S76-2 to establish the contents data session between the relay terminal 30e and the counterpart terminal 10db.

At a predetermined after the counterpart terminal 10db establishes connection with the relay terminal 30e at S54 (FIG. 25), at S71-2, the data transmit/receive 11 of the counterpart terminal 10db transmits relay request information to the management system 50, which includes the terminal ID "01db" of the counterpart terminal 10db, the session ID "se1", and the change request data "Join" that requests relay of contents data.

The management system 50 and the relay terminal 30e perform S72-2, S73-2, S74-2, and S75-2, in a substantially similar manner as described above referring to S72-1, S73-1, S74-1, and S75-1 to establish the contents data session "sed" between the relay terminal 30e and the counterpart terminal 10db. In managing the state information of the counterpart terminal 10db, the management system 50 obtains the communication state of the counterpart terminal 10db, and changes the communication state of the counterpart terminal 10db in a substantially similar manner as described above referring to FIG. 27.

When the contents data session between the request terminal 10aa and the relay terminal 30e, and the contents data session between the counterpart terminal 10db and the relay terminal 30e are each established, the relay terminal 30e relays contents data such as image data and/or sound data between the request terminal 10aa and the counterpart terminal 10db. Accordingly, videoconference is carried out between the terminals 10aa and 10db. The image data may include any one of the low-level resolution image data, the medium-level resolution image data, and the high-level resolution image data.

Referring now to FIGS. 5 and 28, transmission or reception of contents data between the request terminal 10aa and the counterpart terminal 10db to carry out videoconference, performed by the transmission system of FIG. 1, is explained according to an example embodiment of the present invention. In this example, the contents data such as the image data and the sound data flows in a direction from the request terminal 10aa to the counterpart terminal 10db, or in another direction from the counterpart terminal 10db to the request terminal 10aa. Since operation such as transmission and reception of the contents data or detection of delay time is the same for both of the directions, the following example focuses on communication in which data flows from the request terminal 10aa to the counterpart terminal 10db.

Referring to FIG. 28, at S81, the data transmit/receive 11 of the request terminal 10aa sends the contents data to the relay terminal 30e through the communication network 2 in the contents data session "sed". The contents data includes image data such as image data of an object captured by the imaging unit 14 and sound data that is input through the sound input 15a. In this example, as illustrated in FIG. 20, it is assumed that the high-quality image data based on the low-level resolution image data, the medium-level resolution image data, and the high-level resolution image data, and the sound data, are transmitted. Accordingly, the data transmit/receive 31 of the relay terminal 30e receives the image data of three different resolution levels, and the sound data.

At S82, the data quality checker 33 searches the data quality management DB 3001 (FIG. 8) using the IP address "1.3.2.4" of the counterpart terminal 10db as a key to obtain the quality of the image data to be transmitted to the relay terminal 30e. In this example, the quality of image data to be transmitted to the relay terminal 30e is the high-quality image data. Since the image data that is received at the data transmit/receive 31 has the quality that is the same as the quality of the image data obtained from the data quality management DB 3001, at S83, the relay terminal 30e sends the high-quality image data and the sound data to the counterpart terminal 10db in the contents data session "sed", without applying further image processing.

The counterpart terminal 10db receives the high quality image data that is generated based on the low-level resolution image data, medium-level resolution image data, and high-level resolution image data, and the sound data, at the data transmit/receive 11. The display control 16 combines the image data of three different resolution levels into the high quality image data for display onto the display 120. Further, the sound output 15b outputs the sound such as voices, based on the sound data.

At S84, the delay detector 18 of the counterpart terminal 10db periodically detects a delay time indicating the time at which the image data is received at the data transmit/receive 11, for example, every one second. In this example, it is assumed that the delay time of 200 ms is obtained.

At S85, the data transmit/receive 11 of the counterpart terminal 10db sends the delay time information indicating the delay time of 200 ms to the management system 50 through the communication network 2, during the management data session "sei". With the delay time information, the management system 50 is notified of the delay time, and the IP address "1.3.2.4" of the counterpart terminal 10db that has sent the delay time information.

At S86, the delay time manager 60 of the management system 50 searches the terminal management DB 5003 (FIG. 12) using the IP address "1.3.2.4" of the counterpart terminal 10db as a search key to extract the terminal ID "01db" of the counterpart terminal 10db. The delay time manager 60 stores the delay time of 200 ms obtained from the delay time information in a "delay time" field of the record of the terminal ID "01db" of the session management table stored in the session management DB 5005 (FIG. 14).

At S87, the quality determiner 58 searches the quality management DB 5007 (FIG. 15) using the delay time of 200 ms to extract the image data quality of "MEDIUM". Based on the extracted image data quality, the quality determiner 58 determines that the quality of image data suitable for the delay time of 200 ms is medium.

At S88, the data transmit/receive 51 searches the relay terminal management DB 5001 (FIG. 10) using the relay terminal ID "111*e*", which is stored in the session management DB (FIG. 14) in association with the counterpart terminal ID "01*db*", to extract the IP address "1.1.1.3" of the relay terminal 30*e*.

At S89, the data transmit/receive 51 sends the quality information indicating that the image data quality that has been determined at S87 is medium-level, to the relay terminal 30*e* through the communication network 2 during the management data session "sei". The image quality information is transmitted with the IP address "1.3.2.4" of the counterpart terminal 10*db*, which was used as a search key at S86.

At S90, the change quality manager 34 of the relay terminal 30*e* stores the IP address "1.3.2.4" of the counterpart terminal 10*db* in association with the "medium-level" quality image data to be relayed by the counterpart terminal 10*db*, in the data quality management DB 3001 (FIG. 8).

At S91, the request terminal 10*aa* transmits the high quality image data including the low-level resolution image data, the medium-level resolution image data, and the high-level resolution image data, and the sound data, to the relay terminal 30*e* during the contents data session "sed", in a substantially similar manner as described above referring to S81.

At S92, the data quality checker 33 of the relay terminal 30*e* searches the data quality management DB 3001 (FIG. 8) using the IP address "1.3.2.4" of the counterpart terminal 10*db* as a search key to extract the quality of the image data suitable for the counterpart terminal 10*db*, in a substantially similar manner as described above referring to S82.

At S93, since the image data quality that is stored for the counterpart terminal 10*db* is the medium-level, which is lower than the quality of the image data that is received at the data transmit/receive 31, the data quality changer 35 changes the quality of the image data from the high-level to the medium level. In this example, the quality of the sound data remains the same.

At S94, the data transmit/receive 31 of the relay terminal 30*e* sends the image data having the quality that is lowered to the medium-level, and the sound data, to the counterpart terminal 10*db* through the communication network 2, during the contents data session "sed". The data transmit/receive 11 of the counterpart terminal 10*db* receives the medium-quality image data that is generated based on the low-level resolution image data and the medium-level resolution image data, and the sound data. The display control 16 of the counterpart terminal 10*db* combines the image data of two different resolution levels to generate the medium-level image data for display on the display 120. Further, the sound output 15*b* outputs sounds such as voices generated based on the sound data.

As described above, when any delay in receiving the image data at the counterpart terminal 10*db* is observed, the relay terminal 30*e* changes the quality of image data by lowering the quality of image data. Accordingly, the users participating the videoconference are able to carry out communication more smoothly.

Referring to FIG. 29, operation of managing a request for participating in the contents data session that has been established between the request terminal 10*aa* and the counterpart terminal 10*db*, which is generated by a participation request terminal 10*cb*, performed by the transmission system 1, is explained according to an example embodiment of the present invention. More specifically, in this example, it is assumed that the user at the request terminal 10*aa* invites the user at the terminal 10*cb* to join the videoconference after the contents data session starts. Further, in this example, it is assumed that the user at the terminal 10*cb*, or the terminal 10*cb*, is not registered as a participant of the contents data session. In FIG. 29, management data is transmitted or received through the management data session "sei".

At S101, as the user at the request terminal 10*aa* presses the operation button 108 (FIG. 2), the terminal 10*aa* receives a user instruction for inviting the counterpart terminal 10*cb* to participate in the contents data session "sed".

At S102, the data transmit/receive 11 of the request terminal 10*aa* transmits session ID notice request information to the management system 50 through the communication network 2. The session ID notice request information includes the terminal ID "01*aa*" of the request terminal 10*aa*, the terminal ID "01*cb*" of the counterpart terminal 10*cb*, and the session ID "se1" of the contents data session being carried out by the terminals 10*aa* and 10*db*.

When the session ID notice request information is received, at S103, the data transmit/receive 51 of the management system 50 transmits the session ID notice information to the counterpart terminal 10*cb*, which includes the terminal ID "01*aa*" of the request terminal 10*aa*, and the session ID "se1".

When the session ID notice information is received, at S104, the counterpart terminal 10*cb* accepts the invitation for participating in the contents data session "sed" with the session ID "se1". In this example, when the user at the counterpart terminal 10*cb* presses the operation button 108 (FIG. 2), the counterpart terminal 10*cb* receives a request for participating in the contents data session. At S105, the data transmit/receive 11 of the counterpart terminal 10*cb*, which requests for participating in that session, sends session participation request information to the management system 50. The session participation request information includes the terminal ID "01cb" of the counterpart terminal 10*cb* ("the request participating terminal 10*cb*"), the change request data "Call" indicating a request for participating the contents data session, and the session ID "se1" of the contents data session.

When the session participation request information is received, at S106, the management system 50 determines whether to allow the counterpart terminal 10*cb* ("the participation requesting terminal 10*cb*") to connect with the participating terminals 10*aa* and 10*db* that are participating in the contents data session "sed", using information obtainable from the candidate list management table of FIG. 13.

Referring now to FIG. 30, operation of determining whether to allow connection of the terminal 10*cb* that requests for participating, with the participating terminals 10*aa* and 10*db*, performed at S106 of FIG. 29, is explained according to an example embodiment of the present invention.

At S106-1, the session manager 57 searches the session management table (FIG. 14) using the session ID "se1" as a search key, which is extracted from the participation request information, to obtain the terminal ID "01*aa*" of the request terminal 10*aa* and the terminal ID "01*db*" of the counterpart terminal 10*db* that are participating in the contents data session with the session ID "se1".

At S106-2, the terminal extractor 54 searches the candidate list management table (FIG. 13) using the terminal ID "01*aa*" and "01*db*" of the participating terminals 10 that are extracted by the session manager 57 as a search key to obtain terminal IDs of candidate terminals that are registered for the participating terminals 10. In this example, the terminal extractor 54 extracts the terminal IDs "01*ab*", "01*ba*", and "01*db*" of the candidate terminals registered for the participating terminal 10aa, and the terminal IDs "01aa", "01cb", and "01da" of the candidate terminals registered for the participating terminal 10db.

At S106-3, the connection determiner 62 determines whether the terminal ID of the participation requesting terminal 10 is included in a list of the terminal IDs of the candidate terminals that are extracted for the participating terminals 10 by the terminal extractor 54 at S106-2. More specifically, in this example, the connection determiner 62 determines that the terminal ID of the participation requesting terminal 10 is included, when the terminal ID "01cb" of the participation requesting terminal 10cb is included in the list of terminal IDs "01ab", "01ba", "01db" "01aa", "01cb", and "01da" of the candidate terminals for the participating terminals 10aa and 10db ("YES" at S106-3). In such case, the operation proceeds to S106-5.

When it is determined that the terminal ID of the participation requesting terminal 10 is not included in the list of terminal IDs of the candidate terminals for the participating terminals 10 ("NO" at S106-3), the operation proceeds to S106-4 to cause the connection determiner 62 to generate an error message, and send the error message to the participation requesting terminal 10 that requests for participating. In such case, the management system 50 does not perform further processing of S107 to S113 of FIG. 29.

Assuming that the terminal ID of the participation requesting terminal 10cb is included ("YES" at S106-3), at S106-5, the calculator 63 calculates a distance of the shortest path between the participation requesting terminal 10cb and the participating terminal 10 for each set of a plurality of sets of the participation requesting terminal 10cb and the participating terminal 10. The calculator 63 specifies a set of the participation requesting terminal 10 and the participating terminal 10 having the largest value of distance of the shortest path between the nodes. In calculation, the calculator 63 defines a distance of the shortest path between the request terminal 10 and the candidate terminal 10 that is registered in the candidate list management table (FIG. 13) for the request terminal 10 to be a predetermined value. The distance of the shortest path between the participation requesting terminal 10 and each of the participating terminals 10 is calculated based on this predetermined value.

Referring now to FIG. 31, operation of calculating a distance of the shortest path between the terminals 10 is explained according to an example embodiment of the present invention.

In this example, it is assumed that the participation requesting terminal 10cb is stored in the candidate list management table (FIG. 13) as a candidate terminal for the participating terminal 10. As illustrated in FIG. 31, the distance of the shortest path between the participation requesting terminal 10cb and the participating terminal 10 is defined to be "1". More specifically, referring to the candidate list management table (FIG. 13), the terminal ID "01cb" of the participation requesting terminal 10cb is registered as a terminal ID of a candidate terminal that is associated with the terminal ID "01db" of the participating terminal 10db. The distance of the shortest path between the participation requesting terminal 10cb and the participating terminal 10db is defined to be "1".

Still referring to the candidate list management table (FIG. 13), the terminal ID "01cb" of the participation requesting terminal 10cb is not registered as a terminal ID of a candidate terminal that is associated with the participating terminal 10aa with the terminal ID "01aa". The distance of the shortest path between the participation requesting terminal 10cb and the participating terminal 10aa is determined to be greater than "1".

In case the distance of the shortest path between the participation requesting terminal 10 and the participating terminal 10 is greater than "1", the value of such distance is calculated as follows. Referring to the candidate list management table (FIG. 13), the participating terminal 10db having the distance "1" with the participation requesting terminal 10cb is managed as a candidate terminal of another participating terminal 10aa. In such case, the distance of the shortest path between the participation requesting terminal 10cb and another participating terminal 10aa is defined to be "2" as illustrated in FIG. 31(a). More specifically, the terminal ID "01db" of the terminal 10db having the distance "1" with the participation requesting terminal 10cb is registered as a terminal ID of a candidate terminal that is associated with another participating terminal 10aa with the terminal ID "01aa". The distance of the shortest path between the participation request terminal 10cb and the participating terminal 10aa is thus defined to be "2".

The calculator 63 calculates a distance of the shortest path between the participation request terminal 10cb and one of the participating terminals 10aa and 10db that has a greater value of distance with respect to the participation request terminal 10cb. In this example, the calculator 63 obtains the distance "2" of the shortest path between the participation request terminal 10cb and the participating terminal 10aa. The calculator 63 performs this calculation, for example, according to a graph search algorithm that solves the single-source shortest path problem, which is known as the Dijkstra's algorithm. For example, the CPU 201 may perform calculation using the Dijkstra's algorithm, which may be stored in the form of computer-executable instructions.

Referring back to FIG. 30, at S106-6, the connection determiner 62 determines whether the distance obtained by the calculator 63 at S106-5 is less than a predetermined value, i.e., threshold. In this example, the threshold is set to "3". The value of threshold is previously stored in a predetermined memory area of a memory such as the nonvolatile memory 5000, and read out via the memory control 59. When it is determined that the obtained distance is less than the threshold ("YES" at S106-6), the operation proceeds to S106-7. At S106-7, the memory control 59 stores the terminal ID "01cb" of the participation requesting terminal 10cb, the session ID "se1" of the contents data session that the participation requesting terminal 10cb requests to participate, and the distance "2" of the participation requesting terminal 10cb with respect to the participating terminal 10aa, in a predetermined memory area of the nonvolatile memory 5000. The operation further proceeds to S107 of FIG. 29 to cause the management system 50 to perform further processing, which causes the participation requesting terminal 10cb to connect with the participating terminals 10aa and 10db.

When it is determined that the distance obtained at S106-5 is equal to or greater than the threshold ("NO" at S106-6), the operation proceeds to S106-8. At S106-8, the data transmit/receive 51 of the management system 50 generates an error message, and sends the error message to the participation requesting terminal 10cb. In such case, S107 to S113 of FIG. 29 are not performed.

In this example, it is assumed that further processing of S107 to S113 of FIG. 29 is performed to cause the participation requesting terminal 10cb and the participating terminals 10aa and 10db to be connected. At S107, the state manager 53 of the management system 50 searches the terminal management table (FIG. 12) using the terminal ID "01cb" of the participation requesting terminal 10*cb* that is extracted from the session participation request information, to obtain a record that corresponds to the terminal ID "01*cb*", and changes the communication state field of the obtained record.

Referring now to FIG. 32, managing the state information of the participation requesting terminal 10*cb*, performed at S107, is explained according to an example embodiment of the present invention.

At S107-1, the state obtainer 53*b* of the state manager 53 (FIG. 6) obtains the communication state of the terminal 10 that is managed by the terminal management DB 5003. In this example, the change request data determiner 61 determines that the change request data "Call" that is received at the data transmit/receive 51 is not the specific change request data that is previously determined. More specifically, the change request data determiner 61 determines that the change request data "Call" is not the "Invite" or the "Accept", and further determines to use the state change management table of FIG. 17. Based on this determination, the state obtainer 53*b* obtains the communication state of the participation requesting terminal 10*cb*. More specifically, the state obtainer 53*b* searches the terminal management table (FIG. 12) using the terminal ID "01*cb*" of the participation requesting terminal 10*cb* as a search key to obtain the communication state "None" of the participation requesting terminal 10*cb*.

At S107-2, the state changer 53*c* of the state manager 53 obtains the previous state data of the terminal that corresponds to the change request data "Call". More specifically, the state changer 53*c* searches the state change management table (FIG. 17) using the change request data "Call" as a search key to obtain the previous state data "None" of the participation requesting terminal 10*cb*.

At S107-3, the state changer 53*c* compares the communication state obtained by the state obtainer 53*b* at S107-1, with the previous state data obtained by the state changer 53*c* at S107-2 to obtain a comparison result. More specifically, the state changer 53*c* compares the communication state "None" of the participation requesting terminal 10*cb* with the previous state data "None" of the participation requesting terminal 10*cb* to generate a comparison result.

When the comparison result generated at S107-3 indicates that the communication state and the previous state data match for the participation requesting terminal 10*cb* ("YES" at S107-3), the operation proceeds to S107-4. At S107-4, the state changer 53*c* obtains the changed state data of the participation requesting terminal 10*cb* that corresponds to the change request data "Call". More specifically, the state changer 53*c* searches the state change management table (FIG. 17) using the change request data "Call" as a search key to obtain the changed state data "Accepted".

At S107-5, the state changer 53*c* searches the terminal management table (FIG. 12) for the record corresponding to the terminal ID "01*cb*" of the participation requesting terminal 10*cb* to change the communication state field for the participation requesting terminal 10*cb*. More specifically, the state changer 53*c* changes the communication state field in the record that corresponds to the terminal ID "01*cb*", which is stored in the terminal management table of FIG. 12, to the communication state "Accepted" based on the changed state data obtained for the participation requesting terminal 10*cb*.

At S107-3, when the comparison result generated by the state changer 53*c* indicates that the communication state is not the same as the previous state data ("NO" at S107-3), the state changer 53*c* does not change the communication state field stored in the terminal management table (FIG. 12) for the record of the terminal ID "01*cb*" of the participation requesting terminal 10*cb*. In such case, the operation proceeds to S107-6 to cause the data transmit/receive 51 to send an error message to the participation requesting terminal 10*cb*, and the operation ends.

More specifically, when the error message is sent from the management system 50, S108 to S113 of FIG. 29 are not performed. Instead, the participation requesting terminal 10*cb*, which receives the error message, causes the display 120*cb* to display an error message to the user.

In this example, it is assumed that the communication state of the participation requesting terminal 10*cb* is changed at S107-5. In such case, S108 to S113 of FIG. 29 are performed as follows.

At S108, the session manager 57 searches the session management table (FIG. 14) stored in the nonvolatile memory 5000 to specify a record that corresponds to the session ID "se1", and adds the terminal ID "01*cb*" of the participation requesting terminal 10*cb* in the counterpart terminal field.

At S109, the data transmit/receive 51 of the management system 50 transmits the participation permission notice information to the participation requesting terminal 10*cb* to notify the participation requesting terminal 10*cb* that participation in the contents data session "sed" is allowed. The participation permission notice information includes the session ID "se1" and the relay terminal connection information to be used for connecting to the relay terminal 30*e*. In addition to the participation permission notice information, the data transmit/receive 51 may send information regarding the distance of the participation requesting terminal 10*cb* with respect to the participating terminal 10*aa*, which is stored at S106-7. With the distance information, the user at the participation requesting terminal 10*cb* is able to know the degree of risk in participating in the contents data session.

For example, when the distance information indicates relatively a high value, the user at the terminal 10*cb* may cancel the request for participating in that session even though the user accepts the request from the terminal 10*aa* probably because the user at the terminal 10*cb* knows the user at the terminal 10*aa*. The distance information may be displayed in various formats other than the number.

When the participation permission notice information is received, at S110, the data transmit/receive 11 of the participation requesting terminal 10*cb* sends the session ID "se1" and the relay terminal connection information, which is included in the participation permission notice information, to the relay terminal 30*e*. Using this information, the participation requesting terminal 10*cb* is connected to the relay terminal 30*e*.

At a predetermined time after connection with the relay terminal 30*e* is established, the data transmit/receive 11 of the participation requesting terminal 10*cb* sends the relay request information to the management system 50, which includes the terminal ID "01*cb*" of the terminal 10*cb*, the session ID "se1", and the change request data "Join". When the relay request information is received, the management system 50 and the relay terminal 30*e* perform S72-1, S73-1, S74-1, and S75-1 (FIG. 26) to establish the contents data session "sed" between the terminal 10*cb* and the relay terminal 30*e*. When the contents data session "sed" is established, the relay terminal 30*e* relays contents data such as image data and/or sound data among the terminals 10*aa*, 10*cb*, and 10*db* to carry out videoconference among the terminals 10*aa*, 10*cb*, and 10*db*.

Referring to S29, at S111-1 and S111-2, the data transmit/receive 51 of the management system 50 sends the participation notice information including the terminal ID "01*cb*" of the participation requesting terminal 10*cb*, and the session ID "se1", to the participating terminals 10*aa* and 10*db*, respectively. With this participation notice information, the participating terminals 10*aa* and 10*db* are able to know that the participation requesting terminal 10*cb* is participating in the contents data session.

At S112, the terminal extractor 54 of the management system 50 searches the candidate list management table (FIG. 13) using the terminal ID "01*cb*" of the participation requesting terminal 10*cb* as a search key, which is extracted from the session participation request information, to obtain a terminal ID of each of candidate terminals that are registered for the participation requesting terminal 10*cb*. In this example, the terminal IDs "01aa", "01bb", and "01db" are extracted.

At S113, the data transmit/receive 51 of the management system 50 sends participation notice information to the candidate terminals 10*aa*, 10*bb*, and 10*db* each having the terminal ID extracted at S112. In this example, the participation notice information includes the terminal ID "01*cb*" of the participation requesting terminal 10*cb*. S113 is performed for any of the candidate terminals 10 that are associated with the participation requesting terminal 10*cb*, only if transmission of the participation notice information has not been performed at S111-1 or S111-2. In this example, since the candidate terminals 10*aa* and 10*db*, which are the participating terminals 10, already received such participation notice information, the management system 50 sends the participation notice information to the candidate terminal 10*bb*. With this participation notice information, the candidate terminal 10*bb* is able to know that the participation requesting terminal 10*cb* is participating in the contents data session.

For example, the candidate terminal 10*bb* causes the display 120*bb* to display a candidate list with the icon indicating that the participation requesting terminal 10*cb* is in the online state, and having videoconference with the other terminals 10.

Operation of FIG. 29 may be performed in various other ways. For example, at 102, when the management system 50 receives the request for notifying a counterpart terminal 10 of the session being performed by the request terminal 10, the management system 50 may determine whether to send such information regarding the session being performed to the counterpart terminal 10.

More specifically, in this example, the request terminal 10*aa* sends the request for notifying the counterpart terminal 10*cb* of the session with the session ID "se1". When such request is received, the management system 50 extracts terminal IDs of the candidate terminals that are associated with the request terminal 10*aa*, and determines whether the terminal IDs of the candidate terminals that are associated with the request terminal 10*aa* include the terminal ID "01*cb*" of the counterpart terminal 10*cb*. The management system 50 sends information regarding the session such as the session ID "se1" to the counterpart terminal 10*cb*, when the terminal ID "01*cb*" of the counterpart terminal 10*cb* is included in the list of terminal IDs of the candidate terminals that are associated with the request terminal 10*aa*.

Referring now to FIG. 33, operation of managing a request for leaving from the contents data session that is generated by the request terminal 10*aa*, is explained according to an example embodiment of the present invention. It is assumed that operation of FIG. 33 is performed after the contents data session "sed" is established among the terminals 10*aa*, 10*cb*, and 10*db*. In FIG. 26, management data is transmitted or received through the management data session "sei".

At S121, as the user at the request terminal 10*aa* presses the operation button 108 (FIG. 2), the request terminal 10*aa* receives a request for leaving from the contents data session.

At S122, the data transmit/receive 11 of the request terminal 10*aa* sends session leave request information to the management system 50, which includes the terminal ID "01*aa*" of the request terminal 10*aa*, the change request data "Leave" that requests for leaving from the contents data session, and the session ID "se1" for identifying the contents data session.

When the session leave request information is received, at S123, the state manager 53 of the management system 50 searches the terminal management table (FIG. 12) using the terminal ID "01*aa*" of the request terminal 10*aa*, which is extracted from the session leave request information, to specify a record that corresponds to the terminal ID "01 *aa*", and changes the communication state field of the specified record.

Referring now to FIG. 27, operation of managing the state information of the request terminal 10*aa*, performed at S123, is explained according to an example embodiment of the present invention.

At S123-1, the state obtainer 53*b* of the state manager 53 obtains the communication state of the terminal using the terminal management DB 5003 (FIG. 12). In this example, the change request data determiner 61 determines that the change request data "Leave", which is received at the data transmit/receive 51, is not the specific change request data that is previously determined. More specifically, it is determined that the change request data "Leave" differs from any one of the "Invite" and the "Accept". Accordingly, the change request data determiner 61 determines to use the state change management table of FIG. 17. Based on this determination, the change obtainer 53*b* obtains only the communication state of the request terminal 10*aa*. More specifically, the state obtainer 53*b* searches the terminal management table (FIG. 12) using the terminal ID "01*aa*" of the terminal 10*aa* as a search key to obtain the communication state "Busy" of the request terminal 10*aa* that sends the leave request information.

At S123-2, the state changer 53*c* of the state manager 53 obtains the previous state data that corresponds to the change request data "Leave". More specifically, the state changer 53*c* searches the state change request table (FIG. 17) using the change request data "Leave" as a search key to obtain the previous state data "Busy".

At S123-3, the state changer 53*c* compares the communication state obtained by the state obtainer 53*b* at S123-1 with the previous state data obtained by the state changer 53*c* at S123-2 to generate a comparison result. More specifically, the state changer 53*c* compares the communication state "Busy" of the request terminal 10*aa* that is obtained by the state obtainer 53*c*, with the previous state data "Busy" obtained by the state changer 53*c* to generate a comparison result.

When the comparison result generated at S123-3 indicates that the communication state and the previous state data match ("YES" at S123-3), the operation proceeds to S123-4. At S123-4, the state changer 53*c* obtains the changed state data of the request terminal 10*aa* that corresponds to the change request data "Leave". More specifically, the state changer 53*c* searches the state change management table (FIG. 17) using the change request data "Leave" to obtain the changed state data "None" of the request terminal 10*aa*.

At S123-5, the state changer 53*c* searches the terminal management table (FIG. 12) for the record that corresponds to the terminal ID "01*aa*" of the request terminal 10*aa* to change the communication state field for the request terminal 10*aa*. More specifically, the state changer 53*c* changes the communication state field in the record that corresponds to the terminal ID "01*aa*", which is stored in the terminal management table (FIG. 12), to the communication state "None" based on the changed state data of the request terminal 10aa.

At S123-3, when the comparison result generated by the state changer 53c indicates that the communication state is not the same as the previous state data ("NO" at S123-3), the state changer 53c does not change the communication state field stored in the terminal management table (FIG. 12) for the record of the terminal ID "01 aa". In such case, the operation proceeds to S123-6 to cause the data transmit/receive 51 to send an error message to the request terminal 10aa, and the operation ends.

More specifically, when the error message is sent from the management system 50, S124 to S132 of FIG. 33 are not performed. Instead, the request terminal 10aa, which receives the error message, causes the display 120aa to display an error message to the user.

In this example, it is assumed that the communication state of the request terminal 10aa is changed at S123-5. In such case, referring to FIG. 33, S124 to S132 are performed as follows.

At S124, the session manager 57 searches the session management table (FIG. 14) stored in the nonvolatile memory 5000 to specify a record that corresponds to the session ID "se1", and delete the terminal ID "01aa" of the request terminal 10aa from the request terminal field.

At S125, the management system 50 sends session leave request information to the relay terminal 30e, which includes the terminal ID "01aa" of the request terminal 10aa, and the session ID "se1". When the session leave request information is received, the relay terminal 30e stops relaying of contents data through the contents data session to the request terminal 10aa, and disconnects connection with the terminal 10aa. At S126, the relay terminal 30e sends session leave response information to the management system 50 to notify the management system 50 that the request for leaving from the contents data session is accepted. The session leave response information includes the terminal ID "01aa" of the request terminal 10aa, and the session ID "se1".

When the session leave response information is received, at S127, the data transmit/receive 51 of the management system 50 sends session leave response information to the request terminal 10aa to notify the request terminal 10aa that the request for leaving from the contents data session is accepted. The session leave response information includes the terminal ID "01aa" of the request terminal 10aa, the change request data "Leave", the session ID "se1", and the response "OK" indicating that the request for leaving is accepted.

When the session leave response information is received, the user at the terminal 10aa may turn off the power switch 109 of the terminal 10aa. In such case, at S128, the terminal 10aa receives a user instruction for turning off the power of the terminal 10aa.

At S129, the data transmit/receive 11 of the terminal 10aa sends power off request information to the management system 50 to notify that the power is turned off at the terminal 10aa. The power off request information includes the terminal ID "01 aa" of the request terminal 10aa.

When the power off request information is received at the data transmit/receive 51, at S130, the state manager 53 of the management system 50 searches the terminal management table (FIG. 12) using the terminal ID "01aa" of the request terminal 10aa, which is extracted from the power off request information, to specify a record of the terminal ID "01aa", and changes the operation state field and the communication state field of the specified record. More specifically, the operation state field is changed to "OFFLINE", and data in the communication state field is deleted.

At S131, the data transmit/receive 51 sends power off respond information to the request terminal 10aa to notify the request terminal 10aa that the power off request is accepted. Further, the management system 50 disconnects the management data session, which is established with the request terminal 10aa.

When the power off respond information is received, at S132, the request terminal 10aa turns off the power of the terminal 10aa, and the operation ends.

Any one of the other participating terminals 10cb and 10db may perform S121 to S132 to leave from the contents data session "sed", and turned off the power of the terminal.

In the examples illustrated above, when a contents data session is established between a first terminal and a second terminal, the data transmit/receive 51 of the management system 50 may receive a request for participating in the contents data session from a third terminal. When such request for participating is received, the terminal extractor 54 extracts terminal IDs of one or more candidate terminals that are associated with the first terminal, and terminal IDs of one or more candidate terminals that are associated with the second terminal, from a candidate list management table (FIG. 13). The connection determiner 62 determines whether a terminal ID of the third terminal is included in the terminal IDs of the candidate terminals that are extracted to generate a determination result. Based on the determination result, the management system 50 controls connections of the third terminal with the first terminal and the second terminal. With this connection control performed by the management system 50, even when the third terminal is not previously registered as a terminal that may participate in the contents data session, the third terminal is allowed to participate in the contents data session as long as the determination result indicates that the terminal ID of the third terminal is included in the list of candidate terminal IDs obtained for the participating terminals.

When the third terminal starts participating in the contents data session, the terminal extractor 54 extracts a terminal ID of each one of candidate terminals that are associated with the terminal ID of the third terminal, from the candidate list management table (FIG. 13). The data transmit/receive 51 sends notification to the candidate terminal having the extracted terminal ID, which indicates that the third terminal is participating in the contents data session.

When the first terminal and the second terminal are having the contents data session, the data transmit/receive 51 of the management system 50 receives information regarding the session ID of the contents data session, from the first terminal, with a request for sending the information regarding the session ID to the third terminal. The terminal extractor 54 extracts a terminal ID of each one of candidate terminals that are associated with the terminal ID of the first terminal, from the candidate list management table (FIG. 13). When the management system 50 determines that the terminal IDs of the candidate terminals, which are extracted by the terminal extractor 54, include a terminal ID of the third terminal to which the information regarding the session ID is to be transmitted, the data transmit/receive 51 sends the information regarding the session ID to the third terminal. With this information regarding the session ID sent from the first terminal, the third terminal may send a request for participating in the contents data session specified by the session ID.

The calculator 63 of the management system 50 calculates a distance of the shortest path between the third terminal and the participating terminal that is participating in the contents data session, for each one of the participating terminals (the first terminal and the second terminal). The calculator 63 specifies one of the participating terminals having the largest distance of the shortest path with respect to the third terminal, and obtains the value of the largest distance of the shortest path between the third terminal and the specified participating terminal. In calculation, the calculator 63 defines a distance of the shortest path between a terminal 10 and a candidate terminal that is associated with the terminal 10 to be a predetermined value. The distance of the shortest path between the third terminal and the participating terminal is obtained based on the predetermined value.

The connection determiner 62 determines whether the largest distance of the shortest path between the third terminal and the participating terminal, which is obtained by the calculator 63, is less than a threshold to generate a determination result. Based on the determination result, the management system 50 determines whether to allow the third terminal to connect with the participating terminal.

The data transmit/receive 51 of the management system 50 sends information regarding the distance of the shortest path between the third terminal and one of the participating terminals having the largest distance, to the third terminal. With the information regarding the distance, the user at the third terminal knows the degree of risk in participating in the session.

The management system 50 controls connection among the first terminal, the second terminal, and the third terminal. The data transmit/receive 51 sends relay terminal connection information to be used for connecting with the relay terminal 30 that relays contents data between the first terminal and the second terminal, to the third terminal. Using the relay terminal connection information, the third terminal is able to connect with the relay terminal 30.

In the above-described examples, as illustrated in FIG. 31(a), at S106-5 (FIG. 30), the distance of the shortest path between the participation requesting terminal 10cb and the participating terminal 10db is defined to be "1", when the participation requesting terminal 10cb is managed as a candidate terminal that is associated with the participating terminal 10db. Since the participating terminal 10aa is managed as a candidate terminal of the participating terminal 10db, the distance of the shortest path between the participation requesting terminal 10cb and the participating terminal 10aa is calculated as "2".

In another example, as illustrated in FIG. 31(b), assuming that the participating terminal 10cb is managed as a candidate terminal that is associated with each of the participation requesting terminals 10aa and 10db in the candidate list management table (FIG. 13), the distance of the shortest path between the participation requesting terminal 10cb and each of the participating terminals 10aa and 10db is defined as "1". In such case, the largest value of distance of the shortest path between the participation requesting terminal and the participating terminal is "1".

In another example, as illustrated in FIG. 31(c), assuming that the participation requesting terminal 10cb is managed as a candidate terminal that is associated with the participating terminal 10db in the candidate list management table (FIG. 13), and the participating terminal 10db is managed as a candidate terminal that is associated with the participation requesting terminal 10cb in the candidate list management table (FIG. 13), the distance of the shortest path between the participation requesting terminal 10cb and the participating terminal 10db is defined to be "1".

The relay terminal 30, the management system 50, the program providing system 90, and the maintenance system 100 may be each implemented by a single computer. Alternatively, any number of parts, functions, or modules of the relay terminal 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, and transmission management program, or a storage device such as the HDD 204 that stores any one of the terminal control program, relay control program, and transmission management program, or the program providing system 90 provided with the HD 204 storing any one of the terminal control program, relay control program, and transmission management program, may be distributed within the country or to another country as a computer program product.

In the above-described examples, the quality of image data to be processed by the relay terminal 30, which is determined based on information obtainable from any one of the data quality management table of FIG. 8 and the quality management table of FIG. 15 is analyzed in terms of image resolution. Alternatively, any other criteria may be used to analyze quality of image data including, for example, depth of image, sampling frequency in case of voice data, and bit length in case of voice data.

Further, the date and time information stored in the relay terminal management table of FIG. 10 or the terminal management table of FIG. 12, or the delay time information stored in the session management table of FIG. 14, is expressed in terms of date and time. Alternatively, the date and time information or the delay time information may be expressed only in terms of time such as the time at which information is received.

Further, in the above-described examples, the relay terminal IP address of the relay terminal 30 and the terminal IP address of the terminal 10 are respectively managed using the relay terminal management table of FIG. 10 and the terminal management table of FIG. 12. Alternatively, the relay terminal 30 and the terminal 10 may each be managed using any other identification information or using any other tables. For example, when the relay terminal 30 or the terminal 10 needs to be identified on the communication network 2, the relay terminal 30 or the terminal 10 may be managed using Fully Qualified Domain Name (FQDN). In such case, the transmission system 10 is provided with a domain name system (DNS) server that obtains the IP address that corresponds to the FQDN of the relay terminal 30 or the terminal 10. In view of this, identification information for identifying the relay terminal 30 on the communication network 2 may not only include the identification information that identifies the relay terminal 30 on the communication network 2, but also identification information that identifies a node on the communication network 2 to which the relay terminal 30 is connected, or identification information that identifies a node on the communication network 2 from which the relay terminal 30 is connected. Similarly, identification information for identifying the terminal 10 on the communication network 2 may not only include the identification information that identifies the terminal 10 on the communication network 2, but also identification information that identifies a node on the communication network 2 to which the terminal 10 is connected, or identification information that identifies a node on the communication network 2 from which the terminal 10 is connected.

In the above-described examples, the transmission system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. Alternatively, the transmission system 1 may be any one of teleconference system or a personal computer image sharing system.

In another example, the transmission system 1 of FIG. 1 may be implemented as a communication system having a portable phone. In such case, the terminal 10 is implemented as a portable phone as illustrated in FIG. 34. The terminal 10, or the portable phone 10, includes a body 1110-1, a menu screen display button 1110-2, a display section 1110-3, a microphone 1110-4 provided at a lower portion of the body, and a speaker 1110-5 provided at an upper portion of the body. When selected, the menu screen display button 1110-2 causes the display section 1110-3 to display a menu screen in which various icons each indicating a specific application program are displayed. In this example, the display section 1110-3 displays a candidate list that lists a plurality of terminal names together with a plurality of icons each reflecting the state information of each candidate terminal. Since the terminal 10 in this example is implemented as a portable phone, the name of a user who owns the specific terminal, or a nickname of the user, is displayed as the terminal name. The display section 1110-3 is a touch panel screen, which allows the user to select one of the plurality of terminal names, i.e., the user names, being displayed by the display section 1110-3. When a specific terminal name, or a user name, is selected, the portable phone 10 starts communication with the specific terminal that is selected in a substantially similar manner as described above.

In the above-described examples, the contents data is assumed to include image data and voice data. Alternatively, the contents data may include any other type of data that affects human senses of sight in alternative to image data, or any other type of data that affects human senses of hearing in alternative to voice data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communication network 2. In case the contents data that affects human senses of smell, the terminal 10 may convey the contents data that affects senses of smell felt by a user at the terminal 10 to another terminal 10 through the communication network 2. In case the contents data that affects human senses of taste, the terminal 10 may convey the contents data that affects senses of taste felt by a user at the terminal 10 to another terminal 10 through the communication network 2.

Further, the contents data may only include one type of contents data selected from sight data such as image data, hearing data such as voice data, touch data, smell data, and taste data.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a connection control system that controls connections among a plurality of terminals through a network. The system includes: candidate terminal managing means for managing terminal identification information for identifying a terminal, and candidate terminal identification information for identifying one or more candidate terminals that are associated with the terminal for each one of the plurality of terminals; receiving means for receiving a request for participating in a session being performed by at least a first terminal and a second terminal from a third terminal, when the session is being performed by at least the first terminal and the second terminal to exchange contents data; candidate terminal extracting means for extracting candidate terminal identification information for identifying at least one candidate terminal that is associated with each one of the first terminal and the second terminal using the candidate terminal manager; and a determiner that determines whether identification information for identifying the third terminal is included in the extracted candidate terminal identification information to generate a first determination result, and determines whether to allow the third terminal to connect with the first and second terminals through the network to participate in the session based on the first determination result.

In one example, the candidate terminal managing means corresponds to the candidate list management DB 5004. The receiving means corresponds to the data transmit/receive 51. The candidate terminal extracting means corresponds to the terminal extractor 54. The determiner corresponds to the connection determiner 62.

As described above, the connection control system extracts identification information of one or more candidate terminals that are associated with the first terminal and identification information of one or more candidate terminals that are associated with the second terminal. The connection control system further determines whether identification information of the third terminal is included in the extracted identification information of the candidate terminals to generate the first determination result. Based on the first determination result, the connection control system controls connections of the third terminal with the first terminal and the second terminal. With this control, the third terminal, which is not previously registered as a participating terminal of the session, is allowed to participate in the session being performed by the participating terminals.

The connection control system further includes a calculator that calculates a distance of the shortest path between the third terminal and each of the second terminal and the third terminal, and specifies one of the second terminal and the third terminal having the largest value of distance with respect to the third terminal to obtain the largest value of distance of the shortest path between the third terminal and the specified one of the first terminal and the second terminal. The determiner determines whether the obtained largest value of distance is less than a predetermined value to generate a second determination result, and determines whether to allow the third terminal to connect with the first and second terminals based on the second determination result in addition to the first determination result. In one example, the calculator corresponds to the calculator 63.

In calculation, the calculator defines a value of a distance of the shortest path between the terminal, and the candidate terminal that is associated with the terminal, which are managed by the candidate terminal manager, to be a predetermined value. The distance of the shortest path between the third terminal and each of the second terminal and the third terminal is obtained based on the predetermined value.

The connection control system further includes distance information transmit means for transmitting distance information indicating the largest value of distance that is obtained by the calculator, to the third terminal. In one example, the distance information transmit means corresponds to the data transmit/receive 51.

In the connection control system, the candidate terminal extracting means further extracts candidate terminal identification information for identifying one or more candidate terminals that are associated with the third terminal. The system further includes participation information transmit means for transmitting information indicating that the third terminal is participating in the session, to the candidate terminals having the extracted candidate terminal identification information. In one example, the participation information transmit means corresponds to the data transmit/receive 51.

In the connection control system, when the receiving means receives a request for notifying a predetermined terminal of the session being performed, from the first terminal, the candidate terminal extracting means further extracts candidate terminal identification information for identifying one or more candidate terminals that are associated with identification information of the first terminal. When the extracted candidate terminal identification information of the candidate terminals that are associated with the first terminal includes identification information for identifying the predetermined terminal, the system causes session information transmit means to transmit information regarding the session to the predetermined terminal. In one example, the session information transmit means corresponds to the data transmit/receive 51.

In one example, the present invention may reside in a transmission system, which includes the above-described connection control system and a relay terminal that relays contents data through the session.

The connection control system further includes a connection information transmit means for transmitting relay terminal connection information to be used for connecting with the relay terminal, to the third terminal, when the determiner determines that the third terminal is allowed to connect with the first and second terminals. In one example, the connection information transmit means corresponds to the data transmit/receive 51.

In one example, the present invention may reside in a method of controlling connections among a plurality of terminals through a network in a transmission system. The transmission system includes candidate terminal managing means for managing terminal identification information for identifying a terminal, and candidate terminal identification information for identifying a candidate terminal that is associated with the terminal for each one of the plurality of terminals. The method includes: receiving a request for participating in a session being performed by at least a first terminal and a second terminal from a third terminal, when the session is being performed by at least the first terminal and the second terminal to exchange contents data; extracting candidate terminal identification information for identifying one or more candidate terminals that are associated with each one of the first terminal and the second terminal using the candidate terminal manager; determining whether identification information for identifying the third terminal is included in the extracted candidate terminal identification information to generate a determination result; and determining whether to allow the third terminal to connect with the first and second terminals to participate in the session based on the determination result.

In one example, the present invention may reside in a recording medium storing a plurality of instructions, which cause a processor to perform any one of the above-described connection control methods.

For example, the present invention may reside in a recording medium storing a plurality of instructions, which cause a processor to perform a connection control method of controlling connections among a plurality of terminals through a network. The connection control method includes: managing identification information for identifying a terminal, and identification information for identifying one or more candidate terminals that are associated with the terminal, for each one of the plurality of terminals; receiving a request for participating in a session being performed by a plurality of participating terminals, from a participation requesting terminal that is not participating in the session; extracting identification information for identifying at least one candidate terminal that is associated with the participating terminal for each one of the plurality of participating terminals to obtain extracted candidate terminal identification information of the participating terminals; determining whether the extracted candidate terminal identification information of the participating terminals includes identification information for identifying the participation requesting terminal to generate a first determination result; and determining whether to allow the participation requesting terminal to connect with the plurality of participating terminals through the network to participate in the session, based on the first determination result.

In one example, the present invention may reside in a transmission terminal including: a network interface to send a request for participating in a session being performed by a plurality of participating terminals after the session starts; and causing a connection control system to perform the above-described connection control method to obtain, from the connection control system, information indicating whether the participation requesting terminal is allowed to connect with the plurality of participating terminals. The obtained information is output through an output device such as a display.

What is claimed is:

1. A connection control system, which controls connection of at least two transmission terminals of a plurality of transmission terminals, comprising:
- a memory which stores information including a plurality of request terminal identification information, and for each of the request terminal identification information stores one or more corresponding counterpart terminal identification information;
- a terminal manager configured to manage contents of the memory, for each of the transmission terminals, the request terminal identification information which identifies one or more counterpart corresponding transmission terminals to be a candidate destination of contents data transmitted from each of the transmission terminals;
- a receiver configured to receive a participation request from a third transmission terminal of the plurality of transmission terminals that is not participating in a session, when the session is established to transmit contents data between a first transmission terminal and a second transmission terminal of the plurality of transmission terminals;
- a determiner configured to determine whether terminal identification information for identifying the third transmission terminal is included in any one of the corresponding counterpart terminal identification information for identifying a candidate counterpart transmission terminal for the first transmission terminal that is currently participating in the session being established, using identification information of the first transmission terminal as the request terminal identification information which is utilized to access the corresponding counterpart terminal identification information stored in the memory, or the corresponding counterpart terminal identification information for identifying a candidate counterpart transmission terminal for the second transmission terminal that is currently participating in the session being established, using identification information of the second transmission terminal as the request terminal identification information which is utilized to access the corresponding counterpart terminal identification information stored in the memory, of the terminal identification information being managed by the terminal manager,
- wherein the determiner executes control to allow the third transmission terminal to participate in the session being established, when the determiner determines that the terminal identification information for identifying the third transmission terminal is included.

2. The connection control system of claim 1, further comprising:
- a session manager configured to manage, for each session being established between at least two transmission terminals of the plurality of transmission terminals, terminal identification information for identifying each transmission terminal that is participating in the session; and
- a terminal extractor configured to, in response to receiving the participation request at the receiver, extract terminal identification information for identifying a transmission terminal, for each of the first transmission terminal and the second transmission terminal, as a candidate counterpart transmission terminal, from the terminal manager, based on the terminal identification information of the first transmission terminal and the second transmission terminal being managed by the session manager for the session subjected for the participation request, wherein the determiner determines whether the terminal identification information for identifying the third transmission terminal is included in the terminal identification information being extracted.

3. The connection control system of claim 2, wherein, when the determiner determines that the terminal identification information for identifying the third transmission terminal is included, the session manager manages the terminal identification information for identifying the third transmission terminal, in association with the session being established between the first transmission terminal and the second transmission terminal.

4. The connection control system of claim 1, wherein, when the determiner determines that the terminal identification information for identifying the third transmission terminal is not included, the determiner determines not to allow participation by the third transmission terminal in the session being established.

5. The connection control system of claim 4, wherein, when the determiner determines that the terminal identification information for identifying the third transmission terminal is not included, the system transmits error information to the third transmission terminal.

6. The connection control system of claim 1, wherein, when the determiner determines that the terminal identification information for identifying the third transmission terminal is included, the system transmits information indicating that participation is allowed to the third transmission terminal.

7. The connection control system of claim 1, wherein the terminal identification information being managed by the terminal manager includes information indicating a candidate counterpart transmission terminal that can be selected when any one of the plurality of transmission terminals requests to start communication with another one of the transmission terminals, and
- in response to a login request from any one of the plurality of transmission terminals, the system transmits the terminal identification information indicating a candidate counterpart transmission terminal of the transmission terminal sending the login request, to the transmission terminal sending the login request.

8. The connection control system of claim 1, wherein the participation request received from the third transmission terminal includes the terminal identification information for identifying the third transmission terminal.

9. A transmission system, comprising:
- the plurality of transmission terminals; and
- the connection control system of claim 1.

10. The transmission system of claim 9, further comprising:
- a relay device configured to relay contents data to be transmitted for the at least two transmission terminals of the plurality of transmission terminals,
- wherein the session being established between the first transmission terminal and the second transmission terminal is established via the relay device.

11. The transmission system of claim 10, wherein:
- when the connection control system receives notification request information indicating a request for notifying the third transmission terminal of session identification information for identifying the session from the first transmission terminal, the session being established between the first transmission terminal and the second transmission terminal, the connection control system transmits notification information including at least the session identification information to the third transmission terminal, and when the notification information is received, the third transmission terminal transmits the participation request including at least the session identification information to the connection control system.

12. A non-transitory recording medium storing a plurality of instructions which, when executed by a processor, cause the processor to perform a method of controlling connection between at least two terminals of a plurality of terminals, the method comprising:

receiving a participation request from a third terminal of the plurality of terminals that is not participating in a session, when the session is established to transmit contents data between a first terminal and a second terminal of the plurality of terminals;

determining, using a memory which stores information including a plurality of request terminal identification information, and for each of the request terminal identification information stores one or more corresponding counterpart terminal identification information, whether terminal identification information for identifying the third terminal is included in any one of the corresponding counterpart terminal identification information for identifying a candidate counterpart terminal for the first terminal that is currently participating in the session being established, using identification information of the first transmission terminal as the request terminal identification information which is utilized to access the corresponding counterpart terminal identification information stored in the memory, or the corresponding counterpart terminal identification information for identifying a candidate counterpart terminal for the second terminal that is currently participating in the session being established, using identification information of the second transmission terminal as the request terminal identification information which is utilized to access the corresponding counterpart terminal identification information stored in the memory, of the terminal identification information being managed; and controlling to allow the third terminal to participate in the session being established, when the determining determines that the terminal identification information for identifying the third terminal is included.

13. The non-transitory recording medium according to claim 12, wherein the method further comprises:

extracting, in response to receiving the participation request, extract terminal identification information for identifying a terminal as a candidate counterpart terminal based on terminal identification information of the first terminal and the second terminal, wherein the determining determines whether the terminal identification information for identifying the third terminal is included in the terminal identification information being extracted.

14. The non-transitory recording medium according to claim 13, wherein the method further comprises:

managing, the terminal identification information for identifying the third terminal, in association with the session being established between the first terminal and the second terminal, when the determining determines that the terminal identification information for identifying the third terminal is included.

15. The non-transitory recording medium according to claim 12, wherein the method further comprises:

not allowing participation by the third terminal in the session being established, when the determining determines that the terminal identification information for identifying the third terminal is not included.

16. The non-transitory recording medium according to claim 15, wherein the method further comprises:

transmitting error information to the third terminal, when the determining determines that the terminal identification information for identifying the third terminal is not included.

17. A method of controlling connection between at least two terminals of a plurality of terminals, the method comprising:

receiving a participation request from a third terminal of the plurality of terminals that is not participating in a session, when the session is established to transmit contents data between a first terminal and a second terminal of the plurality of terminals;

determining, using a memory which stores information including a plurality of request terminal identification information, and for each of the request terminal identification information stores one or more corresponding counterpart terminal identification information, whether terminal identification information for identifying the third terminal is included in any one of the corresponding counterpart terminal identification information for identifying a candidate counterpart terminal for the first terminal that is currently participating in the session being established, using identification information of the first transmission terminal as the request terminal identification information which is utilized to access the corresponding counterpart terminal identification information stored in the memory, or the corresponding counterpart terminal identification information for identifying a candidate counterpart terminal for the second terminal that is currently participating in the session being established, using identification information of the second transmission terminal as the request terminal identification information which is utilized to access the corresponding counterpart terminal identification information stored in the memory, of the terminal identification information being managed; and controlling to allow the third terminal to participate in the session being established, when the determining determines that the terminal identification information for identifying the third terminal is included.

18. The method according to claim 17, further comprising:

extracting, in response to receiving the participation request, extract terminal identification information for identifying a terminal as a candidate counterpart terminal based on terminal identification information of the first terminal and the second terminal, wherein the determining determines whether the terminal identification information for identifying the third terminal is included in the terminal identification information being extracted.

19. The method according to claim 18, further comprising:

managing, the terminal identification information for identifying the third terminal, in association with the session being established between the first terminal and the second terminal, when the determining determines that the terminal identification information for identifying the third terminal is included.

20. The method according to claim 17, further comprising:

not allowing participation by the third terminal in the session being established, when the determining determines that the terminal identification information for identifying the third terminal is not included.

21. The method according to claim 20, further comprising: transmitting error information to the third terminal, when the determining determines that the terminal identification information for identifying the third terminal is not included.

22. The connection control system according to claim 1, wherein:
   each of the one or more corresponding counterpart terminal identification information stored in the memory differs from the corresponding request terminal identification information.

23. The non-transitory recording medium according to claim 12, wherein:
   each of the one or more corresponding counterpart terminal identification information stored in the memory differs from the corresponding request terminal identification information.

24. The method according to claim 17, wherein:
   each of the one or more corresponding counterpart terminal identification information stored in the memory differs from the corresponding request terminal identification information.

* * * * *